(12) United States Patent
Kurumiya et al.

(10) Patent No.: US 11,529,787 B2
(45) Date of Patent: *Dec. 20, 2022

(54) MULTILAYER TUBES

(71) Applicant: UBE INDUSTRIES, LTD., Ube (JP)

(72) Inventors: Aki Kurumiya, Ube (JP); Koji Nakamura, Ube (JP)

(73) Assignee: UBE INDUSTRIES, LTD., Ube (JP)

( * ) Notice: Subject to any disclaimer, the term of this patent is extended or adjusted under 35 U.S.C. 154(b) by 840 days.

This patent is subject to a terminal disclaimer.

(21) Appl. No.: 16/086,385

(22) PCT Filed: Mar. 31, 2017

(86) PCT No.: PCT/JP2017/013541
§ 371 (c)(1),
(2) Date: Sep. 19, 2018

(87) PCT Pub. No.: WO2017/170985
PCT Pub. Date: Oct. 5, 2017

(65) Prior Publication Data
US 2019/0091962 A1 Mar. 28, 2019

(30) Foreign Application Priority Data
Mar. 31, 2016 (JP) .............................. JP2016-069964

(51) Int. Cl.
| | | |
|---|---|---|
| *B32B 1/08* | (2006.01) |
| *B32B 27/34* | (2006.01) |
| *C08L 77/00* | (2006.01) |
| *C08L 77/02* | (2006.01) |
| *F16L 11/127* | (2006.01) |
| *C08L 77/06* | (2006.01) |
| *C08L 77/10* | (2006.01) |
| *B32B 27/08* | (2006.01) |
| *B32B 27/20* | (2006.01) |
| *B32B 27/32* | (2006.01) |
| *B32B 37/15* | (2006.01) |

(52) U.S. Cl.
CPC ............... *B32B 1/08* (2013.01); *B32B 27/08* (2013.01); *B32B 27/20* (2013.01); *B32B 27/322* (2013.01); *B32B 27/34* (2013.01); *B32B 37/153* (2013.01); *C08L 77/00* (2013.01); *C08L 77/02* (2013.01); *F16L 11/127* (2013.01); *B32B 2250/02* (2013.01); *B32B 2250/03* (2013.01); *B32B 2250/04* (2013.01); *B32B 2250/24* (2013.01); *B32B 2264/108* (2013.01); *B32B 2270/00* (2013.01); *B32B 2274/00* (2013.01); *B32B 2307/202* (2013.01); *B32B 2307/306* (2013.01); *B32B 2307/558* (2013.01); *B32B 2307/714* (2013.01); *B32B 2327/18* (2013.01); *B32B 2377/00* (2013.01); *B32B 2398/20* (2013.01); *B32B 2597/00* (2013.01); *C08L 77/06* (2013.01); *C08L 77/10* (2013.01); *C08L 2205/025* (2013.01); *C08L 2205/03* (2013.01)

(58) Field of Classification Search
CPC .......... C08L 2205/025; C08L 2205/03; C08L 77/02; C08L 77/04; C08L 77/08; C08L 77/10; C08L 2205/02; C08L 77/06; C08L 77/12; C08G 69/00; C08G 69/02; C08G 69/08; C08G 69/10; C08G 69/12; C08G 69/14; C08G 69/26; F16L 11/04; F16L 11/12; F16L 11/127; B32B 27/34; B32B 2250/02; B32B 2250/03; B32B 2250/04; B32B 2250/05; B32B 2250/24; B32B 27/08; B32B 27/20; B32B 27/322; B32B 37/153; B32B 1/08
USPC ....................................................... 428/36.91
See application file for complete search history.

(56) References Cited

U.S. PATENT DOCUMENTS

| | | | |
|---|---|---|---|
| 5,554,425 A | 9/1996 | Krause et al. | |
| 2002/0142118 A1* | 10/2002 | Schmitz ................ | B32B 27/306 428/35.7 |
| 2004/0126523 A1 | 7/2004 | Masuda et al. | |
| 2007/0104907 A1 | 5/2007 | Nishioka et al. | |
| 2007/0148389 A1 | 6/2007 | Nishioka et al. | |

(Continued)

FOREIGN PATENT DOCUMENTS

| | | |
|---|---|---|
| EP | 1 741 549 A1 | 1/2007 |
| EP | 1 741 553 A1 | 1/2007 |

(Continued)

OTHER PUBLICATIONS

Japanese Office Action for Japanese Application No. 2018-509646, dated Feb. 2, 2021, with English translation.

(Continued)

*Primary Examiner* — Lee E Sanderson
(74) *Attorney, Agent, or Firm* — Birch, Stewart, Kolasch & Birch, LLP

(57) ABSTRACT

A multilayer tube is provided which includes a layer including a specific aliphatic polyamide composition and a layer including a semi-aromatic polyamide composition including a semi-aromatic polyamide with a specific structure, these layers being adjacent to each other, wherein the aliphatic polyamide composition includes an aliphatic polyamide having a specific ratio of the number of methylene groups to the number of amide groups, a polyamide having a specific difference in absolute value of solubility parameter SP from the aliphatic polyamide, and an elastomer polymer including a structural unit derived from an unsaturated compound having a carboxyl group and/or an acid anhydride group.

11 Claims, No Drawings

(56) References Cited

U.S. PATENT DOCUMENTS

| | | | | |
|---|---|---|---|---|
| 2009/0252979 A1* | 10/2009 | Ferreiro | ................. | C09J 177/02 |
| | | | | 428/474.7 |
| 2009/0297750 A1* | 12/2009 | Bellet | ..................... | B32B 27/18 |
| | | | | 428/36.8 |
| 2010/0307626 A1* | 12/2010 | Martens | .................. | C08L 77/06 |
| | | | | 138/140 |
| 2012/0003416 A1 | 1/2012 | Mizutani et al. | | |
| 2012/0012222 A1 | 1/2012 | Mizutani et al. | | |
| 2016/0214343 A1* | 7/2016 | Nakamura | ............ | B32B 27/322 |
| 2016/0281886 A1 | 9/2016 | Mizutani et al. | | |
| 2018/0099473 A1* | 4/2018 | Montanari | ................ | B32B 1/08 |

FOREIGN PATENT DOCUMENTS

| | | | |
|---|---|---|---|
| JP | 2004-203012 A | 7/2004 | |
| JP | 2011-201081 A | 10/2011 | |
| JP | 2011-214592 A | 10/2011 | |
| JP | 2014-240145 A | 12/2014 | |
| JP | 2015-190492 A | 11/2015 | |
| JP | 2016-186349 A | 10/2016 | |
| WO | WO 2005/058600 A1 | 6/2005 | |
| WO | WO 2005/071301 A1 | 8/2005 | |
| WO | WO 2005/102681 A1 | 11/2005 | |
| WO | WO 2005/102694 A1 | 11/2005 | |
| WO | WO 2015/033982 A1 | 3/2015 | |
| WO | WO-2015033982 A1 * | 3/2015 | .............. C08L 77/02 |

OTHER PUBLICATIONS

International Search Report for PCT/JP2017/013541 dated Jun. 13, 2017.

* cited by examiner

MULTILAYER TUBES

TECHNICAL FIELD

The present invention relates to multilayer tubes.

BACKGROUND ART

The historical problem of rusting by antifreezing agents on roads, the prevention of global warming, and the demand for energy saving have caused a shift of the principal material for automobile piping tubes from metals to resins which are highly rustproof and lightweight. Usual resins used as piping tubes are, among others, polyamide resins, saturated polyester resins, polyolefin resins and thermoplastic polyurethane resins. Monolayer tubes of these resins have a limited range of applications on account of the fact that their properties such as heat resistance and chemical resistance are unsatisfactory.

To save gasoline consumption and to attain higher performance, gasoline is blended with a low-boiling alcohol such as methanol or ethanol, or an ether such as ethyl-t-butyl ether (ETBE). Such oxygen-containing gasoline or the like is transferred through automobile piping tubes. Further, from the point of view of the prevention of environmental pollution, gas emissions, including the diffusion and leakage into the air of medias such as volatile hydrocarbons through the walls of piping tubes, are strictly controlled. These strict controls associated with media barrier properties are not met sufficiently by the conventional monolayer tubes of a single polyamide resin, in particular, polyamide 11 or polyamide 12 having superior properties such as strength, toughness, chemical resistance and flexibility. In particular, an improvement in barrier properties to alcohol-containing gasolines has been demanded.

To solve this problem, multilayer tubes have been proposed which include resins with good barrier properties to chemical media, for example, saponified ethylene/vinyl acetate copolymer (EVOH), polymetaxylylene adipamide (polyamide MXD6), polybutylene terephthalate (PBT), polyethylene naphthalate (PEN), polybutylene naphthalate (PBN), polyphenylene sulfide (PPS), polyvinylidene fluoride (PVDF), ethylene/tetrafluoroethylene copolymer (ETFE), ethylene/chlorotrifluoroethylene copolymer (ECTFE), tetrafluoroethylene/hexafluoropropylene copolymer (TFE/HFP, FEP), tetrafluoroethylene/hexafluoropropylene/vinylidene fluoride copolymer (TFE/HFP/VDF, THV), tetrafluoroethylene/hexafluoropropylene/vinylidene fluoride/perfluoro(alkyl vinyl ether) copolymer (TFE/HFP/VDF/PAVE), tetrafluoroethylene/perfluoro(alkyl vinyl ether) copolymer (TFE/PAVE, PFA), tetrafluoroethylene/hexafluoropropylene/perfluoro(alkyl vinyl ether) copolymer (TFE/HFP/PAVE), and chlorotrifluoroethylene/perfluoro(alkyl vinyl ether)/tetrafluoroethylene copolymer (CTFE/PAVE/TFE, CPT) (see, for example, Patent Literature 1).

Meanwhile, the conventional products using, as the innermost layer, a polyamide resin, in particular, nylon 11 or nylon 12 having superior strength, toughness, chemical resistance and flexibility are known to give rise to, after a contact with the fuel described above, the gradual leaching and precipitation of low-molecular components such as monomers and oligomers into the fuel. Such components are attached to moving parts in injectors and fuel tank valves to possibly cause a failure to start the engine or a problem in controlling the inner pressure of the fuel tank. Polynonamethylene terephthalamide (PA9T) is an attractive tube constituent which is excellent in barrier properties to chemical medias, causes less leaching of monomers and oligomers and is of low specific gravity and low cost. The present inventors have proposed multilayer structures that include at least two layers including a layer containing an aliphatic polyamide and a layer containing a semi-aromatic polyamide which includes diamine units including 60 mol % or more 1,9-nonanediamine units and/or 2-methyl-1,8-octanediamine units based on all the diamine units and which includes dicarboxylic acid units including 60 mol % or more terephthalic acid units and/or naphthalenedicarboxylic acid units based on all the dicarboxylic acid units (see Patent Literatures 2 to 5).

To attain an improvement in the interlayer adhesion between an aliphatic polyamide layer and a polynonamethylene terephthalamide (PA9T) layer, a multilayer tube has been proposed that includes a layer including an aliphatic polyamide such as polyamide 12, and a layer which includes a semi-aromatic polyamide composition including a semi-aromatic polyamide with superior barrier properties to chemical medias such as polynonamethylene terephthalamide (PA9T) and a specific organic acid salt (an organic acid salt having 10 to 24 carbon atoms) (see Patent Literature 6).

CITATION LIST

Patent Literature

Patent Literature 1: U.S. Pat. No. 5,554,425
Patent Literature 2: Japanese Patent Application Kokai Publication No. 2004-203012
Patent Literature 3: WO 2005/58600
Patent Literature 4: WO 2005/102681
Patent Literature 5: WO 2005/102694
Patent Literature 6: Japanese Patent Application Kokai Publication No. 2011-214592

SUMMARY OF INVENTION

Technical Problem

The multilayer tubes described in Patent Literatures 2 to 5 do not require an adhesive layer between the aliphatic polyamide layer and the polynonamethylene terephthalamide (PA9T) layer, and their initial interlayer adhesion is sufficient. However, there is a room for improvement in terms of the durability of interlayer adhesion when the tubes are exposed to, for example, a long contact or soaking in fuel or a heat treatment. The multilayer tube described in Patent Literature 6 requires a further improvement in the durability of interlayer adhesion similarly to the techniques described above.

An object of the present invention is to provide a multilayer tube which solves the problems discussed above and exhibits superior chemical resistance and excellent interlayer adhesion and durability thereof while maintaining characteristics such as barrier properties to chemical medias, low-temperature impact resistance and less leaching of monomers and oligomers.

Solution to Problem

The present inventors carried out extensive studies to solve the problems discussed above. As a result, the present inventors have found that a multilayer tube which includes a layer including a specific aliphatic polyamide composition and a layer including a semi-aromatic polyamide composition including a semi-aromatic polyamide with a specific structure, these layers being adjacent to each other, attains superior chemical resistance and excellent interlayer adhesion and durability thereof while maintaining characteristics such as barrier properties to chemical medias, low-temperature impact resistance and less leaching of monomers and oligomers by virtue of the aliphatic polyamide composition being designed so that it includes an aliphatic polyamide having a specific ratio of the number of methylene groups to the number of amide groups, a polyamide having a specific difference in absolute value of solubility parameter SP from the aliphatic polyamide, and an elastomer polymer including a structural unit derived from an unsaturated compound having a carboxyl group and/or an acid anhydride group.

That is, the present invention resides in:

A multilayer tube comprising two or more layers including a layer (a) and a layer (b), wherein at least one pair of the layer (a) and the layer (b) are disposed adjacent to each other, the layer (a) contains an aliphatic polyamide composition (A), the layer (b) contains a semi-aromatic polyamide composition (B), the aliphatic polyamide composition (A) contains a polyamide (A1), a polyamide (A2) and an elastomer polymer (A3), the polyamide (A1) is an aliphatic polyamide having a ratio of the number of methylene groups to the number of amide groups of not less than 8.0 and is contained in the aliphatic polyamide composition (A) in an amount of not less than 40% by mass and not more than 90% by mass, the polyamide (A2) is a polyamide other than the polyamide (A1) and is contained in the aliphatic polyamide composition (A) in an amount of not less than 5% by mass and not more than 30% by mass, the elastomer polymer (A3) comprises structural units derived from an unsaturated compound having a carboxyl group and/or an acid anhydride group, and is contained in the aliphatic polyamide composition (A) in an amount of not less than 5% by mass and not more than 30% by mass, the difference in absolute value between the solubility parameter SP of the polyamide (A1) and that of the polyamide (A2) [|(SP of polyamide (A1))−(SP of polyamide (A2))|] is not less than 1.8 (MPa)$^{1/2}$ and not more than 5.5 (MPa)$^{1/2}$, the semi-aromatic polyamide composition (B) contains a semi-aromatic polyamide (B1) or a semi-aromatic polyamide (B2), the semi-aromatic polyamide (B1) or the semi-aromatic polyamide (B2) is contained in the semi-aromatic polyamide composition (B) in an amount of not less than 60% by mass, the semi-aromatic polyamide (B1) comprises 50 mol % or more $C_9$ or $C_{10}$ aliphatic diamine units based on all diamine units in the semi-aromatic polyamide (B1), and 50 mol % or more terephthalic acid units and/or naphthalenedicarboxylic acid units based on all dicarboxylic acid units in the semi-aromatic polyamide (B1), and the semi-aromatic polyamide (B2) comprises 50 mol % or more xylylenediamine units and/or bis(aminomethyl)naphthalene units based on all diamine units in the semi-aromatic polyamide (B2), and 50 mol % or more $C_9$ or $C_{10}$ aliphatic dicarboxylic acid units based on all dicarboxylic acid units in the semi-aromatic polyamide (B2).

Preferred embodiments of the multilayer tube are described below. A plurality of such preferred embodiments may be combined.

[1] The multilayer tube wherein the polyamide (A1) is at least one homopolymer selected from the group consisting of polyhexamethylene dodecamide (polyamide 612), polynonamethylene dodecamide (polyamide 912), polydecamethylene sebacamide (polyamide 1010), polydecamethylene dodecamide (polyamide 1012), polydodecamethylene dodecamide (polyamide 1212), polyundecanamide (polyamide 11) and polydodecanamide (polyamide 12), and/or a copolymer constituted by a plurality of monomers selected from the monomers constituting the above homopolymers.

[2] The multilayer tube wherein the polyamide (A2) is at least one homopolymer selected from the group consisting of polycaproamide (polyamide 6), polyhexamethylene adipamide (polyamide 66), polyhexamethylene azelamide (polyamide 69), polyhexamethylene sebacamide (polyamide 610), polyhexamethylene terephthalamide (polyamide 6T), polyhexamethylene isophthalamide (polyamide 6I) and polymetaxylylene adipamide (polyamide MXD6), and/or a copolymer constituted by a plurality of monomers selected from the monomers constituting the above homopolymers, or a copolymer which is based on a monomer selected from the monomers constituting at least one polymer selected from the group consisting of polycaproamide (polyamide 6), polyhexamethylene adipamide (polyamide 66), polyhexamethylene azelamide (polyamide 69), polyhexamethylene sebacamide (polyamide 610), polyhexamethylene terephthalamide (polyamide 6T), polyhexamethylene isophthalamide (polyamide 6I) and polymetaxylylene adipamide (polyamide MXD6) and which includes a plurality of monomers selected from the monomers constituting at least one selected from the group consisting of polyhexamethylene dodecamide (polyamide 612), polynonamethylene dodecamide (polyamide 912), polydecamethylene sebacamide (polyamide 1010), polydecamethylene dodecamide (polyamide 1012), polydodecamethylene dodecamide (polyamide 1212), polyundecanamide (polyamide 11) and polydodecanamide (polyamide 12).

[3] The multilayer tube wherein [A]>[B]+10 wherein [A] is the concentration (μeq/g) of terminal amino groups and [B] is the concentration (μeq/g) of terminal carboxyl groups, per 1 g of each of the polyamide (A1) and the polyamide (A2) in the aliphatic polyamide composition (A).

[4] The multilayer tube wherein the semi-aromatic polyamide composition (B) contains the elastomer polymer (A3).

[5] The multilayer tube wherein the layer (b) is disposed adjacent to and inside the layer (a).

[6] The multilayer tube wherein the multilayer tube further comprises a layer (c), at least one pair of the layer (b) and the layer (c) are adjacent to each other, and the layer (c) contains a fluorine-containing polymer (C) having, in its molecular chain, a functional group reactive to an amino group.

[7] The multilayer tube wherein the layer (c) is disposed inside the layer (b).

[8] The multilayer tube wherein the innermost layer is a conductive layer containing a thermoplastic resin composition containing a conductive filler.

[9] The multilayer tube is produced by coextrusion.

[10] The multilayer tube is used as a fuel tube.

Advantageous Effects of Invention

The multilayer tubes provided according to the present invention exhibit superior chemical resistance and excellent interlayer adhesion and durability thereof while maintaining characteristics such as barrier properties to chemical medias, low-temperature impact resistance and less leaching of monomers and oligomers.

DESCRIPTION OF EMBODIMENTS

1. Layer (a)

The layer (a) in the multilayer tube includes an aliphatic polyamide composition (A).

[Aliphatic Polyamide Composition (A)]

The aliphatic polyamide composition (A) includes a polyamide (A1), a polyamide (A2) and an elastomer polymer (A3). The polyamide (A1) is an aliphatic polyamide having a ratio of the number of methylene groups to the number of amide groups of not less than 8.0 and is contained in the aliphatic polyamide composition (A) in an amount of not less than 40% by mass and not more than 90% by mass. The polyamide (A2) is a polyamide other than the polyamide (A1) and is contained in the aliphatic polyamide composition (A) in an amount of not less than 5% by mass and not more than 30% by mass. The elastomer polymer (A3) includes structural units derived from an unsaturated compound having a carboxyl group and/or an acid anhydride group, and is contained in the aliphatic polyamide composition (A) in an amount of not less than 5% by mass and not more than 30% by mass. The difference in absolute value between the solubility parameter SP of the polyamide (A1) and that of the polyamide (A2) [|(SP of polyamide (A1))−(SP of polyamide (A2))|] is not less than 1.8 $(MPa)^{1/2}$ and not more than 5.5 $(MPa)^{1/2}$. (Hereinafter, this composition will be sometimes written as the aliphatic polyamide composition (A)).

From the point of view of the durability of interlayer adhesion after long contact with or long soaking in fuels and/or after heat treatment or the like, the aliphatic polyamide composition (A) is preferably free from plasticizers.

[Polyamides (A1)]

The polyamide (A1) includes only aliphatic groups in the repeating units, has an amide bond (—CONH—) in the main chain, and has a ratio of the number of methylene groups ($[CH_2]$) to the number of amide groups ($[NHCO]$), $[CH_2]/[NHCO]$, of not less than 8.0. (Hereinafter, the ratio will be sometimes written as the methylene to amide ratio $[CH_2]/[NHCO]$.) (Hereinafter, this polyamide will be sometimes written as the polyamide (A1).)

Examples of the polyamides (A1) having a methylene to amide ratio $[CH_2]/[NHCO]$ of not less than 8.0 include polyundecanamide (polyamide 11): $[CH_2]/[NHCO]=10.0$, polydodecanamide (polyamide 12): $[CH_2]/[NHCO]=11.0$, polyhexamethylene dodecamide (polyamide 612): $[CH_2]/[NHCO]=8.0$, polyhexamethylene tetradecamide (polyamide 614): $[CH_2]/[NHCO]=9.0$, polyhexamethylene hexadecamide (polyamide 616): $[CH_2]/[NHCO]=10.0$, polyhexamethylene octadecamide (polyamide 618): $[CH_2]/[NHCO]=11.0$, polynonamethylene azelamide (polyamide 99): $[CH_2]/[NHCO]=8.0$, polynonamethylene sebacamide (polyamide 910): $[CH_2]/[NHCO]=8.5$, polynonamethylene dodecamide (polyamide 912): $[CH_2]/[NHCO]=9.5$, polydecamethylene suberamide (polyamide 108): $[CH_2]/[NHCO]=8.0$, polydecamethylene azelamide (polyamide 109): $[CH_2]/[NHCO]=8.5$, polydecamethylene sebacamide (polyamide 1010): $[CH_2]/[NHCO]=9.0$, polydecamethylene dodecamide (polyamide 1012): $[CH_2]/[NHCO]=10.0$, polydodecamethylene adipamide (polyamide 126): $[CH_2]/[NHCO]=8.0$, polydodecamethylene suberamide (polyamide 128): $[CH_2]/[NHCO]=9.0$, polydodecamethylene azelamide (polyamide 129): $[CH_2]/[NHCO]=9.5$, polydodecamethylene sebacamide (polyamide 1210): $[CH_2]/[NHCO]=10.0$, and polydodecamethylene dodecamide (polyamide 1212): $[CH_2]/[NHCO]=11.0$. The polyamide (A1) may be at least one homopolymer selected from the above, and/or a copolymer constituted by a plurality of monomers selected from the monomers constituting the above homopolymers.

In the case of poly(dodecanamide/dodecamethylene dodecamide) copolymer (polyamide 12/1212) as an example, the methylene to amide ratio $[CH_2]/[NHCO]$ is 11.0 irrespective of the mass ratio and molar ratio of the structural repeating units because the methylene to amide ratio $[CH_2]/[NHCO]$ is 11.0 for both polydodecanamide (polyamide 12) and polydodecamethylene dodecamide (polyamide 1212).

In contrast, the methylene to amide ratio $[CH_2]/[NHCO]$ is variable depending on the molar ratio of the structural repeating units in the case of poly(dodecanamide/hexamethylene dodecamide) copolymer (polyamide 12/612). The methylene to amide ratio $[CH_2]/[NHCO]$ is 11.0 for polydodecanamide (polyamide 12), and the methylene to amide ratio $[CH_2]/[NHCO]$ is 8.0 for polyhexamethylene dodecamide (polyamide 612). Provided that the molar ratio of the structural repeating units is known, the ratio in the copolymer can be calculated. If the dodecanamide units/hexamethylene dodecamide units is 80:20 (by mass) and 86.3:13.7 (by mol), the methylene to amide ratio $[CH_2]/[NHCO]$ is $11.0 \times 0.863 + 8.0 \times 0.137 = 10.6$. The methylene to amide ratio $[CH_2]/[NHCO]$ is decreased with increasing molar ratio of hexamethylene dodecamide units. However, the methylene to amide ratio $[CH_2]/[NHCO]$ is always at least 8.0. That is, a copolymer which includes monomers (structural repeating units) each capable of forming an aliphatic polyamide having a methylene to amide ratio $[CH_2]/[NHCO]$ of not less than 8.0, for example, poly(dodecanamide/dodecamethylene dodecamide) copolymer (polyamide 12/1212) or poly(dodecanamide/hexamethylene dodecamide) copolymer (polyamide 12/612), always satisfies a methylene to amide ratio $[CH_2]/[NHCO]$ of 8.0 or above irrespective of the molar ratio of the structural repeating units, and is thus comprehended as the polyamide (A1) in the present invention.

The polyamide (A1) may be a copolymer of a monomer (structural repeating units) capable of forming an aliphatic polyamide having a methylene to amide ratio $[CH_2]/[NHCO]$ of not less than 8.0, with a monomer (structural repeating units) which forms, as described below, an aliphatic polyamide having a methylene to amide ratio $[CH_2]/[NHCO]$ of less than 8.0. The copolymer obtained in this case is comprehended as the polyamide (A1) in the present invention as long as the methylene to amide ratio $[CH_2]/[NHCO]$ is not less than 8.0.

Examples of the aliphatic polyamides having a methylene to amide ratio $[CH_2]/[NHCO]$ of less than 8.0 include polycaproamide (polyamide 6): $[CH_2]/[NHCO]=5.0$, polyethylene adipamide (polyamide 26): $[CH_2]/[NHCO]=3.0$, polytetramethylene succinamide (polyamide 44): $[CH_2]/[NHCO]=3.0$, polytetramethylene glutamide (polyamide 45): $[CH_2]/[NHCO]=3.5$, polytetramethylene adipamide (polyamide 46): $[CH_2]/[NHCO]=4.0$, polytetramethylene suberamide (polyamide 48): $[CH_2]/[NHCO]=5.0$, polytetramethylene azelamide (polyamide 49): $[CH_2]/[NHCO]=5.5$, polytetramethylene sebacamide (polyamide 410): $[CH_2]/[NHCO]=6.0$, polytetramethylene dodecamide (polyamide 412): $[CH_2]/[NHCO]=7.0$, polypentamethylene succinamide (polyamide 54): $[CH_2]/[NHCO]=3.5$, polypentamethylene glutamide (polyamide 55): [CH$_2$]/[NHCO]=4.0, polypentamethylene adipamide (polyamide 56): [CH$_2$]/[NHCO]=4.5, polypentamethylene suberamide (polyamide 58): [CH$_2$]/[NHCO]=5.5, polypentamethylene azelamide (polyamide 59): [CH$_2$]/[NHCO]=6.0, polypentamethylene sebacamide (polyamide 510): [CH$_2$]/[NHCO]=6.5, polypentamethylene dodecamide (polyamide 512): [CH$_2$]/[NHCO]=7.5, polyhexamethylene succinamide (polyamide 64): [CH$_2$]/[NHCO]=4.0, polyhexamethylene glutamide (polyamide 65): [CH$_2$]/[NHCO]=4.5, polyhexamethylene adipamide (polyamide 66): [CH$_2$]/[NHCO]=5.5, polyhexamethylene suberamide (polyamide 68): [CH$_2$]/[NHCO]=6.0, polyhexamethylene azelamide (polyamide 69): [CH$_2$]/[NHCO]=6.5, polyhexamethylene sebacamide (polyamide 610): [CH$_2$]/[NHCO]=7.0, polynonamethylene adipamide (polyamide 96): [CH$_2$]/[NHCO]=6.5, polynonamethylene suberamide (polyamide 98): [CH$_2$]/[NHCO]=7.5, and polydecamethylene adipamide (polyamide 106): [CH$_2$]/[NHCO]=7.0.

For example, the methylene to amide ratio [CH$_2$]/[NHCO] is variable depending on the molar ratio of the structural repeating units in the case of poly(dodecanamide/caproamide) copolymer (polyamide 12/6). The methylene to amide ratio [CH$_2$]/[NHCO] is 11.0 for polydodecanamide (polyamide 12), and the methylene to amide ratio [CH$_2$]/[NHCO] is 5.0 for polycaproamide (polyamide 6). Provided that the molar ratio of the structural repeating units is known, the ratio in the copolymer can be calculated. If the dodecanamide units/caproamide units is 80:20 (by mass) and 69.7:30.3 (by mol), the methylene to amide ratio [CH$_2$]/[NHCO] is 11.0×0.697+5.0×0.303=9.2. Since the methylene to amide ratio [CH$_2$]/[NHCO] is not less than 8.0, this copolymer is comprehended as the polyamide (A1) in the present invention.

In contrast, if the dodecanamide units/caproamide units is 60:40 (by mass) and 46.3:53.7 (by mol), the methylene to amide ratio [CH$_2$]/[NHCO] is 11.0×0.463+5.0×0.537=7.8. Since the methylene to amide ratio [CH$_2$]/[NHCO] is less than 8.0, this copolymer is not comprehended as the polyamide (A1) in the present invention.

As described above, when the polyamide (A1) is a copolymer of a monomer (repeating units) capable of forming an aliphatic polyamide having a methylene to amide ratio [CH$_2$]/[NHCO] of not less than 8.0, with a plurality of monomers (repeating units) which each form an aliphatic polyamide having a methylene to amide ratio [CH$_2$]/[NHCO] of less than 8.0, the methylene to amide ratio [CH$_2$]/[NHCO] in the copolymer can be calculated from the molar ratio of the structural repeating units and the methylene to amide ratios [CH$_2$]/[NHCO] in the respective polyamides. The copolymer is comprehended as the polyamide (A1) in the present invention as long as the methylene to amide ratio [CH$_2$]/[NHCO] in the copolymer is not less than 8.0.

To ensure that the multilayer tube that is obtained will attain sufficient properties such as mechanical characteristics, heat resistance and chemical resistance and also from the points of view of economic efficiency and availability, the polyamide (A1) is preferably, for example, at least one homopolymer selected from the group consisting of polyundecanamide (polyamide 11), polydodecanamide (polyamide 12), polyhexamethylene dodecamide (polyamide 612), polynonamethylene azelamide (polyamide 99), polynonamethylene decamide (polyamide 910), polynonamethylene dodecamide (polyamide 912), polydecamethylene sebacamide (polyamide 1010), polydecamethylene dodecamide (polyamide 1012) and polydodecamethylene dodecamide (polyamide 1212), and/or a copolymer constituted by a plurality of monomers selected from the monomers constituting the above homopolymers, and is more preferably at least one homopolymer selected from the group consisting of polyundecanamide (polyamide 11), polydodecanamide (polyamide 12), polyhexamethylene dodecamide (polyamide 612), polynonamethylene dodecamide (polyamide 912), polydecamethylene sebacamide (polyamide 1010), polydecamethylene dodecamide (polyamide 1012) and polydodecamethylene dodecamide (polyamide 1212), and/or a copolymer constituted by a plurality of monomers selected from the monomers constituting the above homopolymers.

[Polyamides (A2)]

The polyamide (A2) is a polyamide which is other than the polyamide (A1), has an amide bond (—CONH—) in the main chain, and is obtained by polymerizing or copolymerizing a monomer or monomers (repeating units) capable of forming a polyamide, specifically, lactam, aminocarboxylic acid, or diamine and dicarboxylic acid, by a known method such as melt polymerization, solution polymerization or solid phase polymerization. (Hereinafter, this polyamide will be sometimes written as the polyamide (A2).) That is, the polyamide (A2) is at least one selected from the group consisting of alicyclic polyamides, semi-aromatic polyamides, and aliphatic polyamides having a methylene to amide ratio [CH$_2$]/[NHCO] of less than 8.0.

The difference in absolute value between the solubility parameter SP of the polyamide (A1) and that of the polyamide (A2) [|(SP of polyamide (A1))—(SP of polyamide (A2))|] is not less than 1.8 (MPa)$^{1/2}$ and not more than 5.5 (MPa)$^{1/2}$, preferably not less than 2.0 (MPa)$^{1/2}$ and not more than 5.3 (MPa)$^{1/2}$, and more preferably not less than 2.2 (MPa)$^{1/2}$ and not more than 5.0 (MPa)$^{1/2}$. If the difference in absolute value between the solubility parameter SP of the polyamide (A1) and that of the polyamide (A2) is below the above range, the multilayer tube that is obtained may exhibit low and poorly interlayer adhesion and durability thereof. If, on the other hand, the difference exceeds the above range, the multilayer tube that is obtained may exhibit poor mechanical characteristics and chemical resistance.

The solubility parameter SP is a value determined from the Fedors equation described below as the square root of the molecular cohesive energy density at 25° C., the unit being (MPa)$^{1/2}$. (Hereinafter, the solubility parameter will be sometimes written as SP.)

$\delta = [\Delta Ev/\Delta V]^{1/2} = [\Sigma \Delta e_i / \Sigma \Delta v_i]^{1/2}$ δ: solubility parameter SP
ΔEV: cohesive energy
ΔV: molar molecular volume
Δe$_i$: molar cohesive energy of atom or group of atoms in component i
Δv$_i$: molar molecular volume of atom or group of atoms in component i Here, ΔEv and ΔV are represented by ΔEv=ΣΔe$_i$ and ΔV=ΣΔv$_i$, and e$_i$ and v$_i$ are values determined based on POLYMER ENGINEERING AND SCIENCE (published 1974, vol. 14, No. 2, pp. 147-154). The values of SP described in the present specification hereinbelow are expressed in (MPa)$^{1/2}$.

The solubility parameters SP (in (MPa)$^{1/2}$) of the polyamides (A1) mentioned as preferred examples are polyundecanamide (polyamide 11, SP: 22.9), polydodecanamide (polyamide 12, SP: 22.5), polyhexamethylene dodecamide (polyamide 612, SP: 24.1), polynonamethylene azelamide (polyamide 99, SP: 24.1), polynonamethylene decamide (polyamide 910, SP: 23.8), polynonamethylene dodecamide (polyamide 912, SP: 23.2), polydecamethylene sebacamide (polyamide 1010, SP: 23.5), polydecamethylene dodecamide (polyamide 1012, SP: 22.9) and polydodecamethylene dodecamide (polyamide 1212, SP: 22.5).

The polyamide (A2) is not limited as long as the difference in absolute value between its solubility parameter SP and that of the polyamide (A1) is not less than 1.8 $(MPa)^{1/2}$ and not more than 5.5 $(MPa)^{1/2}$. Examples of the aliphatic polyamides which satisfy this and have a methylene to amide ratio $[CH_2]/[NHCO]$ of less than 8.0 include (the unit for SP below is $(MPa)^{1/2}$) polycaproamide (polyamide 6, SP: 26.9), polytetramethylene glutamide (polyamide 45, SP: 29.2), polytetramethylene adipamide (polyamide 46, SP: 28.3), polytetramethylene suberamide (polyamide 48, SP: 26.9), polytetramethylene azelamide (polyamide 49, SP: 26.3), polytetramethylene sebacamide (polyamide 410, SP: 25.7), polytetramethylene dodecamide (polyamide 412, SP: 24.9), polypentamethylene succinamide (polyamide 54, SP: 29.2), polypentamethylene glutamide (polyamide 55, SP: 28.3), polypentamethylene adipamide (polyamide 56, SP: 27.5), polypentamethylene suberamide (polyamide 58, SP: 26.3), polypentamethylene azelamide (polyamide 59, SP: 25.7), polypentamethylene sebacamide (polyamide 510, SP: 25.3), polyhexamethylene succinamide (polyamide 64, SP: 28.3), polyhexamethylene glutamide (polyamide 65, SP: 27.5), polyhexamethylene adipamide (polyamide 66, SP: 26.9), polyhexamethylene suberamide (polyamide 68, SP: 25.7), polyhexamethylene azelamide (polyamide 69, SP: 25.3), polyhexamethylene sebacamide (polyamide 610, SP: 24.9), polynonamethylene adipamide (polyamide 96, SP: 25.3), polydecamethylene glutamide (polyamide 105, SP: 25.3), polydecamethylene adipamide (polyamide 106, SP: 24.9), and copolymers constituted by a plurality of monomers selected from the monomers constituting the above polyamides, and/or copolymers constituted by a plurality of monomers selected from the monomers constituting the polyamides (A1) described hereinabove.

The polyamide (A2) is selected appropriately so that the difference in absolute value between its solubility parameter SP and that of the polyamide (A1) will be not less than 1.8 $(MPa)^{1/2}$ and not more than 5.5 $(MPa)^{1/2}$.

When polydodecanamide (polyamide 12, SP: 22.5) or polydodecamethylene dodecamide (polyamide 1212, SP: 22.5) having the lowest solubility parameter SP among the polyamides (A1) is selected, polypentamethylene dodecamide (polyamide 512, SP: 24.5) or polydodecamethylene glutamide (polyamide 125, SP: 24.5) having the lowest solubility parameter SP among the polyamides (A2) satisfies the requirement of the present invention, with the difference in absolute value between their solubility parameters SP being 2.0 $(MPa)^{1/2}$. Thus, the combination of polydodecanamide (polyamide 12, SP: 22.5) or polydodecamethylene dodecamide (polyamide 1212, SP: 22.5) as the polyamide (A1) with polypentamethylene dodecamide (polyamide 512, SP: 24.5) or polydodecamethylene glutamide (polyamide 125, SP: 24.5) as the polyamide (A2) falls within the scope of the present invention.

In contrast, when polyhexamethylene dodecamide (polyamide 612, SP: 24.1) or polynonamethylene azelamide (polyamide 99, SP: 24.1) having the highest solubility parameter SP among the polyamides (A1) is selected, polypentamethylene dodecamide (polyamide 512, SP: 24.5) or polydodecamethylene glutamide (polyamide 125, SP: 24.5) having the lowest solubility parameter SP among the polyamides (A2) fails to satisfy the requirement of the present invention, with the difference in absolute value between their solubility parameters SP being 0.4 $(MPa)^{1/2}$. Thus, the combination of polyhexamethylene dodecamide (polyamide 612, SP: 24.1) or polynonamethylene azelamide (polyamide 99, SP: 24.1) as the polyamide (A1) with polypentamethylene dodecamide (polyamide 512, SP: 24.5) or polydodecamethylene glutamide (polyamide 125, SP: 24.5) as the polyamide (A2) falls outside the scope of the present invention. In the case where polyhexamethylene dodecamide (polyamide 612, SP: 24.1) or polynonamethylene azelamide (polyamide 99, SP: 24.1) is selected as the polyamide (A1), the polyamide (A2) that is selected needs to have a solubility parameter SP of not less than 25.9 $(MPa)^{1/2}$ so that the difference in absolute value between their solubility parameters SP will be not less than 1.8 $(MPa)^{1/2}$.

Further, when polydodecanamide (polyamide 12, SP: 22.5) or polydodecamethylene dodecamide (polyamide 1212, SP: 22.5) having the lowest solubility parameter SP among the polyamides (A1) is selected, polytetramethylene adipamide (polyamide 46, SP: 28.3) having the highest solubility parameter SP among the polyamides (A2) fails to satisfy the requirement of the present invention, with the difference in absolute value between their solubility parameters SP being 5.8 $(MPa)^{1/2}$. Thus, the combination of polydodecanamide (polyamide 12, SP: 22.5) or polydodecamethylene dodecamide (polyamide 1212, SP: 22.5) as the polyamide (A1) with polytetramethylene adipamide (polyamide 46, SP: 28.3) as the polyamide (A2) falls outside the scope of the present invention. In the case where polydodecanamide (polyamide 12, SP: 22.5) or polydodecamethylene dodecamide (polyamide 1212, SP: 22.5) is selected as the polyamide (A1), the polyamide (A2) that is selected needs to have a solubility parameter SP of not more than 28.0 $(MPa)^{1/2}$ so that the difference in absolute value between their solubility parameters SP will be not more than 5.5 $(MPa)^{1/2}$.

When polyhexamethylene dodecamide (polyamide 612, SP: 24.1) or polynonamethylene azelamide (polyamide 99, SP: 24.1) having the highest solubility parameter SP among the polyamides (A1) is selected, polytetramethylene adipamide (polyamide 46, SP: 28.3) having the highest solubility parameter SP among the polyamides (A2) satisfies the requirement of the present invention, with the difference in absolute value between their solubility parameters SP being 4.2 $(MPa)^{1/2}$. Thus, the combination of polyhexamethylene dodecamide (polyamide 612, SP: 24.1) or polynonamethylene azelamide (polyamide 99, SP: 24.1) as the polyamide (A1) with polytetramethylene adipamide (polyamide 46, SP: 28.3) as the polyamide (A2) falls within the scope of the present invention.

From the points of view of availability, economic efficiency and the compatibility with the polyamide (A1) and also for the purposes of ensuring that the obtainable multilayer tube will attain sufficient properties such as mechanical characteristics, chemical resistance and flexibility and attaining sufficient and interlayer adhesion and durability thereof with the semi-aromatic polyamide composition (B) described later, the polyamide (A2) is preferably at least one homopolymer selected from the group consisting of polycaproamide (polyamide 6), polyhexamethylene adipamide (polyamide 66), polyhexamethylene azelamide (polyamide 69) and polyhexamethylene sebacamide (polyamide 610), and/or a copolymer constituted by a plurality of monomers selected from the monomers constituting the above homopolymers, or a copolymer which is based on a monomer selected from the monomers constituting at least one polymer selected from the group consisting of polycaproamide (polyamide 6), polyhexamethylene adipamide (polyamide 66), polyhexamethylene azelamide (polyamide 69) and polyhexamethylene sebacamide (polyamide 610) and which includes a plurality of monomers selected from monomers constituting at least one selected from the group consisting of polyhexamethylene dodecamide (polyamide 612), polynonamethylene dodecamide (polyamide 912), polydecamethylene sebacamide (polyamide 1010), polydecamethylene dodecamide (polyamide 1012), polydodecamethylene dodecamide (polyamide 1212), polyundecanamide (polyamide 11) and polydodecanamide (polyamide 12).

Of these, more preferable are polycaproamide (polyamide 6), polyhexamethylene adipamide (polyamide 66), polyhexamethylene azelamide (polyamide 69), polyhexamethylene sebacamide (polyamide 610), poly(caproamide/hexamethylene adipamide) copolymer (polyamide 6/66), poly(caproamide/hexamethylene azelamide) copolymer (polyamide 6/69), poly(caproamide/hexamethylene sebacamide) copolymer (polyamide 6/610), poly(caproamide/hexamethylene dodecamide) copolymer (polyamide 6/612), poly(caproamide/dodecanamide) copolymer (polyamide 6/12), poly(caproamide/hexamethylene adipamide/hexamethylene sebacamide) copolymer (polyamide 6/66/610), poly(caproamide/hexamethylene adipamide/hexamethylene dodecamide) copolymer (polyamide 6/66/612), poly(caproamide/hexamethylene adipamide/dodecanamide) copolymer (polyamide 6/66/12), poly(caproamide/hexamethylene sebacamide/dodecanamide) copolymer (polyamide 6/610/12) and poly(caproamide/hexamethylene dodecamide/dodecanamide) copolymer (polyamide 6/612/12), and still more preferable are polycaproamide (polyamide 6), polyhexamethylene sebacamide (polyamide 610), poly(caproamide/hexamethylene adipamide) copolymer (polyamide 6/66), poly(caproamide/hexamethylene sebacamide) copolymer (polyamide 6/610), poly(caproamide/hexamethylene dodecamide) copolymer (polyamide 6/612), poly(caproamide/dodecanamide) copolymer (polyamide 6/12), poly(caproamide/hexamethylene adipamide/hexamethylene sebacamide) copolymer (polyamide 6/66/610), poly(caproamide/hexamethylene adipamide/hexamethylene dodecamide) copolymer (polyamide 6/66/612) and poly(caproamide/hexamethylene adipamide/dodecanamide) copolymer (polyamide 6/66/12).

For example, the solubility parameter SP of poly(caproamide/hexamethylene adipamide) copolymer (polyamide 6/66) is 26.9 $(MPa)^{1/2}$ irrespective of the mass ratio and molar ratio of the structural repeating units because the solubility parameter SP of polycaproamide (polyamide 6) and that of polyhexamethylene adipamide (polyamide 66) are 26.9 $(MPa)^{1/2}$.

When polyhexamethylene dodecamide (polyamide 612, SP: 24.1) or polynonamethylene azelamide (polyamide 99, SP: 24.1) having the highest solubility parameter SP among the polyamides (A1) is selected, poly(caproamide/hexamethylene adipamide) copolymer (polyamide 6/66) of which the SP is 26.9 $(MPa)^{1/2}$ irrespective of the mass ratio and molar ratio of the structural repeating units satisfies the requirement of the present invention, with the difference in absolute value between their solubility parameters SP being 2.8 $(MPa)^{1/2}$. Thus, the combination of polyhexamethylene dodecamide (polyamide 612, SP: 24.1) or polynonamethylene azelamide (polyamide 99, SP: 24.1) as the polyamide (A1) with poly(caproamide/hexamethylene adipamide) copolymer (polyamide 6/66, SP: 26.9) as the polyamide (A2) falls within the scope of the present invention.

When polydodecanamide (polyamide 12, SP: 22.5) or polydodecamethylene dodecamide (polyamide 1212, SP: 22.5) having the lowest solubility parameter SP among the polyamides (A1) is selected, poly(caproamide/hexamethylene adipamide) copolymer (polyamide 6/66) of which the SP is 26.9 $(MPa)^{1/2}$ irrespective of the mass ratio and molar ratio of the structural repeating units satisfies the requirement of the present invention, with the difference in absolute value between their solubility parameters SP being 4.4 $(MPa)^{1/2}$. Thus, the combination of polydodecanamide (polyamide 12, SP: 22.5) or polydodecamethylene dodecamide (polyamide 1212, SP: 22.5) as the polyamide (A1) with poly(caproamide/hexamethylene adipamide) copolymer (polyamide 6/66, SP: 26.9) as the polyamide (A2) falls within the scope of the present invention.

In contrast, the solubility parameter SP of poly(caproamide/hexamethylene sebacamide) copolymer (polyamide 6/610) as the polyamide (A2) is variable depending on the molar ratio of the structural repeating units. The solubility parameter SP of polycaproamide (polyamide 6) is 26.9 $(MPa)^{1/2}$, and the solubility parameter SP of polyhexamethylene sebacamide (polyamide 610) is 24.9 $(MPa)^{1/2}$. Provided that the molar ratio of the structural repeating units is known, the solubility parameter of the copolymer can be calculated. If the caproamide units/hexamethylene sebacamide units is 80:20 (by mass) and 85.2:14.8 (by mol), the solubility parameter SP is 26.9×0.852+24.9×0.148=26.6 $(MPa)^{1/2}$.

When this poly(caproamide/hexamethylene sebacamide) copolymer (polyamide 6/610=85.2/14.8 mol %) is used together with polyhexamethylene dodecamide (polyamide 612, SP: 24.1) or polynonamethylene azelamide (polyamide 99, SP: 24.1) having the highest solubility parameter SP among the polyamides (A1), the requirement of the present invention is satisfied, with the difference in absolute value between their solubility parameters SP being 2.5 $(MPa)^{1/2}$. Thus, the combination of polyhexamethylene dodecamide (polyamide 612, SP: 24.1) or polynonamethylene azelamide (polyamide 99, SP: 24.1) as the polyamide (A1) with poly(caproamide/hexamethylene sebacamide) copolymer (polyamide 6/610=85.2/14.8 mol %, SP: 26.6) as the polyamide (A2) falls within the scope of the present invention.

When the poly(caproamide/hexamethylene sebacamide) copolymer (polyamide 6/610=85.2/14.8 mol %) is used together with polydodecanamide (polyamide 12, SP: 22.5) or polydodecamethylene dodecamide (polyamide 1212, SP: 22.5) having the lowest solubility parameter SP among the polyamides (A1), the requirement of the present invention is satisfied, with the difference in absolute value between their solubility parameters SP being 4.1 $(MPa)^{1/2}$. Thus, the combination of polydodecanamide (polyamide 12, SP: 22.5) or polydodecamethylene dodecamide (polyamide 1212, SP: 22.5) as the polyamide (A1) with poly(caproamide/hexamethylene sebacamide) copolymer (polyamide 6/610=85.2/14.8 mol %, SP: 26.6) as the polyamide (A2) falls within the scope of the present invention.

Next, if poly(caproamide/hexamethylene sebacamide) copolymer (polyamide 6/610) has caproamide units/hexamethylene sebacamide units in 30:70 (by mass) and 38.1/61.9 (by mol), the solubility parameter SP is 26.9×0.381+24.9×0.619=25.7 $(MPa)^{1/2}$.

When this poly(caproamide/hexamethylene sebacamide) copolymer (polyamide 6/610=38.1/61.9 mol %) is used together with polyhexamethylene dodecamide (polyamide 612, SP: 24.1) or polynonamethylene azelamide (polyamide 99, SP: 24.1) having the highest solubility parameter SP among the polyamides (A1), the requirement of the present invention is not satisfied, with the difference in absolute value between their solubility parameters SP being 1.6 $(MPa)^{1/2}$. Thus, the combination of polyhexamethylene dodecamide (polyamide 612, SP: 24.1) or polynonamethylene azelamide (polyamide 99, SP: 24.1) as the polyamide (A1) with poly(caproamide/hexamethylene sebacamide) copolymer (polyamide 6/610=38.1/61.9 mol %, SP: 25.7) as the polyamide (A2) falls outside the scope of the present invention.

On the other hand, when the poly(caproamide/hexamethylene sebacamide) copolymer (polyamide 6/610=38.1/61.9 mol %) is used together with polydodecanamide (polyamide 12, SP: 22.5) or polydodecamethylene dodecamide (polyamide 1212, SP: 22.5) having the lowest solubility parameter SP among the polyamides (A1), the requirement of the present invention is satisfied, with the difference in absolute value between their solubility parameters SP being 3.2 $(MPa)^{1/2}$. Thus, the combination of polydodecanamide (polyamide 12, SP: 22.5) or polydodecamethylene dodecamide (polyamide 1212, SP: 22.5) as the polyamide (A1) with poly(caproamide/hexamethylene sebacamide) copolymer (polyamide 6/610=38.1/61.9 mol %, SP: 25.7) as the polyamide (A2) falls within the scope of the present invention.

Similarly, the solubility parameter SP of poly(caproamide/dodecanamide) copolymer (polyamide 6/12) as the polyamide (A2) is variable depending on the molar ratio of the structural repeating units. The solubility parameter SP of polycaproamide (polyamide 6) is 26.9 $(MPa)^{1/2}$, and the solubility parameter SP of polydodecanamide (polyamide 12) is 22.5 $(MPa)^{1/2}$. Provided that the molar ratio of the structural repeating units is known, the solubility parameter of the copolymer can be calculated. If the caproamide units/dodecanamide units is 80:20 (by mass) and 87.5:12.5 (by mol), the solubility parameter SP is 26.9×0.875+22.5×0.125=26.4 $(MPa)^{1/2}$.

When this poly(caproamide/dodecanamide) copolymer (polyamide 6/12=87.5/12.5 mol %) is used together with polyhexamethylene dodecamide (polyamide 612, SP: 24.1) or polynonamethylene azelamide (polyamide 99, SP: 24.1) having the highest solubility parameter SP among the polyamides (A1), the requirement of the present invention is satisfied, with the difference in absolute value between their solubility parameters SP being 2.3 $(MPa)^{1/2}$. Thus, the combination of polyhexamethylene dodecamide (polyamide 612, SP: 24.1) or polynonamethylene azelamide (polyamide 99, SP: 24.1) as the polyamide (A1) with poly(caproamide/dodecanamide) copolymer (polyamide 6/12=87.5/12.5 mol %, SP: 26.4) as the polyamide (A2) falls within the scope of the present invention.

When the poly(caproamide/dodecanamide) copolymer (polyamide 6/12=87.5/12.5 mol %) is used together with polydodecanamide (polyamide 12, SP: 22.5) or polydodecamethylene dodecamide (polyamide 1212, SP: 22.5) having the lowest solubility parameter SP among the polyamides (A1), the requirement of the present invention is satisfied, with the difference in absolute value between their solubility parameters SP being 3.9 $(MPa)^{1/2}$. Thus, the combination of polydodecanamide (polyamide 12, SP: 22.5) or polydodecamethylene dodecamide (polyamide 1212, SP: 22.5) as the polyamide (A1) with poly(caproamide/dodecanamide) copolymer (polyamide 6/12=87.5/12.5 mol %, SP: 26.4) as the polyamide (A2) falls within the scope of the present invention.

Next, if poly(caproamide/dodecanamide) copolymer (polyamide 6/12) has caproamide units/dodecanamide units in 60:40 (by mass) and 72.3/27.7 (by mol), the solubility parameter SP is 26.9×0.723+22.5×0.277=25.7 $(MPa)^{1/2}$.

When this poly(caproamide/dodecanamide) copolymer (polyamide 6/12=72.3/27.7 mol %) is used together with polyhexamethylene dodecamide (polyamide 612, SP: 24.1) or polynonamethylene azelamide (polyamide 99, SP: 24.1) having the highest solubility parameter SP among the polyamides (A1), the requirement of the present invention is not satisfied, with the difference in absolute value between their solubility parameters SP being 1.6 $(MPa)^{1/2}$. Thus, the combination of polyhexamethylene dodecamide (polyamide 612, SP: 24.1) or polynonamethylene azelamide (polyamide 99, SP: 24.1) as the polyamide (A1) with poly(caproamide/dodecanamide) copolymer (polyamide 6/12=72.3/27.7 mol %, SP: 25.7) as the polyamide (A2) falls outside the scope of the present invention.

On the other hand, when the poly(caproamide/dodecanamide) copolymer (polyamide 6/12=72.3/27.7 mol %) is used together with polydodecanamide (polyamide 12, SP: 22.5) or polydodecamethylene dodecamide (polyamide 1212, SP: 22.5) having the lowest solubility parameter SP among the polyamides (A1), the requirement of the present invention is satisfied, with the difference in absolute value between their solubility parameters SP being 3.2 $(MPa)^{1/2}$. Thus, the combination of polydodecanamide (polyamide 12, SP: 22.5) or polydodecamethylene dodecamide (polyamide 1212, SP: 22.5) as the polyamide (A1) with poly(caproamide/dodecanamide) copolymer (polyamide 6/12=72.3/27.7 mol %, SP: 25.7) as the polyamide (A2) falls within the scope of the present invention.

The alicyclic polyamide or semi-aromatic polyamide as the polyamide (A2) is not limited as long as the difference in absolute value between its solubility parameter SP and that of the polyamide (A1) is not less than 1.8 $(MPa)^{1/2}$ and not more than 5.5 $(MPa)^{1/2}$. Examples of the alicyclic polyamides or semi-aromatic polyamides which satisfy this include (the unit for SP below is $(MPa)^{1/2}$) polymetaxylylene glutamide (polyamide MXD5, SP: 29.4), polymetaxylylene adipamide (polyamide MXD6, SP: 28.6), polytetramethylene terephthalamide (polyamide 4T, SP: 29.4), polytetramethylene isophthalamide (polyamide 4I, SP: 29.4), polytetramethylene hexahydroterephthalamide (polyamide 4T(H), SP: 27.1), polypentamethylene terephthalamide (polyamide 5T, SP: 28.6), polypentamethylene isophthalamide (polyamide 5I, SP: 28.6), polypentamethylene hexahydroterephthalamide (polyamide 5T(H), SP: 26.4), polyhexamethylene terephthalamide (polyamide 6T, SP: 27.8), polyhexamethylene isophthalamide (polyamide 6I, SP: 27.8), polyhexamethylene hexahydroterephthalamide (polyamide 6T(H), SP: 25.9), poly(2-methylpentamethyleneterephthalamide) (polyamide M5T, SP: 28.0), poly(2-methylpentamethylene isophthalamide) (polyamide M5I, SP: 28.0), poly(2-methylpentamethylene hex ahydroterephthalamide) (polyamide M5T(H), SP: 26.0), and/or copolymers constituted by a plurality of monomers selected from the monomers constituting these polyamides, and/or copolymers constituted by a plurality of monomers selected from the monomers constituting the polyamides (A1) described hereinabove. As long as the difference in absolute value from the solubility parameter SP of the polyamide (A1) is in the range of the present invention, semi-aromatic polyamides (B1) or semi-aromatic polyamides (B2) described later may be used similarly.

From the points of view of availability and economic efficiency and also for the purpose of ensuring that the obtainable multilayer tube will attain sufficient properties such as mechanical characteristics and chemical resistance, the polyamide (A2) is preferably at least one homopolymer selected from the group consisting of polycaproamide (polyamide 6), polyhexamethylene adipamide (polyamide 66), polyhexamethylene azelamide (polyamide 69), polyhexamethylene sebacamide (polyamide 610), polyhexamethylene terephthalamide (polyamide 6T), polyhexamethylene isophthalamide (polyamide 6I) and polymetaxylylene adipamide (polyamide MXD6), and/or a copolymer constituted by a plurality of monomers selected from the monomers constituting the above homopolymers, or a copolymer which is based on a monomer selected from the monomers constituting at least one polymer selected from the group consisting of polycaproamide (polyamide 6), polyhexamethylene adipamide (polyamide 66), polyhexamethylene azelamide (polyamide 69), polyhexamethylene sebacamide (polyamide 610), polyhexamethylene terephthalamide (polyamide 6T), polyhexamethylene isophthalamide (polyamide 6I) and polymetaxylylene adipamide (polyamide MXD6) and which includes a plurality of monomers selected from the monomers constituting at least one selected from the group consisting of polyhexamethylene dodecamide (polyamide 612), polynonamethylene dodecamide (polyamide 912), polydecamethylene sebacamide (polyamide 1010), polydecamethylene dodecamide (polyamide 1012), polydodecamethylene dodecamide (polyamide 1212), polyundecanamide (polyamide 11) and polydodecanamide (polyamide 12). Besides those described hereinabove, more preferred polyamides (A2) are polymetaxylylene adipamide (polyamide MXD6), poly(metaxylylene adipamide/hexamethylene isophthalamide) copolymer (polyamide MXD6/6I), poly(metaxylylene adipamide/caproamide) copolymer (polyamide MXD6/6), poly(metaxylylene adipamide/hexamethylene sebacamide) copolymer (polyamide MXD6/610), poly(metaxylylene adipamide/hexamethylene dodecamide) copolymer (polyamide MXD6/612), poly(hexamethylene terephthalamide/hexamethylene isophthalamide) copolymer (polyamide 6T/6I), poly(hexamethylene terephthalamide/hexamethylene adipamide) copolymer (polyamide 6T/66), poly(hexamethylene terephthalamide/hexamethylene isophthalamide/hexamethylene adipamide) copolymer (polyamide 6T/6I/66), poly(hexamethylene terephthalamide/caproamide) copolymer (polyamide 6T/6), poly(hexamethylene terephthalamide/hexamethylene sebacamide) copolymer (polyamide 6T/610) and poly(hexamethylene terephthalamide/hexamethylene dodecamide) copolymer (polyamide 6T/612). To ensure stability during melt mixing with the polyamide (A1) and to obtain good and sufficiently interlayer adhesion and durability thereof with respect to the semi-aromatic polyamide composition (B) described later, poly(hexamethylene terephthalamide/hexamethylene isophthalamide) copolymer (polyamide 6T/6I), poly(hexamethylene terephthalamide/hexamethylene sebacamide) copolymer (polyamide 6T/610) and poly(hexamethylene terephthalamide/hexamethylene dodecamide) copolymer (polyamide 6T/612) are more preferable, and poly(hexamethylene terephthalamide/hexamethylene isophthalamide) copolymer (polyamide 6T/6I) which is an amorphous polyamide is particularly preferable. By the amorphous polyamide, it is meant that an endothermic curve of the polyamide measured with a differential scanning calorimeter is not distinguished from base changes and no distinct melting point is observed.

The solubility parameter SP of poly(hexamethylene terephthalamide/hexamethylene isophthalamide) copolymer (polyamide 6T/6I), which is a more preferred polyamide (A2), is 27.8 $(MPa)^{1/2}$ irrespective of the mass ratio and molar ratio of the structural repeating units because the solubility parameter SP of polyhexamethylene terephthalamide (polyamide 6T) and that of polyhexamethylene isophthalamide (polyamide 6I) are 27.8 $(MPa)^{1/2}$.

When polyhexamethylene dodecamide (polyamide 612, SP: 24.1) or polynonamethylene azelamide (polyamide 99, SP: 24.1) having the highest solubility parameter SP among the polyamides (A1) is selected, poly(hexamethylene terephthalamide/hexamethylene isophthalamide) copolymer (polyamide 6T/6I) of which the solubility parameter SP is 27.8 $(MPa)^{1/2}$ irrespective of the mass ratio and molar ratio of the structural repeating units satisfies the requirement of the present invention, with the difference in absolute value between their solubility parameters SP being 3.7 $(MPa)^{1/2}$. Thus, the combination of polyhexamethylene dodecamide (polyamide 612, SP: 24.1) or polynonamethylene azelamide (polyamide 99, SP: 24.1) as the polyamide (A1) with poly(hexamethylene terephthalamide/hexamethylene isophthalamide) copolymer (polyamide 6T/6I, SP: 27.8) as the polyamide (A2) falls within the scope of the present invention. When polydodecanamide (polyamide 12, SP: 22.5) or polydodecamethylene dodecamide (polyamide 1212, SP: 22.5) having the lowest solubility parameter SP among the polyamides (A1) is selected, poly(hexamethylene terephthalamide/hexamethylene isophthalamide) copolymer (polyamide 6T/6I) of which the SP is 27.8 $(MPa)^{1/2}$ irrespective of the mass ratio and molar ratio of the structural repeating units satisfies the requirement of the present invention, with the difference in absolute value between their solubility parameters SP being 5.3 $(MPa)^{1/2}$. Thus, the combination of polydodecanamide (polyamide 12, SP: 22.5) or polydodecamethylene dodecamide (polyamide 1212, SP: 22.5) as the polyamide (A1) with poly(hexamethylene terephthalamide/hexamethylene isophthalamide) copolymer (polyamide 6T/6I, SP: 27.8) as the polyamide (A2) falls within the scope of the present invention.

The polyamide (A1) and the polyamide (A2) may be produced using a known polyamide production apparatus such as a batch reaction vessel, a one-tank or multi-tank continuous reaction apparatus, a tubular continuous reaction apparatus, or a kneading reaction extruder such as a single-screw kneading extruder or a twin-screw kneading extruder. The polymerization may be performed by a known method such as melt polymerization, solution polymerization or solid phase polymerization at atmospheric pressure or while repeating pressure decreasing and increasing operations. These polymerization methods may be used singly or may be combined appropriately.

To ensure mechanical properties of the obtainable multilayer tube and to control the melt viscosity to an appropriate range so as to attain desired formability into the multilayer tube, the relative viscosity of the polyamides (A1) and (A2) measured at 96% sulfuric acid, 1% polymer concentration and 25° C. in accordance with JIS K-6920 is preferably not less than 1.5 and not more than 5.0, and more preferably not less than 1.8 and not more than 4.5.

To ensure good and sufficiently interlayer adhesion and durability thereof with respect to the semi-aromatic polyamide composition (B) described later, it is preferable that [A]>[B]+10 wherein [A] is the concentration (μeq/g) of terminal amino groups and [B] is the concentration (μeq/g) of terminal carboxyl groups, per 1 g of each of the polyamide (A1) and the polyamide (A2) in the aliphatic polyamide composition (A). More preferably, [A]>[B]+15, and still more preferably [A]>[B]+20. To ensure the melt stability of the polyamides and to suppress the occurrence of gels, [A] is preferably [A]>30, and more preferably 30<[A]<140.

The concentration [A](μeq/g) of terminal amino groups may be measured by dissolving the polyamide into phenol/methanol mixed solution and titrating the solution with 0.05 N hydrochloric acid. The concentration [B](μeq/g) of terminal carboxyl groups may be measured by dissolving the polyamide into benzyl alcohol and titrating the solution with a 0.05 N sodium hydroxide solution.

The polyamide (A1) and the polyamide (A2) may be produced by polymerizing or copolymerizing the polyamide raw materials described hereinabove in the presence of an amine by a known method such as melt polymerization, solution polymerization or solid phase polymerization. Alternatively, a polymer obtained by polymerization may be melt kneaded in the presence of an amine. While the amine may be added at any stage of the polymerization or at any stage of the melt kneading after polymerization, the addition preferably takes place during the polymerization in light of the interlayer adhesion of the multilayer tube.

Examples of the amines include monoamines, diamines, triamines and polyamines. As long as the concentrations of terminal groups described above are satisfied, carboxylic acids such as monocarboxylic acids, dicarboxylic acids and tricarboxylic acids may be added as required in addition to the amines. The amine and the carboxylic acid may be added at the same time or separately. The amines and the carboxylic acids, examples being listed below, may be used singly, or two or more may be used in combination.

Specific examples of the monoamines which may be added include aliphatic monoamines such as methylamine, ethylamine, propylamine, butylamine, pentylamine, hexylamine, heptylamine, octylamine, 2-ethylhexylamine, nonylamine, decylamine, undecylamine, dodecylamine, tridecylamine, tetradecylamine, pentadecylamine, hexadecylamine, octadecylamine, octadecyleneamine, eicosylamine and docosylamine; alicyclic monoamines such as cyclohexylamine and methylcyclohexylamine; aromatic monoamines such as benzylamine and β-phenylmethylamine; symmetric secondary amines such as N,N-dimethylamine, N,N-diethylamine, N,N-dipropylamine, N,N-dibutylamine, N,N-dihexylamine and N,N-dioctylamine; and mixed secondary amines such as N-methyl-N-ethylamine, N-methyl-N-butylamine, N-methyl-N-dodecylamine, N-methyl-N-octadecylamine, N-ethyl-N-hexadecylamine, N-ethyl-N-octadecylamine, N-propyl-N-hexadecyl amine and N-propyl-N-benzylamine. These may be used singly, or two or more may be used in combination.

Specific examples of the diamines which may be added include aliphatic diamines such as 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 2-methyl-1,5-pentanediamine, 3-methyl-1,5-pentanediamine, 2-methyl-1,8-octanediamine, 2,2,4-trimethyl-1,6-hexanediamine, 2,4,4-trimethyl-1,6-hexanediamine and 5-methyl-1,9-nonanediamine; alicyclic diamines such as 1,3-bis(aminomethyl)cyclohexane, 1,4-bis(aminomethyl)cyclohexane, bis(4-aminocyclohexyl)methane, 2,2-bis(4-aminocyclohexyl)propane, bis(3-methyl-4-aminocyclohexyl)methane, 2,2-bis(3-methyl-4-aminocyclohexyl)propane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, 2,5-bis(aminomethyl)norbornane, 2,6-bis(aminomethyl)norbornane, 3,8-bis(aminomethyl)tricyclodecane and 4,9-bis(aminomethyl)tricyclodecane; and aromatic diamines such as m-xylylenediamine and p-xylylenediamine. These may be used singly, or two or more may be used in combination.

Specific examples of the triamines which may be added include 1,2,3-triaminopropane, 1,2,3-triamino-2-methylpropane, 1,2,4-triaminobutane, 1,2,3,4-tetraminobutane, 1,3,5-triaminocyclohexane, 1,2,4-triaminocyclohexane, 1,2,3-triaminocyclohexane, 1,2,4,5-tetraminocyclohexane, 1,3,5-triaminobenzene, 1,2,4-triaminobenzene, 1,2,3-triaminobenzene, 1,2,4,5-tetraminobenzene, 1,2,4-triaminonaphthalene, 2,5,7-triaminonaphthalene, 2,4,6-triaminopyridine, 1,2,7,8-tetraminonaphthalene and 1,4,5,8-tetraminonaphthalene. These may be used singly, or two or more may be used in combination.

The polyamines which may be added are compounds having a plurality of primary amino groups ($-NH_2$) and/or secondary amino groups ($-NH-$). Examples include polyalkyleneimines, polyalkylenepolyamines, polyvinylamines and polyallylamines. The amino groups with active hydrogen are reaction sites of the polyamines.

The polyalkyleneimines are produced by, for example, ionic polymerization of an alkyleneimine such as ethyleneimine and/or propyleneimine, or by polymerization of an alkyloxazoline followed by partial or complete hydrolysis of the polymer. Examples of the polyalkylenepolyamines include diethylenetriamine, triethylenetetramine, pentaethylenehexamine, and reaction products of ethylenediamine with polyfunctional compounds. The polyvinylamines are obtained by, for example, polymerizing N-vinylformamide into poly(N-vinylformamide) followed by partial or complete hydrolysis of the polymer with an acid such as hydrochloric acid. The polyallylamines are generally obtained by polymerizing a hydrochloride salt of an allylamine monomer followed by the removal of hydrochloric acid. These may be used singly, or two or more may be used in combination. In particular, polyalkyleneimines are preferable.

Examples of the polyalkyleneimines include homopolymers and/or copolymers obtained by polymerizing one, or two or more $C_{2-8}$ alkyleneimines such as ethyleneimine, propyleneimine, 1,2-butyleneimine, 2,3-butyleneimine and 1,1-dimethylethyleneimine by a common method. In particular, polyethyleneimine is more preferable. The polyalkyleneimines may be any of branched polyalkyleneimines obtained by ring-opening polymerization of alkyleneimines as raw materials and containing primary amines, secondary amines and tertiary amines, linear polyalkyleneimines obtained by polymerization of alkyloxazolines as raw materials and containing only primary amines and secondary amines, and three-dimensionally crosslinked structures. Further, the polyalkyleneimines may contain moieties such as ethylenediamine, propylenediamine, diethylenetriamine, triethylenetetramine, tetraethylenepentamine, dipropylenetriamine, tripropylenetetramine, dihexamethylenetriamine, aminopropylethylenediamine and bisaminopropylethylenediamine. The polyalkyleneimines usually have tertiary amino groups arising from the reactivity of the active hydrogen atoms on the nitrogen atoms present in the polyalkyleneimines, and also have primary amino groups and/or secondary amino groups (imino groups) having an active hydrogen atom.

The number of nitrogen atoms in the polyalkyleneimine is not particularly limited, but is preferably not less than 4 and not more than 3,000, more preferably not less than 8 and not more than 1,500, and still more preferably not less than 11 and not more than 500. The number average molecular weight of the polyalkyleneimine is preferably not less than 100 and not more than 20,000, more preferably not less than 200 and not more than 10,000, and still more preferably not less than 500 and not more than 8,000.

Examples of the carboxylic acids which may be added include aliphatic monocarboxylic acids such as acetic acid, propionic acid, butyric acid, valeric acid, caproic acid, enanthic acid, caprylic acid, capric acid, pelargonic acid, undecanoic acid, lauric acid, tridecanoic acid, myristic acid, myristoleic acid, palmitic acid, stearic acid, oleic acid, linoleic acid, arachidic acid, behenic acid and erucic acid; alicyclic monocarboxylic acids such as cyclohexanecarboxylic acid and methylcyclohexanecarboxylic acid; aromatic monocarboxylic acids such as benzoic acid, toluic acid, ethylbenzoic acid and phenylacetic acid; aliphatic dicarboxylic acids such as malonic acid, succinic acid, glutaric acid, adipic acid, pimelic acid, suberic acid, azelaic acid, sebacic acid, undecanedioic acid, dodecanedioic acid, hexadecanedioic acid, hexadecenedioic acid, octadecanedioic acid, octadecenedioic acid, eicosanedioic acid, eicosenedioic acid, docosanedioic acid, diglycolic acid, 2,2,4-trimethyladipic acid and 2,4,4-trimethyladipic acid; alicyclic dicarboxylic acids such as 1,3-cyclohexanedicarboxylic acid, 1,4-cyclohexanedicarboxylic acid and norbornanedicarboxylic acid; aromatic dicarboxylic acids such as terephthalic acid, isophthalic acid, phthalic acid, m-xylylenedicarboxylic acid, p-xylylenedicarboxylic acid, 1,4-naphthalenedicarboxylic acid, 2,6-naphthalenedicarboxylic acid and 2,7-naphthalenedicarboxylic acid; and tricarboxylic acids such as 1,2,4-butanetricarboxylic acid, 1,3,5-pentanetricarboxylic acid, 1,2,6-hexanetricarboxylic acid, 1,3,6-hexanetricarboxylic acid, 1,3,5-cyclohexanetricarboxylic acid and trimesic acid. These may be used singly, or two or more may be used in combination.

The amount in which the amine is added is determined appropriately in a known manner in consideration of the concentrations of terminal amino groups and of terminal carboxyl groups in the polyamide (A1) and the polyamide (A2) that are to be produced, and also the relative viscosity thereof. To ensure sufficient reactivity and to facilitate the production of polyamides having a desired viscosity, it is usually preferable that the amount of the amine be not less than 0.5 meq/mol and not more than 20 meq/mol, and more preferably not less than 1 meq/mol and not more than 10 meq/mol per 1 mol of the polyamide raw material (1 mol of the monomer or monomer units constituting the repeating units). (One equivalent (eq) of the amino group indicates the amount of the amino group that reacts with the carboxyl group in 1:1 to form the amide group.)

Of the amines described above, a diamine and/or a polyamine is preferably added during polymerization in order to ensure that the polyamide (A1) and the polyamide (A2) will satisfy the concentrations of the terminal groups. To suppress the occurrence of gels, it is more preferable that at least one selected from the group consisting of aliphatic diamines, alicyclic diamines and polyalkyleneimines be added during polymerization.

The aliphatic polyamide composition (A) includes an elastomer polymer (A3) which contains a structural unit derived from an unsaturated compound having a carboxyl group and/or an acid anhydride group (hereinafter, this component will be sometimes written as the elastomer polymer (A3)).

Examples of the elastomer polymers (A3) include (ethylene and/or propylene)/α-olefin copolymers, (ethylene and/or propylene)/(α,β-unsaturated carboxylate ester) copolymers, and aromatic vinyl compound/conjugated diene compound block copolymers. These may be used singly, or two or more may be used in combination.

The (ethylene and/or propylene)/α-olefin copolymers are polymers obtained by copolymerizing ethylene and/or propylene with an α-olefin having 3 or more carbon atoms. Examples of the α-olefins having 3 or more carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. These may be used singly, or two or more may be used in combination. Further, the copolymerization may involve polyenes of nonconjugated dienes such as 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, cyclooctadiene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene and 2-propenyl-2,5-norbornadiene. These may be used singly, or two or more may be used in combination.

The (ethylene and/or propylene)/(α,β-unsaturated carboxylate ester) copolymers are polymers obtained by copolymerizing ethylene and/or propylene with an α,β-unsaturated carboxylate ester monomer. Examples of the α,β-unsaturated carboxylate ester monomers include methyl acrylate, methyl methacrylate, ethyl acrylate, ethyl methacrylate, propyl acrylate, propyl methacrylate, butyl acrylate, butyl methacrylate, pentyl acrylate, pentyl methacrylate, hexyl acrylate, hexyl methacrylate, heptyl acrylate, heptyl methacrylate, octyl acrylate, octyl methacrylate, nonyl acrylate, nonyl methacrylate, decyl acrylate, decyl methacrylate, 2-ethylhexyl acrylate, 2-ethylhexyl methacrylate, hydroxyethyl acrylate, hydroxyethyl methacrylate, monomethyl maleate, monomethyl itaconate, dimethyl maleate and dimethyl itaconate. These may be used singly, or two or more may be used in combination.

The aromatic vinyl compound/conjugated diene compound block copolymers are block copolymers composed of an aromatic vinyl compound polymer block and a conjugated diene compound polymer block. Those block copolymers having at least one aromatic vinyl compound polymer block and at least one conjugated diene compound polymer block are used. In the block copolymers, an unsaturated bond in the conjugated diene compound polymer block may be hydrogenated.

The aromatic vinyl compound polymer block is a polymer block principally composed of units derived from an aromatic vinyl compound. Examples of the aromatic vinyl compounds include styrene, o-methylstyrene, m-methylstyrene, p-methylstyrene, 1,5-dimethylstyrene, 2,4-dimethylstyrene, vinylnaphthalene, vinylanthracene, 4-propylstyrene, 4-cyclohexylstyrene, 4-dodecylstyrene, 2-ethyl-4-benzylstyrene and 4-(phenylbutyl)styrene. These may be used singly, or two or more may be used in combination. In some cases, the aromatic vinyl compound polymer block may have a small amount of units derived from other unsaturated monomer.

The conjugated diene compound polymer block is a polymer block that is formed from one, or two or more conjugated diene compounds such as 1,3-butadiene, chloroprene, isoprene, 2,3-dimethyl-1,3-butadiene, 1,3-pentadiene, 4-methyl-1,3-pentadiene and 1,3-hexadiene. In the case of a hydrogenated form of the aromatic vinyl compound/ conjugated diene compound block copolymer, the unsaturated bonds in the conjugated diene compound polymer block have been partially or totally hydrogenated and are in the form of saturated bonds.

The molecular structures of the aromatic vinyl compound/ conjugated diene compound block copolymers and hydrogenated products thereof may be any of linear, branched and radial structures and combinations of such structures. Of these structures, the aromatic vinyl compound/conjugated diene compound block copolymer and/or the hydrogenated product thereof is preferably one, or two or more of diblock copolymers in which one aromatic vinyl compound polymer block and one conjugated diene compound polymer block are bonded linearly to each other, triblock copolymers in which three polymer blocks are bonded linearly in the order of aromatic vinyl compound polymer block-conjugated diene compound polymer block-aromatic vinyl compound polymer block, and hydrogenated products of these polymers, with examples including unhydrogenated or hydrogenated styrene/butadiene block copolymer, unhydrogenated or hydrogenated styrene/isoprene block copolymer, unhydrogenated or hydrogenated styrene/butadiene/styrene block copolymer, unhydrogenated or hydrogenated styrene/isoprene/styrene block copolymer, unhydrogenated or hydrogenated styrene/(ethylene/butadiene)/styrene block copolymer, and unhydrogenated or hydrogenated styrene/ (isoprene/butadiene)/styrene block copolymer.

Examples of the unsaturated compounds with a carboxyl group for forming structural units in the elastomer polymer (A3) include α,β-unsaturated carboxylic acids such as acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid, endobicyclo-[2.2.1]-5-heptene-2,3-dicarboxylic acid, and metal salts of these carboxylic acids. Examples of the unsaturated compounds with an acid anhydride group include dicarboxylic anhydrides having α,β-unsaturated bonds such as maleic anhydride, itaconic anhydride, citraconic anhydride and endobicyclo-[2.2.1]-5-heptene-2,3-dicarboxylic anhydride. These may be used singly, or two or more may be used in combination. Of these, dicarboxylic anhydrides having α,β-unsaturated bonds are preferable, and maleic anhydride and itaconic anhydride are more preferable.

To attain an improvement in low-temperature impact resistance and good and sufficiently interlayer adhesion and durability thereof with the semi-aromatic polyamide composition (B) described later and also from the point of view of the fluidity of the obtainable aliphatic polyamide composition (A), the concentration of carboxyl groups and/or acid anhydride groups in the elastomer polymer (A3) is preferably not less than 25 μeq/g and not more than 200 μeq/g, and more preferably not less than 50 μeq/g and not more than 150 μeq/g.

The concentration of carboxyl groups and/or acid anhydride groups in the elastomer polymer (A3) may be determined by dissolving the elastomer polymer into a toluene solution, adding ethanol thereto, and titrating the resultant sample solution with a 0.1 N KOH ethanol solution using phenolphthalein as an indicator.

The content of the polyamide (A1) in the aliphatic polyamide composition (A) is not less than 40% by mass and not more than 90% by mass relative to the aliphatic polyamide composition (A) taken as 100% by mass, and is preferably not less than 50% by mass and not more than 86% by mass, and more preferably not less than 60% by mass and not more than 84% by mass. If the content of the polyamide (A1) is below this range, the multilayer tube that is obtained sometimes exhibits poor mechanical characteristics. If the content is above the range, the interlayer adhesion and durability thereof of the multilayer tube that is obtained are sometimes deteriorated.

The content of the polyamide (A2) in the aliphatic polyamide composition (A) is not less than 5% by mass and not more than 30% by mass relative to the aliphatic polyamide composition (A) taken as 100% by mass, and is preferably not less than 7% by mass and not more than 25% by mass, and more preferably not less than 8% by mass and not more than 20% by mass. If the content of the polyamide (A2) is below this range, the interlayer adhesion and durability thereof of the multilayer tube that is obtained are sometimes deteriorated. If the content is above the range, the multilayer tube that is obtained sometimes exhibits poor mechanical characteristics and chemical resistance.

The content of the elastomer polymer (A3) in the aliphatic polyamide composition (A) is not less than 5% by mass and not more than 30% by mass relative to the aliphatic polyamide composition (A) taken as 100% by mass, and is preferably not less than 7% by mass and not more than 25% by mass, and more preferably not less than 8% by mass and not more than 20% by mass. If the content of the elastomer polymer (A3) is below this range, the multilayer tube that is obtained sometimes exhibits poor low-temperature impact resistance, and low interlayer adhesion and durability thereof. If the content is above the range, the multilayer tube that is obtained sometimes exhibits poor mechanical characteristics and also the fluidity of the aliphatic polyamide composition that is obtained is sometimes deteriorated.

The polyamide (A1), the polyamide (A2) and the elastomer polymer (A3) may be mixed in any manner without limitation, and the mixing may be accomplished by any of various known methods using additives as required. For example, pellets of the polyamide (A1), the polyamide (A2) and the elastomer polymer (A3) may be dry blended homogeneously using a tumbler or a mixer so that the respective proportions in the mixture will be as described above, or the components may be dry blended, optionally together with other components, in predetermined concentrations which will be used for the forming process, and the blend may be melt kneaded. The melt kneading may be performed with a kneading apparatus such as a single-screw extruder, a twin-screw extruder, a kneader or a Banbury mixer.

The aliphatic polyamide composition (A) may be a mixture with additional thermoplastic resins. The content of the total of the polyamide (A1), the polyamide (A2) and the elastomer polymer (A3) in the aliphatic polyamide composition (A) is preferably not less than 80% by mass, and more preferably not less than 90% by mass.

Examples of the additional thermoplastic resins which may be mixed include polyolefin resins such as high density polyethylene (HDPE), medium density polyethylene (MDPE), low density polyethylene (LDPE), linear low density polyethylene (LLDPE), ultrahigh molecular weight polyethylene (UHMWPE), polypropylene (PP), polybutene (PB), polymethylpentene (TPX), ethylene/propylene copolymer (EPR), ethylene/butene copolymer (EBR), ethylene/ vinyl acetate copolymer (EVA), ethylene/acrylic acid copolymer (EAA), ethylene/methacrylic acid copolymer (EMAA), ethylene/methyl acrylate copolymer (EMA), ethylene/methyl methacrylate copolymer (EMMA) and ethylene/ethyl acrylate copolymer (EEA); polystyrene resins such as polystyrene (PS), syndiotactic polystyrene (SPS), methyl methacrylate/styrene copolymer (MS), methyl methacrylate/styrene/butadiene copolymer (MBS), styrene/butadiene copolymer (SBR), styrene/isoprene copolymer (SIR), styrene/isoprene/butadiene copolymer (SIBR), styrene/butadiene/styrene copolymer (SBS), styrene/isoprene/styrene copolymer (SIS), styrene/ethylene/butylene/styrene copolymer (SEBS) and styrene/ethylene/propylene/styrene copolymer (SEPS); the polyolefin resins and the polystyrene resins described above which are modified by the introduction of functional groups such as carboxyl groups and salts thereof, acid anhydride groups and epoxy groups; polyester resins such as polybutylene terephthalate (PBT), polyethylene terephthalate (PET), polyethylene isophthalate (PEI), poly(ethylene terephthalate/ethylene isophthalate) copolymer (PET/PEI), polytrimethylene terephthalate (PTT), polycyclohexanedimethylene terephthalate (PCT), polyethylene naphthalate (PEN), polybutylene naphthalate (PBN), polyarylate (PAR), liquid crystal polyester (LCP), polylactic acid (PLA) and polyglycolic acid (PGA); polyether resins such as polyacetal (POM) and polyphenylene ether (PPO); polysulfone resins such as polysulfone (PSU), polyethersulfone (PESU) and polyphenylsulfone (PPSU); polythioether resins such as polyphenylene sulfide (PPS) and polythioether sulfone (PTES); polyketone resins such as polyketone (PK), polyetherketone (PEK), polyetheretherketone (PEEK), polyetherketoneketone (PEKK), polyetheretheretherketone (PEEEK), polyetheretherketoneketone (PEEKK), polyetherketoneketoneketone (PEKKK) and polyetherketoneetherketoneketone (PEKEKK); polynitrile resins such as polyacrylonitrile (PAN), polymethacrylonitrile, acrylonitrile/styrene copolymer (AS), methacrylonitrile/styrene copolymer, acrylonitrile/butadiene/styrene copolymer (ABS) and acrylonitrile/butadiene copolymer (NBR); polymethacrylate resins such as polymethyl methacrylate (PMMA) and polyethyl methacrylate (PEMA); polyvinyl resins such as polyvinyl alcohol (PVA), polyvinylidene chloride (PVDC), polyvinyl chloride (PVC), vinyl chloride/vinylidene chloride copolymer and vinylidene chloride/methyl acrylate copolymer; cellulose resins such as cellulose acetate and cellulose butyrate; polycarbonate resins such as polycarbonate (PC); polyimide resins such as thermoplastic polyimide (TPI), polyetherimide, polyesterimide, polyamide-imide (PAI) and polyesteramide-imide; thermoplastic polyurethane resins; and polyamide elastomers, polyurethane elastomers and polyester elastomers. In some cases, examples further include fluororesins such as polyvinylidene fluoride (PVDF), polyvinyl fluoride (PVF), polytetrafluoroethylene (PTFE), polychlorofluoroethylene (PCTFE), tetrafluoroethylene/ethylene copolymer (ETFE), ethylene/chlorotrifluoroethylene copolymer (ECTFE), tetrafluoroethylene/hexafluoropropylene copolymer (FEP), tetrafluoroethylene/hexafluoropropylene/vinylidene fluoride copolymer (THV), tetrafluoroethylene/hexafluoropropylene/vinylidene fluoride/perfluoro(alkyl vinyl ether) copolymer, tetrafluoroethylene/perfluoro(alkyl vinyl ether) copolymer (PFA), tetrafluoroethylene/hexafluoropropylene/perfluoro(alkyl vinyl ether) copolymer and chlorotrifluoroethylene/perfluoro(alkyl vinyl ether)/tetrafluoroethylene copolymer (CPT). These may be used singly, or two or more may be used in combination.

Further, the aliphatic polyamide composition (A) may contain additives as required, such as antioxidants, thermal stabilizers, ultraviolet absorbers, light stabilizers, lubricants, inorganic fillers, antistatic agents, flame retardants, crystallization accelerators and colorants.

2. Layer (b)

The layer (b) in the multilayer tube includes a semi-aromatic polyamide composition (B). [Semi-aromatic polyamide composition (B)]

The semi-aromatic polyamide composition (B) includes a semi-aromatic polyamide (B1) or a semi-aromatic polyamide (B2). In the semi-aromatic polyamide composition (B), the semi-aromatic polyamide (B1) or the semi-aromatic polyamide (B2) is contained in an amount of not less than 60% by mass. The semi-aromatic polyamide (B1) includes 50 mol % or more $C_9$ or $C_{10}$ aliphatic diamine units based on all diamine units in the semi-aromatic polyamide (B1), and 50 mol % or more terephthalic acid units and/or naphthalenedicarboxylic acid units based on all dicarboxylic acid units in the semi-aromatic polyamide (B1). The semi-aromatic polyamide (B2) includes 50 mol % or more xylylenediamine units and/or bis(aminomethyl)naphthalene units based on all diamine units in the semi-aromatic polyamide (B2), and 50 mol % or more $C_9$ or $C_{10}$ aliphatic dicarboxylic acid units based on all dicarboxylic acid units in the semi-aromatic polyamide (B2). (Hereinafter, this composition will be sometimes written as the semi-aromatic polyamide composition (B)).

[Semi-Aromatic Polyamide (B1)]

In an embodiment, the semi-aromatic polyamide composition (B) includes a semi-aromatic polyamide (B1). (Hereinafter, this component will be sometimes written as the semi-aromatic polyamide (B1).) The semi-aromatic polyamide (B1) contains diamine units including 50 mol % or more $C_9$ or $C_{10}$ aliphatic diamine units based on all the diamine units in the semi-aromatic polyamide (B1), and dicarboxylic acid units including 50 mol % or more terephthalic acid units and/or naphthalenedicarboxylic acid units based on all the dicarboxylic acid units in the semi-aromatic polyamide (B1).

To ensure that the multilayer tube that is obtained will attain sufficient properties such as heat resistance, chemical resistance, impact resistance and barrier properties to chemical medias, the content of the $C_9$ or $C_{10}$ aliphatic diamine units in the semi-aromatic polyamide (B1) is not less than 50 mol % based on all the diamine units in the semi-aromatic polyamide (B1), and is preferably not less than 55 mol %, and more preferably not less than 60 mol %.

Examples of the $C_9$ or $C_{10}$ aliphatic diamine units include those units derived from 1,9-nonanediamine and 1,10-decanediamine. As long as the number of carbon atoms is satisfied, the polyamide may contain units derived from branched aliphatic diamines such as 2,2,4-trimethyl-1,6-hexanediamine, 2,4,4-trimethyl-1,6-hexanediamine, 2,4-diethyl-1,6-hexanediamine, 2,2-dimethyl-heptanediamine, 2,3-dimethyl-heptanediamine, 2,4-dimethyl-heptanediamine, 2,5-dimethyl-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,2-dimethyl-1,8-octanediamine, 2,4-dimethyl-1,8-octanediamine, 3,3-dimethyl-1,8-octanediamine, 3,4-dimethyl-1,8-octanediamine, 4,4-dimethyl-1,8-octanediamine, 4,5-dimethyl-1,8-octanediamine and 5-methyl-1,9-nonanediamine. These may be used singly, or two or more may be used in combination.

Of the $C_9$ or $C_{10}$ aliphatic diamine units, those units derived from 1,9-nonanediamine, 2-methyl-1,8-octanediamine and 1,10-decanediamine are preferable from the points of view of availability and economic efficiency. When 1,9-nonanediamine and 2-methyl-1,8-octanediamine are used in combination, the molar ratio of the 1,9-nonanediamine units to the 2-methyl-1,8-octanediamine units is preferably not less than 30:70 mol % and not more than 98:2 mol % from the point of view of the balance between formability and impact resistance, and is more preferably not less than 40:60 mol % and not more than 95:5 mol %.

As long as the superior characteristics of the multilayer tube that is obtained are not impaired, the diamine units in the semi-aromatic polyamide (B 1) may include additional diamine units other than the $C_9$ or $C_{10}$ aliphatic diamine units. Examples of the additional diamine units include units derived from aliphatic diamines such as 1,2-ethanediamine, 1,3-propanediamine, 1,4-butanediamine, 1,5-pentanediamine, 1,6-hexanediamine, 1,7-heptanediamine, 1,8-octanediamine, 1,11-undecanediamine, 1,12-dodecanediamine, 1,13-tridecanediamine, 2-methyl-1,5-pentanediamine and 3-methyl-1,5-pentanediamine; units derived from alicyclic diamines such as 1,3-cyclohexanediamine, 1,4-cyclohexanediamine, 1,3-bis(aminomethyl)cyclohexane, 1,4-bis(aminomethyl)cyclohexane, bis(4-aminocyclohexyl)methane, 2,2-bis(4-aminocyclohexyl)propane, bis(3-methyl-4-aminocyclohexyl)methane, 2,2-bis(3-methyl-4-aminocyclohexyl)propane, 5-amino-2,2,4-trimethyl-1-cyclopentanemethylamine, 5-amino-1,3,3-trimethylcyclohexanemethylamine, bis(aminopropyl) piperazine, bis(aminoethyl)piperazine, 2,5-bis(aminomethyl)norbornane, 2,6-bis(aminomethyl) norbornane, 3,8-bis(aminomethyl)tricyclodecane and 4,9-bis(aminomethyl)tricyclodecane; and units derived from aromatic diamines such as m-phenylenediamine, p-phenylenediamine, m-xylylenediamine, p-xylylenediamine, 1,4-bis(aminomethyl)naphthalene, 1,5-bis(aminomethyl) naphthalene, 2,6-bis(aminomethyl)naphthalene, 2,7-bis(aminomethyl)naphthalene, 4,4'-diaminodiphenylmethane, 2,2-bis(4-aminophenyl)propane, 4,4'-diaminodiphenylsulfone and 4,4'-diaminodiphenyl ether. These may be used singly, or two or more may be used in combination. The content of these additional diamine units is less than 50 mol % of all the diamine units in the semi-aromatic polyamide (B1), and is preferably not more than 45 mol %, and more preferably not more than 40 mol %.

To ensure that the multilayer tube that is obtained will attain sufficient properties such as heat resistance, chemical resistance and barrier properties to chemical medias, the content of the terephthalic acid units and/or the naphthalenedicarboxylic acid units in the semi-aromatic polyamide (B1) is not less than 50 mol % based on all the dicarboxylic acid units in the semi-aromatic polyamide (B1), and is preferably not less than 55 mol %, and more preferably not less than 60 mol %.

Examples of the naphthalenedicarboxylic acid units include those units derived from 2,6-naphthalenedicarboxylic acid, 2,7-naphthalenedicarboxylic acid, 1,4-naphthalenedicarboxylic acid and 1,5-naphthalenedicarboxylic acid. These may be used singly, or two or more may be used in combination. Of the naphthalenedicarboxylic acid units, units derived from 2,6-naphthalenedicarboxylic acid and 2,7-naphthalenedicarboxylic acid are preferable in light of economic efficiency and availability.

As long as the superior characteristics of the multilayer tube that is obtained are not impaired, the dicarboxylic acid units in the semi-aromatic polyamide (B1) may include additional dicarboxylic acid units other than the terephthalic acid units and/or the naphthalenedicarboxylic acid units. Examples of the additional dicarboxylic acid units include units derived from aliphatic dicarboxylic acids such as malonic acid, dimethylmalonic acid, succinic acid, glutaric acid, adipic acid, 2-methyladipic acid, pimelic acid, 2,2-dimethylglutaric acid, 2,2-diethylsuccinic acid, suberic acid, azelaic acid, 2,2,4-trimethyladipic acid, 2,4,4-trimethyladipic acid, sebacic acid, undecanedioic acid, dodecanedioic acid, tridecanedioic acid, tetradecanedioic acid, pentadecanedioic acid, hexadecanedioic acid, octadecanedioic acid and eicosanedioic acid; units derived from alicyclic dicarboxylic acids such as 1,3-cyclopentanedicarboxylic acid, 1,3-cyclohexanedicarboxylic acid and 1,4-cyclohexanedicarboxylic acid; and units derived from aromatic dicarboxylic acids such as phthalic acid, isophthalic acid, 1,3-phenylenedioxydiacetic acid, 1,4-phenylenedioxydiacetic acid, 4,4'-oxydibenzoic acid, diphenylmethane-4,4'-dicarboxylic acid, diphenylethane-4,4'-dicarboxylic acid, diphenylpropane-4,4'-dicarboxylic acid, diphenyl ether-4,4'-dicarboxylic acid, diphenylsulfone-4,4'-dicarboxylic acid, 4,4'-biphenyldicarboxylic acid and 4,4'-triphenyldicarboxylic acid. These may be used singly, or two or more may be used in combination. Of these, units derived from aromatic dicarboxylic acids are preferable. The content of these additional dicarboxylic acid units is less than 50 mol % of all the dicarboxylic acid units in the semi-aromatic polyamide (B1), and is preferably not more than 45 mol %, and more preferably not more than 40 mol %. Further, polyvalent carboxylic acids such as trimellitic acid, trimesic acid and pyromellitic acid may be used as long as melt forming is feasible.

As long as the superior characteristics of the multilayer tube that is obtained are not impaired, the semi-aromatic polyamide (B1) may include additional units other than the dicarboxylic acid units and the diamine units. Examples of such additional units include units derived from lactams such as caprolactam, enantholactam, undecanelactam, dodecanelactam, α-pyrrolidone and α-piperidone; aliphatic aminocarboxylic acids such as 6-aminocaproic acid, 7-aminoheptanoic acid, 9-aminononanoic acid, 11-aminoundecanoic acid and 12-aminododecanoic acid; and units derived from aminocarboxylic acids of aromatic aminocarboxylic acids such as p-aminomethylbenzoic acid. These may be used singly, or two or more may be used in combination. The content of these additional units is preferably not more than 45 mol % of all the dicarboxylic acid units in the semi-aromatic polyamide (B1), and is more preferably not more than 40 mol %, and still more preferably not more than 35 mol %.

The semi-aromatic polyamide (B1) may be produced using a known polyamide production apparatus such as a batch reaction vessel, a one-tank or multi-tank continuous reaction apparatus, a tubular continuous reaction apparatus, or a kneading reaction extruder such as a single-screw kneading extruder or a twin-screw kneading extruder. The polymerization may be performed by a known method such as melt polymerization, solution polymerization or solid phase polymerization at atmospheric pressure or while repeating pressure decreasing and increasing operations. These polymerization methods may be used singly or may be combined appropriately.

During the production of the semi-aromatic polyamide (B1), a catalyst such as phosphoric acid, phosphorous acid, hypophosphorous acid, or a salt or ester of any of these acids may be added. Examples of the salts or esters of phosphoric acid, phosphorous acid and hypophosphorous acid include salts of phosphoric acid, phosphorous acid or hypophosphorous acid with metals such as potassium, sodium, magnesium, vanadium, calcium, zinc, cobalt, manganese, tin, tungsten, germanium, titanium and antimony, ammonium salts of phosphoric acid, phosphorous acid or hypophosphorous acid, and esters of phosphoric acid, phosphorous acid or hypophosphorous acid such as ethyl esters, isopropyl esters, butyl esters, hexyl esters, isodecyl esters, decyl esters, stearyl esters and phenyl esters. These may be used singly, or two or more may be used in combination.

[Semi-Aromatic Polyamide (B2)]

In an embodiment, the semi-aromatic polyamide composition (B) includes a semi-aromatic polyamide (B2). (Hereinafter, this component will be sometimes written as the semi-aromatic polyamide (B2).) The semi-aromatic polyamide (B2) contains diamine units including 50 mol % or more xylylenediamine units and/or bis(aminomethyl)naphthalene units based on all the diamine units in the semi-aromatic polyamide (B2), and dicarboxylic acid units including 50 mol % or more $C_9$ or $C_{10}$ aliphatic dicarboxylic acid units based on all the dicarboxylic acid units in the semi-aromatic polyamide (B2).

To ensure that the multilayer tube that is obtained will attain sufficient properties such as heat resistance, chemical resistance, impact resistance and barrier properties to chemical medias, the content of the xylylenediamine units and/or the bis(aminomethyl)naphthalene units in the semi-aromatic polyamide (B2) is not less than 50 mol % based on all the diamine units in the semi-aromatic polyamide (B2), and is preferably not less than 55 mol %, and more preferably not less than 60 mol %.

Examples of the xylylenediamine units include those units derived from o-xylylenediamine, m-xylylenediamine and p-xylylenediamine. These may be used singly, or two or more may be used in combination. Of the xylylenediamine units, those units derived from m-xylylenediamine and p-xylylenediamine are preferable.

Examples of the bis(aminomethyl)naphthalene units include those units derived from 1,4-bis(aminomethyl)naphthalene, 1,5-bis(aminomethyl)naphthalene, 2,6-bis(aminomethyl)naphthalene and 2,7-bis(aminomethyl)naphthalene. These may be used singly, or two or more may be used in combination. Of the bis(aminomethyl)naphthalene units, those units derived from 1,5-bis(aminomethyl)naphthalene and 2,6-bis(aminomethyl)naphthalene are preferable.

As long as the superior characteristics of the multilayer tube that is obtained are not impaired, the diamine units in the semi-aromatic polyamide (B2) may include additional diamine units other than the xylylenediamine units and/or the bis(aminomethyl)naphthalene units. Examples of the additional diamine units include units derived from aliphatic diamines such as 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 1,19-nonadecanediamine, 1,20-eicosanediamine, 2-methyl-1,5-pentanediamine, 3-methyl-1,5-pentanediamine, 2-methyl-1,8-octanediamine, 2,2,4-trimethyl-1,6-hexanediamine, 2,4,4-trimethyl-1,6-hexanediamine and 5-methyl-1,9-nonanediamine; units derived from alicyclic diamines such as 1,3-cyclohexanediamine, 1,4-cyclohexanediamine, 1,3-bis(aminomethyl)cyclohexane, 1,4-bis(aminomethyl)cyclohexane, bis(4-aminocyclohexyl)methane, 2,2-bis(4-aminocyclohexyl)propane, bis(3-methyl-4-aminocyclohexyl)methane, 2,2-bis(3-methyl-4-aminocyclohexyl)propane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, 2,5-bis(aminomethyl)norbornane, 2,6-bis(aminomethyl)norbornane, 3,8-bis(aminomethyl)tricyclodecane and 4,9-bis(aminomethyl)tricyclodecane; and units derived from aromatic diamines such as m-phenylenediamine, p-phenylenediamine, 4,4'-diaminodiphenylmethane, 2,2-bis(4-aminophenyl)propane, 4,4'-diaminodiphenylsulfone and 4,4'-diaminodiphenyl ether. These may be used singly, or two or more may be used in combination. Of these, those units derived from aromatic diamines are preferable. The content of these additional diamine units is less than 50 mol % of all the diamine units in the semi-aromatic polyamide (B2), and is preferably not more than 45 mol %, and more preferably not more than 40 mol %.

Examples of the $C_9$ or $C_{10}$ aliphatic dicarboxylic acid units include those units derived from azelaic acid and sebacic acid. As long as the number of carbon atoms is satisfied, the polyamide may contain units derived from branched aliphatic dicarboxylic acids such as 2,2,4-trimethyladipic acid and 2,4,4-trimethyladipic acid. These may be used singly, or two or more may be used in combination. Of the $C_9$ or $C_{10}$ aliphatic dicarboxylic acid units, those units derived from 1 sebacic acid are preferable from the points of view of availability and economic efficiency.

To ensure that the multilayer tube that is obtained will attain sufficient properties such as heat resistance, chemical resistance and barrier properties to chemical medias, the content of the $C_9$ or $C_{10}$ aliphatic dicarboxylic acid units in the semi-aromatic polyamide (B2) is not less than 50 mol % based on all the dicarboxylic acid units in the semi-aromatic polyamide (B2), and is preferably not less than 55 mol %, and more preferably not less than 60 mol %.

As long as the superior characteristics of the multilayer tube that is obtained are not impaired, the dicarboxylic acid units in the semi-aromatic polyamide (B2) may include additional dicarboxylic acid units other than the $C_9$ or $C_{10}$ aliphatic dicarboxylic acid units. Examples of the additional dicarboxylic acid units include units derived from aliphatic dicarboxylic acids such as malonic acid, dimethylmalonic acid, succinic acid, glutaric acid, adipic acid, pimelic acid, suberic acid, undecanedioic acid, dodecanedioic acid, tridecanedioic acid, tetradecanedioic acid, pentadecanedioic acid, hexadecanedioic acid, octadecanedioic acid, eicosanedioic acid, 2-methyladipic acid, 2,2-dimethylglutaric acid, 2,2-diethylsuccinic acid and 2-butylsuberic acid; units derived from alicyclic dicarboxylic acids such as 1,3-cyclopentanedicarboxylic acid, 1,3-cyclohexanedicarboxylic acid and 1,4-cyclohexanedicarboxylic acid; and units derived from aromatic dicarboxylic acids such as terephthalic acid, isophthalic acid, 1,4-naphthalenedicarboxylic acid, 1,5-naphthalenedicarboxylic acid, 2,6-naphthalenedicarboxylic acid, 2,7-naphthalenedicarboxylic acid, 1,3-phenylenedioxydiacetic acid, 1,4-phenylenedioxydiacetic acid, 4,4'-oxydibenzoic acid, diphenylmethane-4,4'-dicarboxylic acid, diphenylethane-4,4'-dicarboxylic acid, diphenylpropane-4,4'-dicarboxylic acid, diphenyl ether-4,4'-dicarboxylic acid, diphenylsulfone-4,4'-dicarboxylic acid, 4,4'-biphenyldicarboxylic acid and 4,4'-triphenyldicarboxylic acid. These may be used singly, or two or more may be used in combination. The content of these additional dicarboxylic acid units is less than 50 mol % of all the dicarboxylic acid units in the semi-aromatic polyamide (B2), and is preferably not more than 45 mol %, and more preferably not more than 40 mol %. Further, polyvalent carboxylic acids such as trimellitic acid, trimesic acid and pyromellitic acid may be used as long as melt forming is feasible.

As long as the superior characteristics of the multilayer tube that is obtained are not impaired, the semi-aromatic polyamide (B2) may include additional units other than the dicarboxylic acid units and the diamine units. Examples of such additional units include units derived from lactams such as caprolactam, enantholactam, undecanelactam, dodecanelactam, α-pyrrolidone and α-piperidone; aliphatic aminocarboxylic acids such as 6-aminocaproic acid, 7-aminoheptanoic acid, 9-aminononanoic acid, 11-aminoundecanoic acid and 12-aminododecanoic acid; and units derived from aminocarboxylic acids of aromatic aminocarboxylic acids such as p-aminomethylbenzoic acid. These may be used singly, or two or more may be used in combination. The content of these additional units is preferably not more than 45 mol % of all the dicarboxylic acid units in the semi-aromatic polyamide (B2), and is more preferably not more than 40 mol %, and still more preferably not more than 35 mol %.

The semi-aromatic polyamide (B2) may be produced using a known polyamide production apparatus such as a batch reaction vessel, a one-tank or multi-tank continuous reaction apparatus, a tubular continuous reaction apparatus, or a kneading reaction extruder such as a single-screw kneading extruder or a twin-screw kneading extruder. The semi-aromatic polyamide (B2) may be produced by a known method such as melt polymerization, solution polymerization or solid phase polymerization. The semi-aromatic polyamide (B2) may be produced by such a method at atmospheric pressure or while repeating pressure decreasing and increasing operations. These production methods may be used singly or may be combined appropriately. Of the methods, melt polymerization is preferable. For example, the polyamide is produced by polymerizing a nylon salt of xylylenediamine and/or bis(aminomethyl)naphthalene with a $C_9$ or $C_{10}$ aliphatic dicarboxylic acid in the molten state in the presence of water at elevated pressure and temperature while removing water that has been added and condensation water. Alternatively, the polyamide is produced by directly adding xylylenediamine and/or bis(aminomethyl)naphthalene to a molten $C_9$ or $C_{10}$ aliphatic dicarboxylic acid so as to perform polycondensation at atmospheric pressure. In this case, the polymerization is performed in such a manner that the xylylenediamine and/or the bis(aminomethyl)naphthalene is added to the $C_9$ or $C_{10}$ aliphatic dicarboxylic acid continuously to keep the reaction system in a uniform liquid state while heating the reaction system so that the temperature of the reaction system will be not less than the melting point of the resultant oligoamide and polyamide. The semi-aromatic polyamide (B2), after being produced by the melt polymerization method, may be subjected to solid phase polymerization.

A phosphorus atom-containing compound may be added to the semi-aromatic polyamide (B2) to serve as a catalyst or to enhance the working stability during melt forming and prevent coloration. Examples of the phosphorus atom-containing compounds include hypophosphorous acid, phosphorous acid, phosphoric acid, pyrophosphoric acid, metaphosphoric acid, phosphonous acid phosphonic acid, derivatives of these acids, alkaline earth metal salts of hypophosphorous acid, alkali metal salts of phosphorous acid, alkaline earth metal salts of phosphorous acid, alkali metal salts of phosphoric acid, alkaline earth metal salts of phosphoric acid, alkali metal salts of pyrophosphoric acid, alkaline earth metal salts of pyrophosphoric acid, alkali metal salts of metaphosphoric acid, alkaline earth metal salts of metaphosphoric acid, alkali metal salts of phosphonous acid, alkaline earth metal salts of phosphonous acid, alkali metal salts of phosphonic acid, and alkaline earth metal salts of phosphonic acid.

Examples of the phosphorus atom-containing compounds include phosphinic acid (hypophosphorous acid), ethyl hypophosphite, dimethylphosphinic acid, phenylmethylphosphinic acid, sodium hypophosphite, potassium hypophosphite, lithium hypophosphite, calcium hypophosphite, magnesium hypophosphite, phosphorous acid, triethyl phosphite, triphenyl phosphite, sodium phosphite, sodium hydrogen phosphite, potassium phosphite, potassium hydrogen phosphite, lithium phosphite, lithium hydrogen phosphite, magnesium phosphite, magnesium hydrogen phosphite, calcium phosphite, calcium hydrogen phosphite, pyrophosphorous acid, phosphoric acid, sodium phosphate, disodium hydrogen phosphate, sodium dihydrogen phosphate, potassium phosphate, dipotassium hydrogen phosphate, potassium dihydrogen phosphate, magnesium phosphate, dimagnesium hydrogen phosphate, magnesium dihydrogen phosphate, calcium phosphate, dicalcium hydrogen phosphate, calcium dihydrogen phosphate, lithium phosphate, dilithium hydrogen phosphate, lithium dihydrogen phosphate, sodium pyrophosphate, potassium pyrophosphate, magnesium pyrophosphate, calcium pyrophosphate, lithium pyrophosphate, sodium metaphosphate, potassium metaphosphate, magnesium metaphosphate, calcium metaphosphate, lithium metaphosphate, phosphonous acid, sodium phosphonite, lithium phosphonite, potassium phosphonite, magnesium phosphonite, calcium phosphonite, ethyl phenylphosphonite, sodium phenylphosphonite, potassium phenylphosphonite, lithium phenylphosphonite, phosphonic acid, sodium phosphonate, potassium phosphonate, lithium phosphonate, potassium phosphonate, magnesium phosphonate, calcium phosphonate, phenylphosphonic acid, ethylphosphonic acid, sodium phenylphosphonate, potassium phenylphosphonate, lithium phenylphosphonate, diethyl phenylphosphonate, sodium ethylphosphonate and potassium ethylphosphonate. These may be used singly, or two or more may be used in combination. Of these, sodium hypophosphite, potassium hypophosphite, lithium hypophosphite, calcium hypophosphite, magnesium hypophosphite, calcium phosphite, calcium hydrogen phosphite, calcium dihydrogen phosphate, sodium phosphite, sodium phosphite, sodium hydrogen phosphite, potassium phosphite, potassium hydrogen phosphite, lithium phosphite, lithium hydrogen phosphite, magnesium phosphite, magnesium hydrogen phosphite, calcium phosphite and calcium hydrogen phosphite are preferable, and sodium hypophosphite, potassium hypophosphite, lithium hypophosphite, calcium hypophosphite and magnesium hypophosphite are more preferable. These phosphorus atom-containing compounds may be hydrates.

To ensure sufficient catalytic effect and sufficient prevention of coloration during polymerization and also to suppress the occurrence of gelation, the content of the phosphorus atom-containing compound is preferably not less than 0.030 parts by mass and not more than 0.30 parts by mass in terms of phosphorus atom concentration per 100 parts by mass of the semi-aromatic polyamide (B2), and is more preferably not less than 0.050 parts by mass and not more than 0.20 parts by mass, and still more preferably not less than 0.070 parts by mass and not more than 0.15 parts by mass.

The phosphorus atom-containing compound may be added to a raw material for the semi-aromatic polyamide (B2), that is, an aqueous nylon salt solution, a diamine or a dicarboxylic acid, may be added to a dicarboxylic acid in the molten state, or may be added during the melt polymerization. The method of the addition is not limited to those described above, and the addition may be accomplished by any method as long as the compound can be dispersed uniformly in the semi-aromatic polyamide (B2).

Together with the phosphorus atom-containing compound, an alkali metal compound or an alkaline earth metal compound may be added to the semi-aromatic polyamide (B2). While the phosphorus atom-containing compound needs to be added in a sufficient amount to prevent the coloration of the polyamide during the polycondensation, this approach can give rise to a gelation of the polyamide in some cases. To prevent this and also to control the amide-forming reaction rate, it is preferable to add an alkali metal compound or an alkaline earth metal compound. Examples of the alkali metal compounds include alkali metal hydroxides, alkaline earth metal hydroxides, alkali metal acetate salts, alkaline earth metal acetate salts, alkali metal/alkaline earth metal carbonate salts, and alkali metal/alkaline earth metal alkoxides, with alkali metal hydroxides and/or alkali metal acetate salts being preferable.

Examples of the alkali metal compounds include alkali metal/alkaline earth metal hydroxides such as lithium hydroxide, sodium hydroxide, potassium hydroxide, rubidium hydroxide, cesium hydroxide, magnesium hydroxide, calcium hydroxide, strontium hydroxide and barium hydroxide; alkali metal/alkaline earth metal acetate salts such as lithium acetate, sodium acetate, potassium acetate, rubidium acetate, cesium acetate, magnesium acetate, calcium acetate, strontium acetate and barium acetate; alkali metal/alkaline earth metal carbonate salts such as lithium carbonate, sodium carbonate, potassium carbonate, rubidium carbonate, cesium carbonate, magnesium carbonate, calcium carbonate, strontium carbonate and barium carbonate; and alkali metal/alkaline earth metal alkoxides such as sodium methoxide, sodium ethoxide, sodium propoxide, sodium butoxide, potassium methoxide, lithium methoxide, magnesium methoxide and calcium methoxide. These may be used singly, or two or more may be used in combination. Of these, from the point of view of economic efficiency, sodium hydroxide, potassium hydroxide, magnesium hydroxide, calcium hydroxide, sodium acetate and potassium acetate are preferable.

When the alkali metal compound or the alkaline earth metal compound is added to the polycondensation system for the synthesis of the semi-aromatic polyamide (B2), the quotient of the number of moles of the compound divided by the number of moles of the phosphorus atoms of the phosphorus atom-containing compound is preferably not less than 0.30 and not more than 2.0 from the point of view of the balance between acceleration and restraining of the amide-forming reaction, and is more preferably not less than 0.40 and not more than 1.9, and still more preferably not less than 0.50 and not more than 1.8.

The alkali metal compound or the alkaline earth metal compound may be added to a raw material for the semi-aromatic polyamide (B2), that is, an aqueous nylon salt solution, a diamine or a dicarboxylic acid, may be added to a dicarboxylic acid in the molten state, or may be added during the melt polymerization. The method of the addition is not limited to those described above, and the addition may be accomplished by any method as long as the compound can be dispersed uniformly in the semi-aromatic polyamide (B2).

To ensure mechanical properties of the obtainable multilayer tube and to control the melt viscosity to an appropriate range so as to attain desired formability into the multilayer tube, the relative viscosity of the semi-aromatic polyamide (B1) and the semi-aromatic polyamide (B2) measured at 96% sulfuric acid, 1% polymer concentration and 25° C. in accordance with JIS K-6920 is preferably not less than 1.5 and not more than 4.0, more preferably not less than 1.8 and not more than 3.5, and still more preferably not less than 2.0 and not more than 3.0.

There are no particular limitations on the types of terminal groups, the concentrations of terminal groups, and the molecular weight distributions of the semi-aromatic polyamide (B1) and the semi-aromatic polyamide (B2). To control the molecular weight and to attain melt stability during the forming process, a single or an appropriate combination of two or more of monoamines, diamines, polyamines, monocarboxylic acids and dicarboxylic acids may be added. Examples include aliphatic monoamines such as methylamine, ethylamine, propylamine, butylamine, hexylamine, octylamine, decylamine, stearylamine, dimethylamine, diethylamine, dipropylamine and dibutylamine; alicyclic monoamines such as cyclohexylamine and dicyclohexylamine; aromatic monoamines such as aniline, toluidine, diphenylamine and naphthylamine; aliphatic diamines such as 1,4-butanediamine, 1,5-pentanediamine, 1,6-hexanediamine, 1,8-octanediamine and 2-methyl-1,5-pentanediamine; alicyclic diamines such as cyclohexanediamine, bis(aminomethyl)cyclohexane and 5-amino-1,3,3-trimethylcyclohexanemethylamine; aromatic diamines such as m-phenylenediamine and p-phenylenediamine; polyamines such as polyalkyleneimine, polyalkylenepolyamine, polyvinylamine and polyallylamine; aliphatic monocarboxylic acids such as acetic acid, propionic acid, butyric acid, valeric acid, caproic acid, caprylic acid, lauric acid, tridecylic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid and phenylacetic acid; aliphatic dicarboxylic acids such as adipic acid and pimelic acid, alicyclic dicarboxylic acids such as 1,3-cyclopentanedicarboxylic acid, 1,3-cyclohexanedicarboxylic acid and 1,4-cyclohexanedicarboxylic acid; and aromatic dicarboxylic acids such as phthalic acid and isophthalic acid. These may be used singly, or two or more may be used in combination. The amount in which the molecular weight modifier is used is variable depending on the reactivity of the molecular weight modifier and the polymerization conditions, and is determined appropriately so that the relative viscosity of the final polyamide will be in the aforementioned range.

In consideration of melt stability, it is preferable that ends of molecular chains of the semi-aromatic polyamide (B1) and the semi-aromatic polyamide (B2) be capped with endcapping agents. It is more preferable that 10% or more terminal groups be endcapped, and it is still more preferable that 20% or more terminal groups be endcapped. The endcapping agents are not particularly limited as long as they are monofunctional compounds and have reactivity with the amino group or the carboxyl group at a terminal of the polyamide. From points of view such as reactivity and endcap stability, monocarboxylic acids and monoamines are preferable. From points of view such as easy handling, monocarboxylic acids are more preferable. Other compounds such as acid anhydrides such as phthalic anhydride, monoisocyanates, monoacid halides, monoesters and monoalcohols may be used.

The monocarboxylic acids used as the endcapping agents are not particularly limited as long as having reactivity with the amino groups. Examples thereof include the aliphatic monocarboxylic acids, alicyclic monocarboxylic acids and aromatic monocarboxylic acids described hereinabove. Of these, from points of view such as reactivity, endcap stability and price, acetic acid, propionic acid, butyric acid, valeric acid, caproic acid, caprylic acid, lauric acid, tridecylic acid, myristic acid, palmitic acid, stearic acid and benzoic acid are preferable. The monoamines used as the endcapping agents are not particularly limited as long as having reactivity with the carboxyl groups. Examples thereof include the aliphatic monoamines, alicyclic monoamines and aromatic monoamines described hereinabove. Of these, from points of view such as reactivity, boiling point, endcap stability and price, butylamine, hexylamine, octylamine, decylamine, stearylamine, cyclohexylamine and aniline are preferable.

The amount in which the endcapping agent is used may be determined appropriately in light of factors such as the reactivity and boiling point of the endcapping agent used, the reaction apparatus and the reaction conditions. From the point of view of the controlling of polymerization degree, it is preferable that the amount be not less than 0.1 mol % and not more than 15 mol % relative to the total number of moles of the dicarboxylic acid and the diamine that are raw material components.

To improve the low-temperature impact resistance of the semi-aromatic polyamide (B1) and the semi-aromatic polyamide (B2), an impact modifier is preferably added to the semi-aromatic polyamide composition (B). It is more preferable to add an elastomer polymer (A3), described hereinabove with respect to the aliphatic polyamide composition (A), that contains structural units derived from an unsaturated compound with a carboxyl group and/or an acid anhydride group. The elastomer polymer (A3) may exhibit poor impact modification effects if it contains no carboxyl groups and/or acid anhydride groups.

To ensure that the multilayer tube will attain sufficient mechanical strength and low-temperature impact resistance, the content of the impact modifier is preferably not less than 1 part by mass and not more than 30 parts by mass per 100 parts by mass of the semi-aromatic polyamide (B1) or the semi-aromatic polyamide (B2) that is the principal component, and is more preferably not less than 3 parts by mass and not more than 25 parts by mass.

The semi-aromatic polyamide composition (B) may contain an additional thermoplastic resin together with the semi-aromatic polyamide (B1) or the semi-aromatic polyamide (B2). Examples of the additional thermoplastic resins include those resins described with respect to the aliphatic polyamide composition (A). Further, it may be a mixture with a polyamide (A1) and/or a polyamide (A2). The content of the semi-aromatic polyamide (B1) or the semi-aromatic polyamide (B2) in the semi-aromatic polyamide composition (B) is not less than 60% by mass, and is preferably not less than 70% by mass. In the case where the polyamide (A2) belongs to the semi-aromatic polyamides (B1) or the semi-aromatic polyamides (B2), its content is understood as being included in the above content of the semi-aromatic polyamide (B1) or the semi-aromatic polyamide (B2).

Where necessary, the semi-aromatic polyamide composition (B) may contain additives such as conductive fillers, antioxidants, thermal stabilizers, ultraviolet absorbers, light stabilizers, lubricants, inorganic fillers, antistatic agents, flame retardants, crystallization accelerators, plasticizers, colorants and lubricating agents.

3. Layer (c)

The multilayer tube preferably further includes a layer (c). The layer (c) in the multilayer tube includes a fluorine-containing polymer (C) having, in its molecular chain, a functional group reactive to an amino group. (Hereinafter, this component will be sometimes written as the fluorine-containing polymer (C).)

[Fluorine-Containing Polymer (C)]

The fluorine-containing polymer (C) has, in its molecular chain, a functional group reactive to an amino group.

The fluorine-containing polymer (C) is a polymer (a homopolymer or a copolymer) which has repeating units derived from at least one fluorine-containing monomer. The fluorine-containing polymer is not particularly limited as long as it is melt processable.

Examples of the fluorine-containing monomers include tetrafluoroethylene (TFE), trifluoroethylene, vinylidene fluoride (VDF), vinyl fluoride (VF), chlorotrifluoroethylene (CTFE), trichlorofluoroethylene, hexafluoropropylene (HFP), $CF_2=CFOR^{f1}$ (wherein $R^{f1}$ is a perfluoroalkyl group with 1 to 10 carbon atoms which may contain an etheric oxygen atom), $CF_2=CF-OCH_2-R^{f2}$ (wherein $R^{f2}$ is a perfluoroalkylene group with 1 to 10 carbon atoms which may contain an etheric oxygen atom), $CF_2=CF(CF_2)_p OCF=CF_2$ (wherein p is 1 or 2), and $CH_2=CX^1(CF_2)_n X^2$ (wherein $X^1$ and $X^2$ are each independently a hydrogen atom or a fluorine atom, and n is an integer of 2 to 10). These may be used singly, or two or more may be used in combination.

Specific examples of the general formula $CF_2=CFOR^{f1}$ include perfluoro(alkyl vinyl ethers) (hereinafter, also referred to as PAVE) such as $CF_2=CFOCF_2$ (perfluoro (methyl vinyl ether): PMVE), $CF_2=CFOCF_2CF_3$ (perfluoro (ethyl vinyl ether): PEVE), $CF_2=CFOCF_2CF_2CF_3$ (perfluoro(propyl vinyl ether): PPVE), $CF_2=CFOCF_2CF_2CF_2CF_3$ (perfluoro(butyl vinyl ether): PBVE) and $CF_2=CFO(CF_2)_8 F$ (perfluoro(octyl vinyl ether): POVE). Of these, $CF_2=CFOCF_2$ and $CF_2=CFOCF_2CF_2CF_3$ are preferable.

In the compounds represented by the general formula $CH_2=CX^1(CF_2)_n X^2$ (wherein $X^1$ and $X^2$ are each independently a hydrogen atom or a fluorine atom, and n is an integer of 2 to 10), n is an integer of 2 to 10 to ensure a modification effect for the fluorine-containing polymer (for example, prevention of cracks during forming of the copolymer or cracks in formed articles) and to obtain sufficient polymerization reactivity. Specific examples include $CH_2=CF(CF_2)_2F$, $CH_2=CF(CF_2)_3F$, $CH_2=CF(CF_2)_4F$, $CH_2=CF(CF_2)_5F$, $CH_2=CF(CF_2)_8F$, $CH_2=CF(CF_2)_2H$, $CH_2=CF(CF_2)_3H$, $CH_2=CF(CF_2)_4H$, $CH_2=CF(CF_2)_5H$, $CH_2=CF(CF_2)_8H$, $CH_2=CH(CF_2)_2F$, $CH_2=CH(CF_2)_3F$, $CH_2=CH(CF_2)_4F$, $CH_2=CH(CF_2)_5F$, $CH_2=CH(CF_2)_8F$, $CH_2=CH(CF_2)_2H$, $CH_2=CH(CF_2)_3H$, $CH_2=CH(CF_2)_4H$, $CH_2=CH(CF_2)_5H$ and $CH_2=CH(CF_2)_8H$. These may be used singly, or two or more may be used in combination.

Of the compounds described above, those represented by $CH_2=CH(CF_2)_nF$ or $CH_2=CF(CF_2)_nH$ are preferable from the point of view of the balance between barrier properties to chemical medias and environmental stress crack resistance of the fluorine-containing polymer (C). More preferably, n in the formula is 2 to 4.

In addition to the units from the fluorine-containing monomer, the fluorine-containing polymer (C) may further contain polymer units based on a fluorine-free monomer. Examples of the fluorine-free monomers include olefins with 2 to 4 carbon atoms such as ethylene, propylene and isobutene; vinyl esters such as vinyl chloride, vinylidene chloride, vinyl acetate, vinyl chloroacetate, vinyl lactate, vinyl butyrate, vinyl pivalate, vinyl benzoate, vinyl crotonate, methyl (meth)acrylate, ethyl (meth)acrylate, n-butyl (meth)acrylate and methyl crotonate; and vinyl ethers such as methyl vinyl ether (MVE), ethyl vinyl ether (EVE), butyl vinyl ether (BVE), isobutyl vinyl ether (IBVE), cyclohexyl vinyl ether (CHVE) and glycidyl vinyl ether. These may be used singly, or two or more may be used in combination. Of these, ethylene, propylene and vinyl acetate are preferable, and ethylene is more preferable.

From the points of view of heat resistance, chemical resistance and barrier properties to chemical medias, preferred fluorine-containing polymers (C) are polymers (C1) including at least vinylidene fluoride units (VDF units), copolymers (C2) including at least tetrafluoroethylene units (TFE units) and ethylene units (E units), copolymers (C3) including at least tetrafluoroethylene units (TFE units) and hexafluoropropylene units (HFP units) and/or PAVE units derived from PAVE represented by the aforementioned general formula $CF_2$=$CFOR^{f1}$ (wherein $R^{f1}$ is a perfluoroalkyl group with 1 to 10 carbon atoms which may contain an etheric oxygen atom), copolymers (C4) including at least chlorotrifluoroethylene units (CTFE units), and copolymers (C5) including at least chlorotrifluoroethylene units (CTFE units) and tetrafluoroethylene units (TFE units).

Examples of the polymers (C1) including at least vinylidene fluoride units (VDF units) (hereinafter, also written as the VDF copolymers (C1)) include vinylidene fluoride homopolymer (polyvinylidene fluoride (PVDF)) (C1-1), copolymers (C1-2) including VDF units and TFE units wherein the content of the VDF units is not less than 30 mol % and not more than 99 mol % and the content of the TFE units is not less than 1 mol % and not more than 70 mol % relative to all the monomers except functional group-containing monomers described later, copolymers (C1-3) including VDF units, TFE units and trichlorofluoroethylene units wherein the content of the VDF units is not less than 10 mol % and not more than 90 mol %, the content of the TFE units is not less than 0 mol % and not more than 90 mol % and the content of the trichlorofluoroethylene units is not less than 0 mol % and not more than 30 mol % relative to all the monomers except functional group-containing monomers described later, and copolymers (C1-4) including VDF units, TFE units and HFP units wherein the content of the VDF units is not less than 10 mol % and not more than 90 mol %, the content of the TFE units is not less than 0 mol % and not more than 90 mol % and the content of the HFP units is not less than 0 mol % and not more than 30 mol % relative to all the monomers except functional group-containing monomers described later.

In the copolymers (C1-4), it is preferable that the content of the VDF units be not less than 15 mol % and not more than 84 mol %, the content of the TFE units be not less than 15 mol % and not more than 84 mol % and the content of the HFP units be not less than 0 mol % and not more than 30 mol % relative to all the monomers except functional group-containing monomers described later.

Examples of the copolymers (C2) including at least tetrafluoroethylene units (TFE units) and ethylene units (E units) (hereinafter, also written as the TFE copolymers (C2)) include polymers wherein the content of the TFE units is not less than 20 mol % relative to all the monomers except functional group-containing monomers described later, and copolymers wherein the content of the TFE units is not less than 20 mol % and not more than 80 mol %, the content of the E units is not less than 20 mol % and not more than 80 mol % and the content of units derived from a monomer copolymerizable with the above monomers is not less than 0 mol % and not more than 60 mol % relative to all the monomers except functional group-containing monomers described later.

Examples of the copolymerizable monomers include hexafluoropropylene (HFP), $CF_2$=$CFOR^{f1}$ (wherein $R^{f1}$ is a perfluoroalkyl group with 1 to 10 carbon atoms which may contain an etheric oxygen atom) and $CH_2$=$CX^1(CF_2)_nX^2$ (wherein $X^1$ and $X^2$ are each independently a hydrogen atom or a fluorine atom, and n is an integer of 2 to 10). These may be used singly, or two or more may be used in combination.

Examples of the TFE copolymers (C2) include:

copolymers (C2-1) including TFE units, E units and fluoroolefin units derived from a fluoroolefin represented by the aforementioned general formula $CH_2$=$CX^1(CF_2)_nX^2$ (wherein $X^1$ and $X^2$ are each independently a hydrogen atom or a fluorine atom, and n is an integer of 2 to 10) wherein the content of the TFE units is not less than 30 mol % and not more than 70 mol %, the content of the E units is not less than 20 mol % and not more than 55 mol % and the content of the fluoroolefin units derived from a fluoroolefin represented by the aforementioned general formula $CH_2$=$CX^1(CF_2)_nX^2$ (wherein $X^1$ and $X^2$ are each independently a hydrogen atom or a fluorine atom, and n is an integer of 2 to 10) is not less than 0 mol % and not more than 10 mol % relative to all the monomers except functional group-containing monomers described later, copolymers (C2-2) including TFE units, E units, HFP units and units derived from a monomer copolymerizable with the above monomers wherein the content of the TFE units is not less than 30 mol % and not more than 70 mol %, the content of the E units is not less than 20 mol % and not more than 55 mol %, the content of the HFP units is not less than 1 mol % and not more than 30 mol %, and the content of the units derived from a monomer copolymerizable with the above monomers is not less than 0 mol % and not more than 10 mol % relative to all the monomers except functional group-containing monomers described later, and copolymers (C2-3) including TFE units, E units and PAVE units derived from PAVE represented by the aforementioned general formula $CF_2$=$CFOR^{f1}$ (wherein $R^{f1}$ is a perfluoroalkyl group with 1 to 10 carbon atoms which may contain an etheric oxygen atom) wherein the content of the TFE units is not less than 30 mol % and not more than 70 mol %, the content of the E units is not less than 20 mol % and not more than 55 mol %, and the content of the PAVE units derived from PAVE represented by the aforementioned general formula $CF_2$=$CFOR^{f1}$ (wherein $R^{f1}$ is a perfluoroalkyl group with 1 to 10 carbon atoms which may contain an etheric oxygen atom) is not less than 0 mol % and not more than 10 mol % relative to all the monomers except functional group-containing monomers described later.

Examples of the copolymers (C3) including at least tetrafluoroethylene units (TFE units) and hexafluoropropylene units (HFP units) and/or PAVE units derived from PAVE represented by the aforementioned general formula $CF_2$=$CFOR^{f1}$ (wherein $R^{f1}$ is a perfluoroalkyl group with 1 to 10 carbon atoms which may contain an etheric oxygen atom) (hereinafter, also written as the TFE copolymers (C3)) include:

copolymers (C3-1) including TFE units and HFP units wherein the content of the TFE units is not less than 70 mol % and not more than 95 mol %, preferably not less than 85 mol % and not more than 93 mol %, and the content of the HFP units is not less than 5 mol % and not more than 30 mol %, preferably not less than 7 mol % and not more than 15 mol %, relative to all the monomers except functional group-containing monomers described later, copolymers (C3-2) including TFE units and one, or two or more kinds of PAVE units derived from PAVE represented by the aforementioned general formula $CF_2$=$CFOR^{f1}$ (wherein $R^{f1}$ is a perfluoroalkyl group with 1 to 10 carbon atoms which may contain an etheric oxygen atom) wherein the content of the TFE units is not less than 70 mol % and not more than 95 mol % and the content of one, or two or more kinds of PAVE units derived from PAVE represented by the aforementioned general formula $CF_2=CFOR^{f1}$ (wherein $R^{f1}$ is a perfluoroalkyl group with 1 to 10 carbon atoms which may contain an etheric oxygen atom) is not less than 5 mol % and not more than 30 mol % relative to all the monomers except functional group-containing monomers described later, and copolymers (C3-3) including TFE units, HFP units and one, or two or more kinds of PAVE units derived from PAVE represented by the aforementioned general formula $CF_2=CFOR^{f1}$ (wherein $R^{f1}$ is a perfluoroalkyl group with 1 to 10 carbon atoms which may contain an etheric oxygen atom) wherein the content of the TFE units is not less than 70 mol % and not more than 95 mol %, and the total content of the HFP units and one, or two or more kinds of PAVE units derived from PAVE represented by the aforementioned general formula $CF_2=CFOR^{f1}$ (wherein $R^{f1}$ is a perfluoroalkyl group with 1 to 10 carbon atoms which may contain an etheric oxygen atom) is not less than 5 mol % and not more than 30 mol % relative to all the monomers except functional group-containing monomers described later.

The copolymers including at least chlorotrifluoroethylene units (CTFE units) are chlorotrifluoroethylene copolymers (C4) which have CTFE units [—CFCl—$CF_2$—] and are composed of ethylene units (E units) and/or fluorine-containing monomer units (hereinafter, also written as the CTFE copolymers (C4)).

The fluorine-containing monomers in the CTFE copolymers (C4) are not particularly limited and may be any such monomers except CTFE. Examples thereof include vinylidene fluoride (VDF), hexafluoropropylene (HFP), PAVE represented by the aforementioned general formula $CF_2=CFOR^{f1}$ (wherein $R^{f1}$ is a perfluoroalkyl group with 1 to 10 carbon atoms which may contain an etheric oxygen atom) and fluoroolefins represented by the aforementioned general formula $CH_2=CX^1(CF_2)_nX^2$ (wherein $X^1$ and $X^2$ are each independently a hydrogen atom or a fluorine atom, and n is an integer of 2 to 10). These may be used singly, or two or more may be used in combination.

The CTFE copolymers (C4) are not particularly limited, and examples thereof include CTFE/PAVE copolymer, CTFE/VDF copolymer, CTFE/HFP copolymer, CTFE/E copolymer, CTFE/PAVE/E copolymer, CTFE/VDF/E copolymer and CTFE/HFP/E copolymer.

The content of the CTFE units in the CTFE copolymer (C4) is preferably not less than 15 mol % and not more than 70 mol %, and more preferably not less than 18 mol % and not more than 65 mol % relative to all the monomers except functional group-containing monomers described later. The content of the E units and/or the fluorine-containing monomer units is preferably not less than 30 mol % and not more than 85 mol %, and more preferably not less than 35 mol % and not more than 82 mol %.

The copolymers (C5) including at least chlorotrifluoroethylene units (CTFE units) and tetrafluoroethylene units (TFE units) are chlorotrifluoroethylene copolymers composed of CTFE units [—CFCl—$CF_2$—], TFE units [—$CF_2$—$CF_2$—] and units from a monomer copolymerizable with CTFE and TFE (hereinafter, also written as the CTFE/TFE copolymers (C5)).

The copolymerizable monomers in the CTFE/TFE copolymers (C5) are not particularly limited and may be any such monomers except CTFE and TFE. Examples thereof include fluorine-containing monomers such as vinylidene fluoride (VDF), hexafluoropropylene (HFP), PAVE represented by the aforementioned general formula $CF_2=CFOR^{f1}$ (wherein $R^{f1}$ is a perfluoroalkyl group with 1 to 10 carbon atoms which may contain an etheric oxygen atom) and fluoroolefins represented by the aforementioned general formula $CH_2=CX^1(CF_2)_nX^2$ (wherein $X^1$ and $X^2$ are each independently a hydrogen atom or a fluorine atom, and n is an integer of 2 to 10); and fluorine-free monomers, for example, olefins with 2 to 4 carbon atoms such as ethylene, propylene and isobutene; vinyl esters such as vinyl acetate, methyl (meth)acrylate and ethyl (meth)acrylate; and vinyl ethers such as methyl vinyl ether (MVE), ethyl vinyl ether (EVE) and butyl vinyl ether (BVE). These may be used singly, or two or more may be used in combination. Of these, PAVE represented by the aforementioned general formula $CF_2=CFOR^{f1}$ (wherein $R^{f1}$ is a perfluoroalkyl group with 1 to 10 carbon atoms which may contain an etheric oxygen atom) are preferable. Perfluoro(methyl vinyl ether) (PMVE) and perfluoro(propyl vinyl ether) (PAVE) are more preferable. From the point of view of heat resistance, PPVE is still more preferable.

The CTFE/TFE copolymers (C5) are not particularly limited, and examples thereof include CTFE/TFE copolymer, CTFE/TFE/HFP copolymer, CTFE/TFE/VDF copolymer, CTFE/TFE/PAVE copolymer, CTFE/TFE/E copolymer, CTFE/TFE/HFP/PAVE copolymer and CTFE/TFE/VDF/PAVE copolymer. Of these, CTFE/TFE/PAVE copolymer and CTFE/TFE/HFP/PAVE copolymer are preferable.

To ensure good formability, environmental stress crack resistance, barrier properties to chemical medias, heat resistance and mechanical characteristics, the total content of the CTFE units and the TFE units in the CTFE/TFE copolymer (C5) is preferably not less than 90.0 mol % and not more than 99.9 mol % and the content of the units from the monomer copolymerizable with CTFE and TFE is preferably not less than 0.10 mol % and not more than 10.0 mol %, relative to all the monomers except functional group-containing monomers described later.

To ensure good formability, environmental stress crack resistance and barrier properties to chemical medias, the content of the CTFE units in the CTFE/TFE copolymer (C5) is preferably not less than 15 mol % and not more than 80 mol % relative to the total content of the CTFE units and the TFE units taken as 100 mol %, and is more preferably not less than 17 mol % and not more than 70 mol %, and still more preferably not less than 19 mol % and not more than 65 mol %.

When the monomer copolymerizable with CTFE and TFE is PAVE, the content of the PAVE units in the CTFE/TFE copolymer (C5) is preferably not less than 0.5 mol % and not more than 7 mol %, and more preferably not less than 1 mol % and not more than 5 mol % relative to all the monomers except functional group-containing monomers described later.

When HFP and PAVE are the monomers copolymerizable with CTFE and TFE, the total content of the HFP units and the PAVE units in the CTFE/TFE copolymer (C5) is preferably not less than 0.5 mol % and not more than 7 mol %, and more preferably not less than 1 mol % and not more than 5 mol % relative to all the monomers except functional group-containing monomers described later.

The TFE copolymers (C3), the CTFE copolymers (C4) and the CTFE/TFE copolymers (C5) have superior barrier properties to chemical medias, in particular, barrier properties to alcohol-containing gasoline. The coefficient of permeability for alcohol-containing gasoline is a value calculated in such a manner that a sheet obtained from a resin of interest is placed into a permeability coefficient measurement cup containing isooctane/toluene/ethanol mixed solvent prepared by mixing isooctane, toluene and ethanol in a volume ratio of 45:45:10, and a change in mass is measured at 60° C. The coefficient of permeability for alcohol-containing gasoline of the TFE copolymers (C3), the CTFE copolymers (C4) and the CTFE/TFE copolymers (C5) is preferably not more than 1.5 g·mm/(m$^2$·day), more preferably not less than 0.010 g·mm/(m$^2$·day) and not more than 1.0 g·mm/(m$^2$·day), and still more preferably not less than 0.020 g·mm/(m$^2$·day) and not more than 0.80 g·mm/(m$^2$·day).

The fluorine-containing polymer (C) may be obtained by (co)polymerizing a monomer(s) for constituting the polymer by a conventional polymerization method. Radical polymerization is mainly used. The polymerization may be initiated in any manner without limitation as long as radicals are formed. For example, the polymerization is initiated with an organic or inorganic radical polymerization initiator, heat, light, ionizing radiation, or the like.

The fluorine-containing polymer (C) may be produced by any method without limitation, and general polymerization method using a radical polymerization initiator is adopted. The polymerization method may be conventional, with examples including bulk polymerization, solution polymerization using an organic solvent such as fluorinated hydrocarbon, chlorinated hydrocarbon, fluorinated chlorinated hydrocarbon, alcohol or hydrocarbon, suspension polymerization using an aqueous medium and optionally an appropriate organic solvent, and emulsion polymerization using an aqueous medium and an emulsifier.

The polymerization may be performed batchwise or continuously using a one-tank or multi-tank stirring polymerization apparatus or a tubular polymerization apparatus.

The radical polymerization initiators preferably have a 10-hour half-life decomposition temperature of not less than 0° C. and not more than 100° C., and more preferably not less than 20° C. and not more than 90° C. Specific examples include azo compounds such as 2,2'-azobisisobutyronitrile, 2,2'-azobis(2,4-dimethylvaleronitrile), 2,2'-azobis(2-methylvaleronitrile), 2,2'-azobis(2-cyclopropylpropionitrile), dimethyl 2,2'-azobisisobutyrate, 2,2'-azobis[2-(hydroxymethyl)propionitrile] and 4,4'-azobis(4-cyanopentenoic acid); hydroperoxides such as hydrogen peroxide, t-butyl hydroperoxide and cumene hydroperoxide; dialkyl peroxides such as di-t-butyl peroxide and dicumyl peroxide; fluorine-free diacyl peroxides such as acetyl peroxide, isobutyryl peroxide, octanoyl peroxide, benzoyl peroxide and lauroyl peroxide; ketone peroxides such as methyl ethyl ketone peroxide and cyclohexanone peroxide; peroxydicarbonates such as diisopropyl peroxydicarbonate; peroxy esters such as t-butyl peroxypivalate, t-butyl peroxyisobutyrate and t-butyl peroxyacetate; fluorine-containing diacyl peroxides such as compounds represented by $(Z(CF_2)_pCOO)_2$ (wherein Z is a hydrogen atom, a fluorine atom or a chlorine atom, and p is an integer of 1 to 10); and inorganic peroxides such as potassium persulfate, sodium persulfate and ammonium persulfate. These may be used singly, or two or more may be used in combination.

The production of the fluorine-containing polymer (C) preferably involves a common chain transfer agent for the purpose of controlling the molecular weight. Examples of the chain transfer agents include alcohols such as methanol and ethanol, chlorofluorohydrocarbons such as 1,3-dichloro-1,1,2,2,3-pentafluoropropane, 1,1-dichloro-1-fluoroethane, 1,2-dichloro-1,1,2,2-tetrafluoroethane, 1,1-dichloro-1-fluoroethane and 1,1,2-trichloro-1,2,2-trifluoroethane; hydrocarbons such as pentane, hexane and cyclohexane; and chlorohydrocarbons such as carbon tetrachloride, chloroform, methylene chloride and methyl chloride. These may be used singly, or two or more may be used in combination.

The polymerization conditions are not particularly limited. The polymerization temperature is preferably not less than 0° C. and not more than 100° C., and more preferably not less than 20° C. and not more than 90° C. To avoid a decrease in heat resistance due to the formation of ethylene-ethylene sequences in the polymer, a lower temperature is generally preferable. The polymerization pressure may be determined appropriately in accordance with other polymerization conditions such as the type, amount and vapor pressure of the solvent that is used, and polymerization temperature, but is preferably not less than 0.1 MPa and not more than 10 MPa, and more preferably not less than 0.5 MPa and not more than 3 MPa. The polymerization time is preferably not less than 1 hour and not more than 30 hours.

The molecular weight of the fluorine-containing polymer (C) is not particularly limited but is preferably such that the polymer is solid at room temperature and the polymer itself is usable as a thermoplastic resin, an elastomer or the like. The molecular weight is controllable by controlling the concentration of the monomers in the polymerization, the concentration of the polymerization initiator, the concentration of the chain transfer agent, and the temperature.

To ensure that, when the fluorine-containing polymer (C) is coextruded together with components such as the aliphatic polyamide composition (A) and the semi-aromatic polyamide composition (B), sufficient melt fluidity will be attained at kneading and forming temperatures which do not cause significant deterioration of the components, the melt flow rate of the fluorine-containing polymer (C) at its melting point plus 50° C. and 5 kg load is preferably not less than 0.5 g/10 min and not more than 200 g/10 min, and more preferably not less than 1 g/10 min and not more than 100 g/10 min.

The melting point and glass transition temperature of the fluorine-containing polymer (C) may be controlled by selecting conditions such as the types and proportions of the fluorine-containing monomers and other monomers.

The melting point of the fluorine-containing polymer (C) is selected appropriately in accordance with the purpose, use application and how the polymer is used. When the polymer is coextruded together with components such as the aliphatic polyamide composition (A) and the semi-aromatic polyamide composition (B), the melting point is preferably close to a temperature at which the forming of the resins will take place. It is therefore preferable that the melting point of the fluorine-containing polymer (C) be optimized by appropriately controlling the ratio of the fluorine-containing monomers, other monomers and functional group-containing monomers described later.

Here, the melting point is defined as a temperature measured in such a manner that a sample is heated to a temperature above the expected melting point with use of a differential scanning calorimeter, then cooled to 30° C. at a rate of 10° C. per minute, allowed to stand for about 1 minute, and heated at a rate of 10° C. per minute while recording a fusion curve, and the peak-top temperature of the curve is adopted as the melting point.

The fluorine-containing polymer (C), in its molecular structure, has a functional group that is reactive to an amino group. Such functional groups may be present in any of molecular terminals, side chains and the main chain of the fluorine-containing polymer (C). The functional groups present in the fluorine-containing polymer (C) may belong to a single type, or two or more types. The type and content of the functional groups are determined appropriately in accordance with factors such as the type of a material that will be stacked on the fluorine-containing polymer (C), shape, use application, the level of interlayer adhesion that is required, bonding method, and the method for introducing the functional groups.

The functional group that is reactive to an amino group may be at least one selected from the group consisting of carboxyl group, acid anhydride group or carboxylate salt, sulfo group or sulfonate salt, epoxy group, cyano group, carbonate group and haloformyl group, and is preferably at least one selected from the group consisting of carboxyl group, acid anhydride group or carboxylate salt, epoxy group, carbonate group and haloformyl group.

The reactive functional groups may be introduced into the fluorine-containing polymer (C) by a method (i) in which the monomers for the fluorine-containing polymer (C) are copolymerized with a copolymerizable monomer having the functional group, a method (ii) in which the functional groups are introduced to molecular terminals of the fluorine-containing polymer (C) during polymerization with use of, for example, a polymerization initiator or a chain transfer agent, and a method (iii) in which a compound having the reactive functional group and a grafting functional group (a grafting compound) is grafted to the fluorine-containing polymer. These introduction methods may be used singly or in appropriate combination. In consideration of interlayer adhesion in the multilayer tube, the fluorine-containing polymer (C) is preferably one produced by the method (i) or (ii). For details of the method (iii), reference may be made to Japanese Patent Application Kokai Publication No. H7-18035, Japanese Patent Application Kokai Publication No. H7-25952, Japanese Patent Application Kokai Publication No. H7-25954, Japanese Patent Application Kokai Publication No. H7-173230, Japanese Patent Application Kokai Publication No. H7-173446, Japanese Patent Application Kokai Publication No. H7-173447 and Japanese Patent Kohyo Publication No. H10-503236. Hereinbelow, there will be described the method (i) in which the monomers for the fluorine-containing polymer are copolymerized with a copolymerizable monomer having the functional group, and the method (ii) in which the functional groups are introduced to molecular terminals of the fluorine-containing polymer with use of a polymerization initiator or the like.

In the method (i) in which the monomers for the fluorine-containing polymer (C) are copolymerized with a copolymerizable monomer having the functional group (hereinafter, sometimes written simply as the functional group-containing monomer), use is made of a monomer containing at least one or more functional groups selected from the group consisting of carboxyl group, acid anhydride group or carboxylate salt, hydroxyl group, sulfo group or sulfonate salt, epoxy group and cyano group. Examples of the functional group-containing monomers include functional group-containing fluorine-free monomers and functional group-containing fluorine-containing monomers.

Examples of the functional group-containing fluorine-free monomers include unsaturated carboxylic acids and derivatives such as esters thereof, such as acrylic acid, halogenated (except fluorinated) acrylic acid, methacrylic acid, halogenated (except fluorinated) methacrylic acid, maleic acid, halogenated (except fluorinated) maleic acid, fumaric acid, halogenated (except fluorinated) fumaric acid, itaconic acid, citraconic acid, crotonic acid and endobicyclo-[2.2.1]-5-heptene-2,3-dicarboxylic acid; carboxyl group-containing monomers such as maleic anhydride, itaconic anhydride, succinic anhydride, citraconic anhydride and endobicyclo-[2.2.1]-5-heptene-2,3-dicarboxylic anhydride; and epoxy group-containing monomers such as glycidyl acrylate, glycidyl methacrylate and glycidyl ether. These may be used singly, or two or more may be used in combination. The functional group-containing fluorine-free monomer is selected in consideration of the copolymerizability with the fluorine-containing monomer that is used. By selecting an appropriate functional group-containing fluorine-free monomer, the polymerization is allowed to take place satisfactorily and the functional group-containing fluorine-free monomer is easily introduced into the main chain uniformly, with the result that less monomer remains unreacted and the amount of impurities can be reduced.

Examples of the functional group-containing fluorine-containing monomers include unsaturated compounds represented by the general formula $CX^3X^4=CX^5—(R^7)_n—Y$ (wherein Y is a functional group selected from the group consisting of —COOM (M is a hydrogen atom or an alkali metal), a carboxyl-derived group, —$SO_3M$ (M is a hydrogen atom or an alkali metal), a sulfonic acid-derived group, an epoxy group and —CN, $X^3$, $X^4$ and $X^5$ are the same as or different from one another and are each a hydrogen atom or a fluorine atom (with the proviso that when $X^3$, $X^4$ and $X^5$ are all hydrogen atoms, n=1 and $R^7$ includes a fluorine atom), $R^7$ is a $C_{1-40}$ alkylene group, a $C_{1-40}$ fluorine-containing oxyalkylene group, a $C_{1-40}$ fluorine-containing alkylene group having an ether bond, or a $C_{1-40}$ fluorine-containing oxyalkylene group having an ether bond, and n is 0 or 1).

Examples of the carboxyl-derived groups represented by Y in the above general formula include those groups represented by the general formula —C(=O)$Q^1$ (wherein $Q^1$ is —$OR^8$, —$NH_2$, F, Cl, Br or I, and $R^8$ is a $C_{1-20}$ alkyl group or a $C_{6-22}$ aryl group).

Examples of the sulfonic acid-derived groups represented by Y in the above general formula include those groups represented by the general formula —$SO_2Q^2$ (wherein $Q^2$ is —$OR^9$, —$NH_2$, F, Cl, Br or I, and $R^9$ is a $C_{1-20}$ alkyl group or a $C_{6-22}$ aryl group.

Preferably, Y is —COOH, —$SO_3H$, —$SO_3Na$, —$SO_2F$ or —CN.

Examples of the functional group-containing fluorine-containing monomers wherein the functional group has a carbonyl group include perfluoroacryloyl fluoride, 1-fluoroacryloyl fluoride, acryloyl fluoride, 1-trifluoromethacryloyl fluoride and perfluorobutenoic acid. These may be used singly, or two or more may be used in combination.

To ensure sufficient interlayer adhesion and to make sure that the interlayer adhesion will not be decreased under any use environmental conditions and sufficient heat resistance will be attained, and thereby to prevent the occurrence of problems such as bonding failure, coloration and foaming during processing at high temperatures, as well as separation, coloration, foaming and leaching due to decomposition during use at high temperatures, the content of the functional group-containing monomer in the fluorine-containing polymer (C) is preferably not less than 0.01 mol % and not more than 5.0 mol % of all the units that are polymerized, and is more preferably not less than 0.015 mol % and not more than 4.0 mol %, and still more preferably not less than 0.02 mol % and not more than 3.0 mol %. When the content of the functional group-containing monomer is in the above range, the fluorine-containing polymer (C) can be produced without a decrease in polymerization rate and also attains excellent adhesion with respect to a mating material that is stacked therewith. The functional group-containing monomer may be added in any manner without limitation, and may be added at once at the start of the polymerization or may be added continuously during the polymerization. The manner of the addition is selected appropriately in accordance with the decomposition reactivity of the polymerization initiator and the polymerization temperature. Preferably, the consumption of the functional group-containing monomer by the polymerization is compensated for by continuous or intermittent addition of the corresponding amount of the monomer to the polymerization vessel so that the concentration of the functional group-containing monomer will be kept in the aforementioned range.

Incidentally, 0.01 mol % of the functional group-containing monomer in the fluorine-containing copolymer (C) relative to all the units that are polymerized corresponds to 100 functional group residues in the fluorine-containing copolymer (C) per $1 \times 10^6$ carbon atoms in the main chain of the fluorine-containing copolymer (C). 5.0 mol % of the functional group-containing monomer relative to all the units in the fluorine-containing copolymer (C) corresponds to 50,000 functional group residues in the fluorine-containing copolymer (C) per $1 \times 10^6$ carbon atoms in the main chain of the fluorine-containing copolymer (C). As long as the content described above is satisfied, the polymer may be a mixture of the fluorine-containing polymer having the functional groups, and the fluorine-containing polymer having no functional groups.

In the method (ii) in which the functional groups are introduced to molecular terminals of the fluorine-containing polymer with use of a polymerization initiator or the like, the functional groups are introduced to one or both ends of the molecular chain of the fluorine-containing polymer. The functional groups that are introduced to terminals are preferably carbonate groups or haloformyl groups.

The carbonate groups introduced as terminal groups in the fluorine-containing polymer (C) are generally groups having an —OC(=O)O— bond, and specifically have a structure represented by —OC(=O)O—$R^{10}$ group [$R^{10}$ is a hydrogen atom, an organic group (for example, a $C_{1-20}$ alkyl group, or a $C_{2-20}$ alkyl group having an ether bond) or a Group I, II or VII element], such as —OC(=O)OCH$_3$, —OC(=O)OC$_3$H$_7$, —OC(=O)OC$_8$H$_{17}$ and —OC(=O)OCH$_2$CH$_2$OCH$_2$CH$_3$. The haloformyl groups specifically have a structure represented by —COZ [Z is a halogen element], such as —COF and —COCl. These may be used singly, or two or more may be used in combination.

The carbonate groups may be introduced to the molecular terminals of the polymer by various methods using a polymerization initiator and/or a chain transfer agent. From the point of view of performances such as economic efficiency, heat resistance and chemical resistance, a method using a peroxide, in particular, a peroxycarbonate and/or a peroxyester as a polymerization initiator may be preferably adopted. By this method, the groups that are introduced to the polymer terminals are the carbonyl groups derived from the peroxide, for example, carbonate groups derived from the peroxycarbonate, ester groups derived from the peroxyester, or haloformyl groups or the like converted from these functional groups. Of the polymerization initiators, peroxycarbonates are more preferably used for the reasons that the polymerization temperature can be decreased and the initiation reaction does not involve side reactions.

The haloformyl groups may be introduced to the molecular terminals of the polymer by various methods. For example, the fluorine-containing polymer described above which has the carbonate groups at the terminals may be heated to thermally decompose (decarboxylate) the carbonate groups.

Examples of the peroxycarbonates include diisopropyl peroxycarbonate, di-n-propyl peroxycarbonate, t-butyl peroxyisopropyl carbonate, t-butyl peroxymethacryloyloxyethyl carbonate, bis(4-t-butylcyclohexyl) peroxydicarbonate and di-2-ethylhexyl peroxydicarbonate. These may be used singly, or two or more may be used in combination.

The amount in which the peroxycarbonate is used is variable depending on the type (such as the composition) and molecular weight of the target polymer, polymerization conditions and the type of the initiator that is used. To control the polymerization rate appropriately and to ensure sufficient polymerization rate, the amount is preferably not less than 0.05 parts by mass and not more than 20 parts by mass per 100 parts by mass of the whole polymer obtained by the polymerization, and is more preferably not less than 0.1 part by mass and not more than 10 parts by mass. The content of the carbonate groups at the molecular terminals of the polymer may be controlled by controlling the polymerization conditions. The polymerization initiator may be added in any manner without limitation, and may be added at once at the start of the polymerization or may be added continuously during the polymerization. The manner of the addition is selected appropriately in accordance with the decomposition reactivity of the polymerization initiator and the polymerization temperature.

To ensure sufficient interlayer adhesion and to make sure that the interlayer adhesion will not be decreased under any use environmental conditions and sufficient heat resistance will be attained, and thereby to prevent the occurrence of problems such as bonding failure, coloration and foaming during processing at high temperatures, as well as separation, coloration, foaming and leaching due to decomposition during use at high temperatures, the number of the terminal functional groups per $10^6$ carbon atoms in the main chain of the fluorine-containing polymer (C) is preferably not less than 150 and not more than 3,000, more preferably not less than 200 and not more than 2,000, and still more preferably not less than 300 and not more than 1,000. As long as the number of the functional groups described above is satisfied, the polymer may be a mixture of the fluorine-containing polymer having the functional groups, and the fluorine-containing polymer having no functional groups.

As described above, the fluorine-containing polymer (C) is a fluorine-containing polymer in which a functional group reactive to an amino group is introduced. As described earlier, the fluorine-containing polymer (C) having such functional groups still exhibits the superior characteristics inherent to fluorine-containing polymers such as heat resistance, water resistance, low frictional properties, chemical resistance, weather resistance, antifouling properties and barrier properties to chemical medias, and is advantageous in terms of productivity and cost.

By virtue of the functional groups reactive to amino groups being introduced in the molecular chains, the polymer used in a multilayer tube can attain direct and superior interlayer adhesion with respect to various materials which are bondable therewith with no or only insufficient interlayer adhesion, without special treatments such as surface treatment and/or application of adhesive resins.

The fluorine-containing polymer (C) may contain various fillers such as inorganic powders, glass fibers, carbon fibers, metal oxides and carbon in accordance with purpose or use application as long as its performance is not deteriorated. Besides fillers, other additives such as pigments and ultraviolet absorbers may be added appropriately. Besides such additives, other resins such as fluororesins and thermoplastic resins, synthetic rubbers and the like can also be added. The addition of these components makes it possible, for example, to improve mechanical characteristics and weather resistance, to impart design, to prevent static generation, and to improve formability.

[Multilayer Tubes]

In a first aspect, a multilayer tube includes at least two layers including a layer (a) and a layer (b), and at least one pair of the layer (a) and the layer (b) are disposed adjacent to each other.

In the multilayer tube of the first aspect, the layer (b) is essential and offers good barrier properties to chemical medias, in particular, good hydrocarbon barrier properties of the multilayer tube. Further, the multilayer tube attains excellent and highly interlayer adhesion and durability thereof by virtue of the layer (a) and the layer (b) being disposed adjacent to each other.

In a preferred embodiment, the layer (b) is disposed inside the layer (a). In a more preferred embodiment, the layer (a) is disposed outermost in the multilayer tube. As a result of the layer (a) being disposed outermost, the multilayer tube that is obtained attains superior chemical resistance and flexibility.

In a still more preferred embodiment, the layer (b) is disposed innermost in the multilayer tube. As a result of the layer (b) being disposed innermost, the multilayer tube that is obtained attains superior fuel deterioration resistance and causes less leaching of low-molecular components such as monomers and oligomers during contact with alcohol-containing gasoline. That is, the multilayer tube according to a more preferred embodiment is such that the layer (a) is disposed outermost and the layer (b) is disposed innermost.

In the multilayer tube in the first aspect, the innermost layer of the multilayer tube may be a conductive layer which includes a semi-aromatic polyamide composition (B) containing a conductive filler. In this case, the multilayer tube attains excellent barrier properties to chemical medias and fuel deterioration resistance and causes less leaching of monomers and oligomers, and, when used as a fuel piping tube, makes it possible to prevent the fuel from being ignited by spark generated by the internal friction of the fuel circulating in the pipes or the friction of the fuel with the tube wall. In this case, low-temperature impact resistance and conductivity can be satisfied at the same time by arranging a layer which includes a semi-aromatic polyamide having no conductivity, outside the conductive layer. This approach is also advantageous in economic efficiency.

When, for example, a flammable fluid such as gasoline is in continuous contact with an insulator such as a resin, the insulator accumulates static electricity to cause a risk of ignition. The term conductive or conductivity mentioned above means that the material has such an extent of electrical characteristics that it does not accumulate static electricity. By having this property, the material can prevent explosion caused by static electricity generated during transfer of a fluid such as fuel.

The conductive fillers are all kinds of fillers that are added to impart conductive performance to resins, with examples including particulate fillers, flake-shaped fillers and fibrous fillers.

Examples of the particulate fillers include carbon blacks and graphites. Examples of the flake-shaped fillers include aluminum flakes, nickel flakes and nickel-coated mica. Examples of the fibrous fillers include carbon fibers, carbon-coated ceramic fibers, carbon whiskers, carbon nanotubes, and metal fibers such as aluminum fibers, copper fibers, brass fibers and stainless steel fibers. These may be used singly, or two or more may be used in combination. Of these, carbon nanotubes and carbon blacks are preferable.

Carbon nanotubes are also called hollow carbon fibrils. This fibril is a substantially cylindrical fibril which has an outer region including a plurality of substantially continuous layers of regularly arranged carbon atoms, and an inner hollow region, each layer and the hollow region being disposed substantially concentrically around the cylindrical axis of the fibril. Further, it is preferable that the carbon atoms regularly arranged in the outer region be graphitic, and the diameter of the hollow region be not less than 2 nm and not more than 20 nm. To attain sufficient dispersion in the resin and to impart good conductivity to the obtainable resin shaped articles, the outer diameter of the carbon nanotubes is preferably not less than 3.5 nm and not more than 70 nm, and more preferably not less than 4 nm and not more than 60 nm. The aspect ratio (the length/outer diameter ratio) of the carbon nanotubes is preferably not less than 5, more preferably not less than 100, and still more preferably not less than 500. The satisfaction of this aspect ratio ensures that a conductive network will be formed easily and excellent conductivity is realized at a small dose.

The carbon blacks include all kinds of carbon blacks generally used to impart conductivity. Some preferred carbon blacks are, although not limited to, acetylene blacks obtained by incomplete combustion of acetylene gas, furnace blacks such as Ketjen black produced by furnace type incomplete combustion of crude oil as a raw material, oil blacks, naphthalene blacks, thermal blacks, lamp blacks, channel blacks, roll blacks and disc blacks. Of these, acetylene blacks and furnace blacks are more preferable.

Carbon blacks are produced in the form of various carbon powders with different characteristics such as particle size, surface area, DBP oil absorption value and ash content. Although such characteristics of carbon blacks are not particularly limited, those carbon blacks having a good chain structure and a high cohesive density are preferable. A high dose of carbon black is not preferable from the point of view of impact resistance. To obtain excellent electrical conductivity at a smaller dose, the average particle size is preferably not more than 500 nm, more preferably not less than 5 nm and not more than 100 nm, still more preferably not less than 10 nm and not more than 70 nm, the surface area (BET method) is preferably not less than 10 $m^2/g$, more preferably not less than 30 $m^2/g$, still more preferably not less than 50 $m^2/g$, and the DBP (dibutyl phthalate) oil absorption value is preferably not less than 50 ml/100 g, more preferably not less than 100 ml/100 g, and still more preferably not less than 150 ml/100 g. Further, the ash content is preferably not more than 0.5% by mass, and more preferably not more than 0.3% by mass. Here, the DBP oil absorption value is a value measured by the method specified in ASTM D-2414. The volatile content in the carbon black is preferably less than 1% by mass.

These conductive fillers may be surface treated with surface treatment agents such as titanate-based agents, aluminum-based agents and silane-based agents. Granulated conductive fillers may be used to enhance melt kneading workability.

The content of the conductive filler is not limited and is variable depending on the type of the conductive filler that is used. From the point of view of the balance between conductivity and other properties such as fluidity and mechanical strength, it is generally preferable that the content be not less than 3 parts by mass and not more than 30 parts by mass per 100 parts by mass of the semi-aromatic polyamide (B1) or the semi-aromatic polyamide (B2).

To obtain sufficient antistatic performance, the surface resistivity of a melt extrudate of the conductive filler is preferably not more than $10^8$ Ω/square, and more preferably not more than $10^6$ Ω/square. The addition of the conductive filler tends to result in deteriorations in strength and fluidity. Thus, a lower content of the conductive filler is more preferable as long as the desired level of conductivity is obtained.

In the multilayer tube of the first aspect, the thicknesses of the respective layers are not particularly limited and may be controlled in accordance with factors such as the types of the polymers forming the layers, the total number of layers in the multilayer tube, and the purpose of use. The thicknesses of the respective layers are determined in consideration of characteristics such as the barrier properties to chemical medias, low-temperature impact resistance and flexibility of the multilayer tube. Generally, the thicknesses of the layer (a) and the layer (b) are each preferably not less than 3% and not more than 90% of the total thickness of the multilayer tube. In consideration of the balance between low-temperature impact resistance and barrier properties to chemical medias, the thickness of the layer (b) is preferably not less than 5% and not more than 50%, and more preferably not less than 7% and not more than 30% of the total thickness of the multilayer tube.

The total number of layers in the multilayer tube of the first aspect is not particularly limited as long as there are at least two layers including the layer (a) and the layer (b). To attain an additional function or an economical advantage, the multilayer tube of the first aspect may have one, or two or more layers including an additional thermoplastic resin in addition to the layer (a) and the layer (b). The number of layers in the multilayer tube of the first aspect is at least two, and is preferably not more than 8, and more preferably not less than 2 and not more than 7 in light of the mechanism of a tube production apparatus.

A multilayer tube of the second aspect includes at least three layers combining the first aspect and a layer (c). At least one pair of the layer (b) and the layer (c) are disposed adjacent to each other.

In the multilayer tube of the second aspect, the layer (b) is essential and offers good barrier properties to chemical medias, in particular, good hydrocarbon barrier properties of the multilayer tube. Further, the layer (c) is also essential and offers good barrier properties to chemical medias of the multilayer tube, in particular, barrier properties to alcohols and high-alcohol gasolines. The multilayer tube attains excellent and highly interlayer adhesion and durability thereof by virtue of the layer (b) and the layer (c) being disposed adjacent to each other.

In a preferred embodiment, the layer (c) is disposed inside the layer (b). Further, the layer (b) is disposed between the layer (a) and the layer (c). In a more preferred embodiment, the layer (a) is disposed outermost in the multilayer tube. As a result of the layer (a) being disposed outermost, the multilayer tube that is obtained attains superior chemical resistance and flexibility. The layer (b) is disposed between the layer (a) and the layer (c).

In a still more preferred embodiment, the layer (c) is disposed innermost. As a result of this configuration, the multilayer tube that is obtained attains superior fuel deterioration resistance and causes less leaching of low-molecular components such as monomers and oligomers during contact with alcohol-containing gasoline. That is, the multilayer tube according to a preferred embodiment is such that the layer (a) is disposed outermost, the layer (b) in the middle, and the layer (c) is disposed innermost.

In the multilayer tube in the second aspect, the innermost layer of the multilayer tube may be a conductive layer which includes a fluorine-containing polymer composition containing a conductive filler. In this case, the multilayer tube attains excellent barrier properties to chemical medias and fuel deterioration resistance and causes less leaching of monomers and oligomers, and, when used as a fuel piping tube, makes it possible to prevent the fuel from being ignited by spark generated by the internal friction of the fuel circulating in the pipes or the friction of the fuel with the tube wall. In this case, low-temperature impact resistance and conductivity can be satisfied at the same time by arranging a layer which includes a fluorine-containing polymer having no conductivity, outside the conductive layer. This approach is also advantageous in economic efficiency. The term fluorine-containing polymer as used herein comprehends the fluorine-containing polymers (C) having a functional group in the molecular chain, and also fluorine-containing polymers having no functional groups that will be described later.

Details of the conductivity and the conductive fillers are the same as described with respect to the multilayer tube of the first aspect.

The content of the conductive filler is not limited and is variable depending on the type of the conductive filler that is used. From the point of view of the balance between conductivity and other properties such as fluidity and mechanical strength, it is generally preferable that the content be not less than 3 parts by mass and not more than 30 parts by mass per 100 parts by mass of the fluorine-containing polymer.

To obtain sufficient antistatic performance, the surface resistivity of a melt extrudate of the conductive filler is preferably not more than $10^8$ Ω/square, and more preferably not more than $10^6$ Ω/square. The addition of the conductive filler tends to result in deteriorations in strength and fluidity. Thus, a lower content of the conductive filler is more preferable as long as the desired level of conductivity is obtained.

In the multilayer tube of the second aspect, the thicknesses of the respective layers are not particularly limited and may be controlled in accordance with factors such as the types of the polymers forming the layers, the total number of layers in the multilayer tube, and the purpose of use. The thicknesses of the respective layers are determined in consideration of characteristics such as the barrier properties to chemical medias, low-temperature impact resistance and flexibility of the multilayer tube. Generally, the thicknesses of the layer (a), the layer (b) and the layer (c) are each preferably not less than 3% and not more than 90% of the total thickness of the multilayer tube. In consideration of the balance between low-temperature impact resistance and barrier properties to chemical medias, the thicknesses of the layer (b) and the layer (c) are each more preferably not less than 5% and not more than 50%, and still more preferably not less than 7% and not more than 30% of the total thickness of the multilayer tube.

The total number of layers in the multilayer tube of the second aspect is not particularly limited as long as there are at least three layers including the layer (a), the layer (b) and the layer (c). To attain an additional function or an economical advantage, the multilayer tube of the second aspect may have one, or two or more layers including an additional thermoplastic resin in addition to the layer (a), the layer (b) and the layer (c). The number of layers in the multilayer tube of the second aspect is at least three, and is preferably not more than 8, and more preferably not less than 3 and not more than 7 in light of the mechanism of a tube production apparatus.

Examples of the additional thermoplastic resins in the multilayer tubes of the first aspect and the second aspect include polyamide resins, except for the polyamides (A1), the polyamides (A2) other than the polyamides (A1), the semi-aromatic polyamides (B1) and the semi-aromatic polyamides (B2), such as polymetaxylylene terephthalamide (polyamide MXDT), polymetaxylylene isophthalamide (polyamide MXDI), polymetaxylylene hexahydroterephthalamide (polyamide MXDT(H)), polymetaxylylene naphthalamide (polyamide MXDN), polyparaxylylene adipamide (polyamide PXD6), polyparaxylylene terephthalamide (polyamide PXDT), polyparaxylylene isophthalamide (polyamide PXDI), polyparaxylylene hexahydroterephthalamide (polyamide PXDT(H)), polyparaxylylene naphthalamide (polyamide PXDN), polyparaphenylene terephthalamide (PPTA), polyparaphenylene isophthalamide (PPIA), polymetaphenylene terephthalamide (PMTA), polymetaphenylene isophthalamide (PMIA), poly(2,6-naphthalenedimethylene adipamide) (polyamide 2,6-BAN6), poly(2,6-naphthalenedimethylene terephthalamide) (polyamide 2,6-BANT), poly(2,6-naphthalenedimethylene isophthalamide) (polyamide 2,6-BANI), poly(2,6-naphthalenedimethylene hexahydroterephthalamide) (polyamide 2,6-BANT(H)), poly(2,6-naphthalenedimethylene naphthalamide) (polyamide 2,6-BANN), poly(1,3-cyclohexanedimethylene adipamide) (polyamide 1,3-BAC6), poly(1,3-cyclohexanedimethylene suberamide (polyamide 1,3-BAC8), poly(1,3-cyclohexanedimethylene azelamide) (polyamide 1,3-BAC9), poly(1,3-cyclohexanedimethylene sebacamide) (polyamide 1,3-BAC10), poly(1,3-cyclohexanedimethylene dodecamide) (polyamide 1,3-BAC12), poly(1,3-cyclohexanedimethylene terephthalamide) (polyamide 1,3-BACT), poly(1,3-cyclohexanedimethylene isophthalamide) (polyamide 1,3-BACI), poly(1,3-cyclohexanedimethylene hexahydroterephthalamide) (polyamide 1,3-BACT(H)), poly(1,3-cyclohexanedimethylene naphthalamide) (polyamide 1,3-BACN), poly(1,4-cyclohexanedimethylene adipamide) (polyamide 1,4-BAC6), poly(1,4-cyclohexanedimethylene suberamide) (polyamide 1,4-BAC8), poly(1,4-cyclohexanedimethylene azelamide) (polyamide 1,4-BAC9), poly(1,4-cyclohexanedimethylene sebacamide) (polyamide 1,4-BAC10), poly(1,4-cyclohexanedimethylene dodecamide) (polyamide 1,4-BAC12), poly(1,4-cyclohexanedimethylene terephthalamide) (polyamide 1,4-BACT), poly(1,4-cyclohexanedimethylene isophthalamide) (polyamide 1,4-BACI), poly(1,4-cyclohexanedimethylene hexahydroterephthalamide) (polyamide 1,4-BACT(H)), poly(1,4-cyclohexanedimethylene naphthalamide) (polyamide 1,4-BACN), poly(4,4'-methylenebiscyclohexylene adipamide) (polyamide PACM6), poly(4,4'-methylenebiscyclohexylene suberamide) (polyamide PACM8), poly(4,4'-methylenebiscyclohexylene azelamide) (polyamide PACM9), poly(4,4'-methylenebiscyclohexylene sebacamide) (polyamide PACM10), poly(4,4'-methylenebiscyclohexylene dodecamide) (polyamide PACM12), poly(4,4'-methylenebiscyclohexylene tetradecamide) (polyamide PACM14), poly(4,4'-methylenebiscyclohexylene hexadecamide) (polyamide PACM16), poly(4,4'-methylenebiscyclohexylene octadecamide) (polyamide PACM18), poly(4,4'-methylenebiscyclohexylene terephthalamide) (polyamide PACMT), poly(4,4'-methylenebiscyclohexylene isophthalamide) (polyamide PACMI), poly(4,4'-methylenebiscyclohexylene hexahydroterephthalamide) (polyamide PACMT(H)), poly(4,4'-methylenebiscyclohexylene naphthalamide) (polyamide PACMN), poly(4,4'-methylenebis(2-methyl-cyclohexylene) adipamide) (polyamide MACM6), poly(4,4'-methylenebis(2-methyl-cyclohexylene) suberamide) (polyamide MACM8), poly(4,4'-methylenebis(2-methyl-cyclohexylene) azelamide) (polyamide MACM9), poly(4,4'-methylenebis(2-methyl-cyclohexylene) sebacamide) (polyamide MACM10), poly(4,4'-methylenebis(2-methyl-cyclohexylene) dodecamide) (polyamide MACM12), poly(4,4'-methylenebis(2-methyl-cyclohexylene) tetradecamide) (polyamide MACM14), poly(4,4'-methylenebis(2-methyl-cyclohexylene) hexadecamide) (polyamide MACM16), poly(4,4'-methylenebis(2-methyl-cyclohexylene) octadecamide) (polyamide MACM18), poly(4,4'-methylenebis(2-methyl-cyclohexylene) terephthalamide) (polyamide MACMT), poly(4,4'-methylenebis(2-methyl-cyclohexylene) isophthalamide) (polyamide MACMI), poly(4,4'-methylenebis(2-methyl-cyclohexylene) hexahydroterephthalamide) (polyamide MACMT(H)), poly(4,4'-methylenebis(2-methyl-cyclohexylene) naphthalamide) (polyamide MACMN), poly(4,4'-propylenebiscyclohexylene adipamide) (polyamide PACP6), poly(4,4'-propylenebiscyclohexylene suberamide) (polyamide PACP8), poly(4,4'-propylenebiscyclohexylene azelamide) (polyamide PACP9), poly(4,4'-propylenebiscyclohexylene sebacamide) (polyamide PACP10), poly(4,4'-propylenebiscyclohexylene dodecamide) (polyamide PACP12), poly(4,4'-propylenebiscyclohexylene tetradecamide) (polyamide PACP14), poly(4,4'-propylenebiscyclohexylene hexadecamide) (polyamide PACP16), poly(4,4'-propylenebiscyclohexylene octadecamide) (polyamide PACP18), poly(4,4'-propylenebiscyclohexylene terephthalamide) (polyamide PACPT), poly(4,4'-propylenebiscyclohexylene isophthalamide) (polyamide PACPI), poly(4,4'-propylenebiscyclohexylene hexahydroterephthalamide) (polyamide PACPT(H)), poly(4,4'-propylenebiscyclohexylene naphthalamide) (polyamide PACPN), polyisophorone adipamide (polyamide IPD6), polyisophorone suberamide (polyamide IPD8), polyisophorone azelamide (polyamide IPD9), polyisophorone sebacamide (polyamide IPD10), polyisophorone dodecamide (polyamide IPD12), polyisophorone terephthalamide (polyamide IPDT), polyisophorone isophthalamide (polyamide IPDI), polyisophorone hexahydroterephthalamide (polyamide IPDT(H)), polyisophorone naphthalamide (polyamide IPDN), polytetramethylene hexahydroterephthalamide (polyamide 4T(H)), polytetramethylene naphthalamide (polyamide 4N), polypentamethylene hexahydroterephthalamide (polyamide 5T(H)), polypentamethylene naphthalamide (polyamide 5N), polyhexamethylene hexahydroterephthalamide (polyamide 6T(H)), polyhexamethylene naphthalamide (polyamide 6N), poly(2-methylpentamethylene hexahydroterephthalamide) (polyamide M5T(H)), poly(2-methylpentamethylene naphthalamide) (polyamide M5N), polynonamethylene hexahydroterephthalamide (polyamide 9T(H)), poly(2-methyloctamethylene hexahydroterephthalamide) (polyamide M8T(H)), polytrimethylhexamethylene isophthalamide (polyamide TMHI), polytrimethylhexamethylene hexahydroterephthalamide (polyamide TMHT(H)), polydecamethylene isophthalamide (polyamide 10I), polydecamethylene hexahydroterephthalamide (polyamide 10T(H)), polyundecamethylene isophthalamide (polyamide 11I), polyundecamethylene hexahydroterephthalamide (polyamide 11T(H)), polydodecamethylene isophthalamide (polyamide 12I), polydodecamethylene hexahydroterephthalamide (polyamide 12T(H)), and copolymers constituted by a plurality of monomers selected from the monomers constituting the above polyamides and/or selected from the monomers constituting the polyamides (A1) and the polyamides (A2) other than the polyamides (A1).

Examples further include fluorine-containing polymers which contain no functional groups reactive to amino groups, such as polyvinylidene fluoride (PVDF), polyvinyl fluoride (PVF), polytetrafluoroethylene (PTFE), polychlorotrifluoroethylene (PCTFE), tetrafluoroethylene/perfluoro (alkyl vinyl ether) copolymer (PFA), tetrafluoroethylene/hexafluoropropylene copolymer (FEP), tetrafluoroethylene/perfluoro(alkyl vinyl ether)/hexafluoropropylene copolymer, ethylene/tetrafluoroethylene copolymer (ETFE), ethylene/tetrafluoroethylene/hexafluoropropylene copolymer (EFEP), vinylidene fluoride/tetrafluoroethylene copolymer, vinylidene fluoride/hexafluoropropylene copolymer, vinylidene fluoride/perfluoro(alkyl vinyl ether) copolymer, tetrafluoroethylene/hexafluoropropylene/vinylidene fluoride copolymer (THV), vinylidene fluoride/perfluoro(alkyl vinyl ether)/tetrafluoroethylene copolymer, tetrafluoroethylene/hexafluoropropylene/vinylidene fluoride/perfluoro(alkyl vinyl ether) copolymer, ethylene/chlorotrifluoro ethylene copolymer (ECTFE), chlorotrifluoroethylene/tetrafluoro ethylene copolymer, vinylidene fluoride/chlorotrifluoro ethylene copolymer, chlorotrifluoroethylene/perfluoro(alkyl vinyl ether) copolymer, chlorotrifluoroethylene/hexafluoropropylene copolymer, chlorotrifluoroethylene/tetrafluoroethylene/hexafluoropropylene copolymer, chlorotrifluoroethylene/tetrafluoroethylene/vinylidene fluoride copolymer, chlorotrifluoroethylene/perfluoro(alkyl vinyl ether)/tetrafluoroethylene copolymer (CPT), chlorotrifluoroethylene/perfluoro(alkyl vinyl ether)/hexafluoropropylene copolymer, chlorotrifluoroethylene/tetrafluoroethylene/hexafluoropropylene/perfluoro(alkyl vinyl ether) copolymer, chlorotrifluoroethylene/tetrafluoroethylene/vinylidene fluoride/perfluoro(alkyl vinyl ether) copolymer, chlorotrifluoro ethylene/tetrafluoroethylene/vinylidene fluoride/hexafluoropropylene copolymer, and chlorotrifluoroethylene/tetrafluoroethylene/vinylidene fluoride/perfluoro (alkyl vinyl ether)/hexafluoropropylene copolymer.

When the multilayer tube has the layer (c), low-temperature impact resistance, barrier properties to chemical medias and environmental stress crack resistance can be satisfied at the same time by arranging a layer which includes a fluoropolymer having no functional groups, inside the layer (c). This approach is also advantageous in economic efficiency.

Examples further include polyolefin resins such as high-density polyethylene (HDPE), medium-density polyethylene (MDPE), low-density polyethylene (LDPE), linear low-density polyethylene (LLDPE), ultrahigh-molecular weight polyethylene (UHMWPE), polypropylene (PP), polybutene (PB), polymethylpentene (TPX), ethylene/propylene copolymer (EPR), ethylene/butene copolymer (EBR), ethylene/vinyl acetate copolymer (EVA), ethylene/acrylic acid copolymer (EAA), ethylene/methacrylic acid copolymer (EMAA), ethylene/methyl acrylate copolymer (EMA), ethylene/methyl methacrylate copolymer (EMMA) and ethylene/ethyl acrylate copolymer (EEA); polystyrene resins such as polystyrene (PS), syndiotactic polystyrene (SPS), methyl methacrylate/styrene copolymer (MS), methyl methacrylate/styrene/butadiene copolymer (MBS), styrene/butadiene copolymer (SBR), styrene/isoprene copolymer (SIR), styrene/isoprene/butadiene copolymer (SIBR), styrene/butadiene/styrene copolymer (SBS), styrene/isoprene/styrene copolymer (SIS), styrene/ethylene/butylene/styrene copolymer (SEBS) and styrene/ethylene/propylene/styrene copolymer (SEPS); the polyolefin resins and the polystyrene resins described above which further contain functional groups, for example, carboxyl groups such as acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid and endobicyclo-[2.2.1]-5-heptene-2,3-dicarboxylic acid, and metal salts thereof (Na, Zn, K, Ca and Mg) and acid anhydride groups thereof such as maleic anhydride, itaconic anhydride, citraconic anhydride and endobicyclo-[2.2.1]-5-heptene-2, 3-dicarboxylic anhydride, and epoxy groups such as glycidyl acrylate, glycidyl methacrylate, glycidyl ethacrylate, glycidyl itaconate and glycidyl citraconate; polyester resins such as polybutylene terephthalate (PBT), polyethylene terephthalate (PET), polyethylene isophthalate (PEI), poly(ethylene terephthalate/ethylene isophthalate) copolymer (PET/PEI), polytrimethylene terephthalate (PTT), polycyclohexanedimethylene terephthalate (PCT), polyethylene naphthalate (PEN), polybutylene naphthalate (PBN), polyarylate (PAR), liquid crystal polyester (LCP), polylactic acid (PLA) and polyglycolic acid (PGA); polyether resins such as polyacetal (POM) and polyphenylene ether (PPO); polysulfone resins such as polysulfone (PSU), polyethersulfone (PESU) and polyphenylsulfone (PPSU); polythioether resins such as polyphenylenesulfide (PPS) and polythioethersulfone (PTES); polyketone resins such as polyketone (PK), polyether ketone (PEK), polyether ether ketone (PEEK), polyether ketone ketone (PEKK), polyether ether ether ketone (PEEEK), polyether ether ketone ketone (PEEKK), polyether ketone ketone ketone (PEKKK) and polyether ketone ether ketone ketone (PEKEKK); polynitrile resins such as polyacrylonitrile (PAN), polymethacrylonitrile, acrylonitrile/styrene copolymer (AS), methacrylonitrile/styrene copolymer, acrylonitrile/butadiene/styrene copolymer (ABS) and acrylonitrile/butadiene copolymer (NBR); polymethacrylate resins such as polymethyl methacrylate (PMMA) and polyethyl methacrylate (PEMA); polyvinyl ester resins such as polyvinyl acetate (PVAc); polyvinyl chloride resins such as polyvinylidene chloride (PVDC), polyvinyl chloride (PVC), vinyl chloride/vinylidene chloride copolymer and vinylidene chloride/methyl acrylate copolymer; cellulose resins such as cellulose acetate and cellulose butyrate; polycarbonate resins such as polycarbonate (PC); polyimide resins such as thermoplastic polyimide (TPI), polyether imide, polyester imide, polyamide imide (PAI) and polyester amide imide; thermoplastic polyurethane resins; polyamide elastomers, polyurethane elastomers and polyester elastomers.

Of the thermoplastic resins described above, those polyester resins, polyamide resins, polythioether resins, polyolefin resins, and fluoropolymers containing no functional groups which each have a melting point of not more than 290° C. are preferably used in the multilayer tube of the first aspect from the points of view of melt stability and forming stability.

Further, of the thermoplastic resins described above, those polyester resins, polyamide resins, polythioether resins, polyolefin resins, and fluoropolymers containing no functional groups which each have a melting point of not more than 290° C. are preferably used in the multilayer tube of the second aspect from the points of view of melt stability and forming stability.

Substrates other than thermoplastic resins may be coated, with examples including paper, metallic materials, non-stretched, uniaxially stretched or biaxially stretched plastic films or sheets, woven fabrics, nonwoven fabrics, metallic fibers and wood. Examples of the metallic materials include metals such as aluminum, iron, copper, nickel, gold, silver, titanium, molybdenum, magnesium, manganese, lead, tin, chromium, beryllium, tungsten and cobalt, metal compounds, and alloys composed of two or more kinds of these metals, for example, alloyed steels such as stainless steel, aluminum alloys, copper alloys such as brass and bronze, and nickel alloys.

Some example methods for the production of the multilayer tubes are a method in which the materials are melt-extruded using as many extruders as the number of layers or the number of materials and are stacked simultaneously inside or outside the die (co-extrusion method), and a method in which a single-layer tube is produced beforehand or a multilayer tube is produced beforehand by the aforementioned method, and then resins are sequentially integrated or coated therewith, optionally via an adhesive, onto the outer surface (coating method). The multilayer tube is preferably produced by the co-extrusion method in which the materials are coextruded in a molten state and are thermally fused together (melt bonded) to form a stacked tube in a single step. That is, the method for the production of the multilayer tube preferably includes performing co-extrusion.

In the case where the multilayer tube to be obtained is of a complicated shape or, after its formation, is heated and bent into a final product, the target product may be obtained in such a manner that the multilayer tube that has been formed is heat treated at a temperature lower than the lowest melting point of the melting points of the resins that constitute the tube for 0.01 hour to 10 hours, thereby removing residual strain from the product.

The multilayer tube may have a wavy region. The wavy region is a region having a wave shape, a bellows shape, an accordion shape, a corrugated shape or the like. The wavy region may extend over the entire length of the multilayer tube or may be provided locally anywhere in an appropriate region. The wavy region may be easily formed by first forming a straight tube and then molding the tube to give it a predetermined wave shape or the like. The wavy region offers impact absorption and facilitates attachment. Further, the tube may be made into an L-shape, a U-shape or the like by, for example, fitting the tubes with necessary components such as connectors or by a bending process.

In consideration of flying stone damage, wear with other components and flame resistance, the outer periphery of the multilayer tube produced as described above may be entirely or partly provided with a solid or sponge-like protective member (protector) composed of, for example, natural rubber (NR), butadiene rubber (BR), isoprene rubber (IR), butyl rubber (IIR), chloroprene rubber (CR), carboxylated butadiene rubber (XBR), carboxylated chloroprene rubber (XCR), epichlorohydrin rubber (ECO), acrylonitrile butadiene rubber (NBR), hydrogenated acrylonitrile butadiene rubber (HNBR), carboxylated acrylonitrile butadiene rubber (XNBR), mixture of NBR and polyvinyl chloride, acrylonitrile isoprene rubber (NIR), chlorinated polyethylene rubber (CM), chlorosulfonated polyethylene rubber (CSM), ethylene propylene rubber (EPR), ethylene propylene diene rubber (EPDM), ethylene vinyl acetate rubber (EVM), NBR-EPDM mixed rubber, acrylic rubber (ACM), ethylene acrylic rubber (AEM), acrylate butadiene rubber (ABR), styrene butadiene rubber (SBR), carboxylated styrene butadiene rubber (XSBR), styrene isoprene rubber (SIR), styrene isoprene butadiene rubber (SIBR), urethane rubber, silicone rubber (MQ, VMQ), fluororubber (FKM, FFKM), fluorosilicone rubber (FVMQ) or a thermoplastic elastomer such as of vinyl chloride type, olefin type, ester type, urethane type or amide type. The protective member may be rendered porous like a sponge by a known technique. By being made porous, the protective member attains lightness in weight and superior thermal insulating properties, and further allows the material cost to be reduced. Glass fibers or the like may be added to improve the strength of the protective member. While the shape of the protective member is not particularly limited, the protective member is usually a tubular member or a block-like member having a recess for accommodating the multilayer tube. In the case of a tubular member, the multilayer tube may be inserted into a separately fabricated tubular member, or a tubular member may be extruded onto the multilayer tube so as to coat the multilayer tube intimately. The multilayer tube and the protective member may be formed into a single-piece structure by applying as required an adhesive onto the inner face or the recess of the protective member, inserting or fitting the multilayer tube thereinto, and bringing the two into tight contact. Reinforcement with metals or the like may be added.

The outer diameter of the multilayer tube is not limited and is designed in light of the flow rates of chemicals (for example, fuel such as alcohol-containing gasoline) or the like so that the tube is thick enough to avoid an increase in chemical permeation and to attain a burst pressure of usual tubes, and also enough to allow for such an extent of flexibility that the tube can be attached easily and exhibits good vibration resistance during use. Preferably, the outer diameter is not less than 4 mm and not more than 300 mm, the inner diameter is not less than 3 mm and not more than 250 mm, and the wall thickness is not less than 0.5 mm and not more than 25 mm.

The multilayer tubes of the present embodiments may be used in various applications, including mechanical components such as automobile parts, internal combustion engine applications and power tool housings, and further industrial materials, manufacturing industry materials, electric and electronic components, medical applications, food applications, home and office supplies, construction material-related components and furniture parts.

Further, the multilayer tubes are suited as chemical transfer tubes on account of their superior barrier properties to chemical medias. Examples of the chemicals include aromatic hydrocarbon solvents such as benzene, toluene and xylene; alcohols such as methanol, ethanol, propanol, butanol, pentanol, ethylene glycol, propylene glycol, diethylene glycol, phenol, cresol, polyethylene glycol and polypropylene glycol; phenol solvents; ether solvents such as dimethyl ether, dipropyl ether, methyl-t-butyl ether, ethyl-t-butyl ether, dioxane and tetrahydrofuran; halogen solvents such as chloroform, methylene chloride, trichloroethylene, ethylene dichloride, perchloroethylene, monochloroethane, dichloroethane, tetrachloroethane, perchloroethane and chlorobenzene; ketone solvents such as acetone, methyl ethyl ketone, diethyl ketone and acetophenone; gasoline, kerosene, diesel gasoline, alcohol-containing gasoline, ethyl-t-butyl ether-blended oxygen-containing gasoline, amine-containing gasoline, sour gasoline, castor oil-based brake fluid, glycol ether-based brake fluid, borate ester-based brake fluid, cold weather brake fluid, silicone oil-based brake fluid, mineral oil-based brake fluid, power steering oil, hydrogen sulfide-containing oil, window washer fluid, engine coolant, urea solutions, pharmaceutical agents, inks and paints. The multilayer tubes are suited as tubes for transferring the chemicals described above, with specific examples including fuel tubes such as feed tubes, return tubes, evaporation tubes, fuel filler tubes, ORVR tubes, reserve tubes and vent tubes, oil tubes, oil drilling tubes, brake tubes, window washer fluid tubes, long life coolant (LLC) tubes, reservoir tank tubes, urea solution transfer tubes, cooler tubes for cooling water, coolant and the like, air-conditioner coolant tubes, heater tubes, road heating tubes, floor heating tubes, infrastructure supply tubes, fire extinguisher or extinguishing equipment tubes, medical cooling equipment tubes, ink or paint spraying tubes, and other chemical tubes. The multilayer tubes are particularly suited as fuel tubes. That is, the scope of the present invention includes the use of the multilayer tube as a fuel tube.

EXAMPLES

Hereinbelow, the present invention will be described in detail by presenting Examples and Comparative Examples. However, it should be construed that the scope of the invention is not limited thereto.

The analytic methods and properties measurement methods used in Examples and Comparative Examples as well as the materials used in Examples and Comparative Examples are described below.

Characteristics of polyamide resins were measured by the following methods.

[Relative Viscosity]

The relative viscosity was measured at 96% sulfuric acid, 1% polyamide concentration and a temperature of 25° C. in accordance with JIS K-6920.

[Concentrations of Terminal Amino Groups in Polyamide (A1) and Polyamide (A2)]

A predetermined amount of a polyamide sample was placed into a conical flask equipped with a stopcock, and 40 mL of a preliminarily prepared phenol/methanol solvent (9/1 by volume) was added. Thereafter, the mixture was stirred with a magnetic stirrer to give a solution, which was titrated with 0.05 N hydrochloric acid using thymol blue as an indicator to determine the concentration of terminal amino groups.

[Concentrations of Terminal Carboxyl Groups in Polyamide (A1) and Polyamide (A2)]

A predetermined amount of a polyamide sample was placed into a three-necked pear-shaped flask, and 40 mL of benzyl alcohol was added. The flask was soaked in an oil bath set at 180° C. under a stream of nitrogen. The mixture was stirred with a stirring motor attached to an upper portion of the flask, thereby forming a solution. The solution was titrated with 0.05 N sodium hydroxide solution using phenolphthalein as an indicator to determine the concentration of terminal carboxyl groups.

[Total Concentration of Carboxyl Groups and Acid Anhydride Groups in Elastomer Polymer (A3)]

A predetermined amount of an elastomer polymer sample was placed into a three-necked pear-shaped flask, and was dissolved with 170 mL of toluene. Further, 30 mL of ethanol was added. The resultant sample solution was titrated with 0.1 N KOH ethanol solution using phenolphthalein as an indicator to determine the total concentration of carboxyl groups and acid anhydride groups.

Further, characteristics of fluorine-containing polymers were measured by the following methods.

[Composition of Fluorine-Containing Polymer]

The composition was measured by melt NMR analysis, fluorine content analysis and infrared absorption spectroscopy.

[Number of Terminal Carbonate Groups in Fluorine-Containing Polymer]

The number of terminal carbonate groups in a fluorine-containing polymer was determined by infrared absorption spectroscopy. The peak assigned to the carbonyl group in the carbonate group (—OC(=O)O—) appeared at an absorption wavelength of 1810-18 $cm^{-1}$. The absorbance of this absorption peak was measured, and the number of carbonate groups per $1 \times 10^6$ carbon atoms in the main chain of the fluorine-containing polymer was calculated from the following equation:

[Number of carbonate groups per $10^6$ carbon atoms in the main chain of the fluorine-containing polymer]=500AW/εdf A: Absorbance of the peak of the carbonate group (—OC(=O)O—).
ε: Molar absorbance coefficient [$cm^{-1} \cdot mol^{-1}$] of the carbonate group (—OC(=O)O—). ε=170 based on model compound.
W: Composition average molecular weight calculated from monomer composition.
d: Density [$g/cm^3$] of the film.
f: Thickness [mm] of the film.

Properties of multilayer tubes were measured by the following methods.

[Chemical Resistance (Zinc Chloride Resistance)]

A joint made of polyamide 12 was inserted into an end of the tube, and the tube was soaked in zinc chloride by the method described in SAE J-2260 7.12. The sample was then collected and was inspected for cracks. Thereafter, an impact test was carried out at −40° C. by the method described in SAE J-2260 7.5.

[Interlayer Adhesion]

The tube was cut to 200 mm and was further cut in half in the longitudinal direction to give a test piece. A 90° peel test was carried out at a tension rate of 50 mm/min using a universal tester (Tensilon UTM III-200 manufactured by Orientec Co., Ltd.). The interlayer adhesion was evaluated by reading the peel strength from the local maximum in the S—S curve.

[Durability of Interlayer Adhesion]

The tube was cut to 200 mm and was placed into an oven at 160° C. and was treated for 30 minutes. The interlayer adhesion of the tube collected was evaluated by the method described above. The interlayer adhesion was evaluated as highly durable when the peel strength after the heat treatment was 3.0 N/mm or above.

[Materials Used in Examples and Comparative Examples]
Polyamides (A1)
Production of Polyamide 12 (A1-1)

A pressure-resistant reaction vessel having an internal volume of 70 liters and equipped with a stirrer was loaded with 19.73 kg (100.0 mol) of dodecanelactam, 45.0 g (0.264 mol) of 5-amino-1,3,3-trimethylcyclohexanemethylamine and 0.5 L of distilled water. The inside of the polymerization tank was purged with nitrogen. The temperature was then raised to 180° C. and the mixture was stirred at this temperature so that the reaction system would be homogeneous. Next, the temperature inside the polymerization tank was raised to 270° C., and polymerization was performed for 2 hours while performing stirring and while controlling the pressure inside the tank to 3.5 MPa. Subsequently, the pressure was released to atmospheric pressure in about 2 hours and then reduced to 53 kPa. Polymerization was performed under the reduced pressure for 5 hours. Next, nitrogen was introduced into the autoclave, and the pressure was returned to atmospheric pressure. Thereafter, the reaction product was withdrawn as a strand from a lower nozzle of the reaction vessel and was cut into pellets. The pellets were dried under reduced pressure. As a result, polyamide 12 was obtained which had a relative viscosity of 2.10, a concentration of terminal amino groups of 48 µeq/g and a concentration of terminal carboxyl groups of 24 µeq/g (hereinafter, this polyamide 12 will be referred to as (A1-1)). The methylene to amide ratio [CH$_2$]/[NHCO] in the polyamide 12 (A1-1) was 11.0, and the requirement that the ratio be not less than 8.0 was satisfied. The solubility parameter SP of the polyamide 12 (A1-1) was 22.5 (MPa)$^{1/2}$. The polyamide 12 (A1-1) satisfied [A]>[B]+10 wherein [A] is the concentration (µeq/g) of terminal amino groups and [B] is the concentration (µeq/g) of terminal carboxyl groups.

Production of Polyamide 1010 (A1-2)

A pressure-resistant reaction vessel having an internal volume of 70 liters and equipped with a stirrer was loaded with 17.82 kg (50.0 mol) of an equimolar salt of 1,10-decanediamine and sebacic acid, 29.3 g (0.17 mol) of 1,10-decanediamine and 5.0 L of distilled water. The inside of the polymerization tank was purged with nitrogen. The temperature was then raised to 220° C. and the mixture was stirred at this temperature so that the reaction system would be homogeneous. Next, the temperature inside the polymerization tank was raised to 270° C., and polymerization was performed for 2 hours while performing stirring and while controlling the pressure inside the tank to 1.7 MPa. Subsequently, the pressure was released to atmospheric pressure in about 2 hours and then reduced to 53 kPa. Polymerization was performed under the reduced pressure for 4 hours. Next, nitrogen was introduced into the autoclave, and the pressure was returned to atmospheric pressure. Thereafter, the reaction product was withdrawn as a strand from a lower nozzle of the reaction vessel and was cut into pellets. The pellets were dried under reduced pressure. As a result, polyamide 1010 was obtained which had a relative viscosity of 2.22, a concentration of terminal amino groups of 45 µeq/g and a concentration of terminal carboxyl groups of 28 µeq/g (hereinafter, this polyamide 1010 will be referred to as (A1-2)). The methylene to amide ratio [CH$_2$]/[NHCO] in the polyamide 1010 (A1-2) was 9.0, and the requirement that the ratio be not less than 8.0 was satisfied. The solubility parameter SP of the polyamide 1010 (A1-2) was 23.5 (MPa)$^{1/2}$. The polyamide 1010 (A1-2) satisfied [A]>[B]+10 wherein [A] is the concentration (µeq/g) of terminal amino groups and [B] is the concentration (µeq/g) of terminal carboxyl groups.

Polyamides (A2)

Production of polyamide 6/12 (A2-1)

A pressure-resistant reaction vessel having an internal volume of 70 liters and equipped with a stirrer was loaded with 9.90 kg (87.5 mol) of caprolactam, 2.69 kg (12.5 mol) of 12-aminododecanoic acid, 20.0 g (0.12 mol) of 5-amino-1,3,3-trimethylcyclohexanemethylamine and 2.0 L of distilled water. The temperature was raised to 100° C., and the mixture was stirred at this temperature so that the reaction system would be homogeneous. Subsequently, the temperature was further raised to 260° C., and stirring was performed at a pressure of 2.5 MPa for 1 hour. The pressure was released. While evaporating water from the reaction vessel, polymerization reaction was performed at 260° C. under atmospheric pressure for 2 hours and was further performed at 260° C. and a reduced pressure of 53 kPa for 4 hours. After the completion of the reaction, the reaction product was withdrawn as a strand from a lower nozzle of the reaction vessel and was introduced into a water tank, where the strand was cooled and cut into pellets. The pellets were soaked in hot water, and the unreacted monomers were extracted and removed. Thereafter, the pellets were dried under reduced pressure. As a result, polyamide 6/12 (caproamide units/dodecanamide units=87.5/12.5 mol %) was obtained which had a relative viscosity of 2.63, a concentration of terminal amino groups of 54 µeq/g and a concentration of terminal carboxyl groups of 40 µeq/g (hereinafter, this polyamide 6/12 will be referred to as (A2-1)). The methylene to amide ratio [CH$_2$]/[NHCO] in the polyamide 6/12 (A2-1) was 5.75, and the requirement that the ratio be not less than 8.0 was not satisfied. The solubility parameter SP of the polyamide 6/12 (A2-1) was 26.4 (MPa)$^{1/2}$. The polyamide 6/12 (A2-1) satisfied [A]>[B]+10 wherein [A] is the concentration (µeq/g) of terminal amino groups and [B] is the concentration (µeq/g) of terminal carboxyl groups.

Production of Polyamide 6 (A2-2)

The procedures in the production of polyamide 6/12 (A2-1) were repeated, except that 9.90 kg (87.5 mol) of caprolactam and 2.69 kg (12.5 mol) of 12-aminododecanoic acid used in the production of polyamide 6/12 (A2-1) were changed to 11.32 kg (100.0 mol) of caprolactam, and that the amount of 5-amino-1,3,3-trimethylcyclohexanemethylamine was changed from 20.0 g (0.12 mol) to 80.0 g (0.47 mol). As a result, polyamide 6 was obtained which had a relative viscosity of 2.50, a concentration of terminal amino groups of 112 µeq/g and a concentration of terminal carboxyl groups of 33 µeq/g (hereinafter, this polyamide 6 will be referred to as (A2-2)). The methylene to amide ratio [CH$_2$]/[NHCO] in the polyamide 6 (A2-2) was 5.0, and the requirement that the ratio be not less than 8.0 was not satisfied. The solubility parameter SP of the polyamide 6 (A2-2) was 26.9 (MPa)$^{1/2}$. The polyamide 6 (A2-2) satisfied [A]>[B]+10 wherein [A] is the concentration (µeq/g) of terminal amino groups and [B] is the concentration (µeq/g) of terminal carboxyl groups.

Production of Polyamide 610 (A2-3)

The procedures in the production of polyamide 1010 (A1-2) were repeated, except that 17.82 kg (50.0 mol) of the equimolar salt of 1,10-decanediamine and sebacic acid used in the production of polyamide 1010 (A1-2) was changed to 15.02 kg (50.0 mol) of an equimolar salt of 1,6-hexanediamine and sebacic acid, and that 29.3 g (0.17 mol) of 1,10-decanediamine was changed to 15.1 g (0.13 mol) of 1,6-hexanediamine. As a result, polyamide 610 was obtained which had a relative viscosity of 2.58, a concentration of terminal amino groups of 73 µeq/g and a concentration of terminal carboxyl groups of 53 µeq/g (hereinafter, this polyamide 610 will be referred to as (A2-3)). The methylene to amide ratio [CH$_2$]/[NHCO] in the polyamide 610 (A2-3) was 7.0, and the requirement that the ratio be not less than 8.0 was not satisfied. The solubility parameter SP of the polyamide 610 (A2-3) was 24.9 (MPa)$^{1/2}$. The polyamide 610 (A2-3) satisfied [A]>[B]+10 wherein [A] is the concentration (µeq/g) of terminal amino groups and [B] is the concentration (µeq/g) of terminal carboxyl groups.

Production of Polyamide 6T/6I (A2-4)

An autoclave was loaded with 2.150 kg (18.5 mol) of 1,6-hexanediamine, 1.960 kg (11.8 mol) of isophthalic acid, 0.980 kg (5.9 mol) of terephthalic acid, 11 g (0.18 mol) of acetic acid, 5.2 g (0.1 part by mass with respect to the monomer materials) of sodium hypophosphite monohydrate and 9.0 L of distilled water. The autoclave was purged with nitrogen. Stirring was performed at 100° C. for 30 minutes. Thereafter, heating was performed until the pressure inside the autoclave became 1.8 MPa. After the pressure had reached 1.8 MPa, the reaction was continuously performed for 5 hours while performing stirring and while releasing the pressure to keep the pressure inside the system constant. When the condensation of distillate water had substantially come to an end, the temperature inside the system was 250° C. The pressure was returned to atmospheric pressure and was further reduced, and the reaction was performed at 80 kPa for 1 hour. The pressure was then released, and the molten polymer was withdrawn from the bottom of the autoclave, and was cooled and pelletized. As a result, polyamide 6T/6I (hexamethylene terephthalamide units/hexamethylene isophthalamide units=33/67 mol %) was obtained which had a relative viscosity of 1.95, no distinct melting point, a concentration of terminal amino groups of 50 µeq/g and a concentration of terminal carboxyl groups of 15 µeq/g (hereinafter, this polyamide 6T/6I will be referred to as (A2-4)). This polyamide has aromatic skeletons as the repeating units, and thus does not fall into the category of the polyamides (A1). The solubility parameter SP of the polyamide 6T/6I (A2-4) was 27.8 $(MPa)^{1/2}$. The polyamide 6T/6I (A2-4) satisfied [A]>[B]+10 wherein [A] is the concentration (µeq/g) of terminal amino groups and [B] is the concentration (µeq/g) of terminal carboxyl groups.

Elastomer Polymers (A3)

Maleic anhydride-modified ethylene/1-butene copolymer (A3-1) (TAFMER MH5010 manufactured by Mitsui Chemicals, Inc., acid anhydride group concentration: 50 µeq/g)

Maleic anhydride-modified ethylene/1-butene copolymer (A3-2) (TAFMER MH5020 manufactured by Mitsui Chemicals, Inc., acid anhydride group concentration: 100 µeq/g)

Aliphatic Polyamide Compositions (A)

Production of Polyamide 12 Composition (A-1)

The polyamide 12 (A1-1) was mixed together with the polyamide 6/12 (A2-1), the maleic anhydride-modified ethylene/1-butene copolymer (A3-1), triethylene glycol-bis [3-(3-t-butyl-5-methyl-4-hydroxyphenyl)propionate](IRGANOX 245 manufactured by BASF Japan, Ltd.) as an antioxidant and tris(2,4-di-t-butylphenyl) phosphite (IRGAFOS 168 manufactured by BASF Japan, Ltd.) as a phosphorous processing stabilizer. The mixture was supplied to a twin-screw melting kneader (Model TEX44, manufactured by THE JAPAN STEEL WORKS, LTD.) and was melt kneaded at a cylinder temperature of from 180° C. to 270° C. The molten resin was extruded into a strand, which was introduced into a water tank and was cooled, cut and vacuum dried. As a result, pellets of polyamide 12 composition were obtained which contained 0.8 parts by mass antioxidant and 0.2 parts by mass phosphorous processing stabilizer based on 100% by mass of the total of polyamide 12 (A1-1)/polyamide 6/12 (A2-1)/elastomer polymer (A3-1)=70.0/10.0/20.0 (by mass) (hereinafter, this polyamide 12 composition will be referred to as (A-1)). The difference in absolute value between the solubility parameter SP of the polyamide (A1) and that of the polyamide (A2) [|(SP of polyamide 12 (A1-1))−(SP of polyamide 6/12 (A2-1))|] was |22.5−26.4|=3.9 $(MPa)^{1/2}$, and the requirement that the difference be not less than 1.8 $(MPa)^{1/2}$ and not more than 5.5 $(MPa)^{1/2}$ was satisfied.

Production of Polyamide 12 Composition (A-2)

The procedures in the production of polyamide 12 composition (A-1) were repeated, except that the amounts of the polyamide 12 (A1-1) and the polyamide 6/12 (A2-1) used in the production of polyamide 12 composition (A-1) were changed. As a result, pellets of polyamide 12 composition were obtained which contained 0.8 parts by mass antioxidant and 0.2 parts by mass phosphorous processing stabilizer based on 100 parts by mass of the total of polyamide 12 (A1-1)/polyamide 6/12 (A2-1)/elastomer polymer (A3-1)=75.0/5.0/20.0 (by mass) (hereinafter, this polyamide 12 composition will be referred to as (A-2)). The difference in absolute value between the solubility parameter SP of the polyamide (A1) and that of the polyamide (A2) [|(SP of polyamide 12 (A1-1))−(SP of polyamide 6/12 (A2-1))|] was |22.5−26.4|=3.9 $(MPa)^{1/2}$, and the requirement that the difference be not less than 1.8 $(MPa)^{1/2}$ and not more than 5.5 $(MPa)^{1/2}$ was satisfied.

Production of Polyamide 12 Composition (A-3)

The procedures in the production of polyamide 12 composition (A-1) were repeated, except that the amounts of the polyamide 12 (A1-1) and the polyamide 6/12 (A2-1) used in the production of polyamide 12 composition (A-1) were changed. As a result, pellets of polyamide 12 composition were obtained which contained 0.8 parts by mass antioxidant and 0.2 parts by mass phosphorous processing stabilizer based on 100 parts by mass of the total of polyamide 12 (A1-1)/polyamide 6/12 (A2-1)/elastomer polymer (A3-1)=65.0/15.0/20.0 (by mass) (hereinafter, this polyamide 12 composition will be referred to as (A-3)). The difference in absolute value between the solubility parameter SP of the polyamide (A1) and that of the polyamide (A2) [|(SP of polyamide 12 (A1-1))−(SP of polyamide 6/12 (A2-1))|] was |22.5−26.4|=3.9 $(MPa)^{1/2}$, and the requirement that the difference be not less than 1.8 $(MPa)^{1/2}$ and not more than 5.5 $(MPa)^{1/2}$ was satisfied.

Production of Polyamide 12 Composition (A-4)

The procedures in the production of polyamide 12 composition (A-1) were repeated, except that the polyamide 6/12 (A2-1) used in the production of polyamide 12 composition (A-1) was changed to the polyamide 6 (A2-2). As a result, pellets of polyamide 12 composition were obtained which contained 0.8 parts by mass antioxidant and 0.2 parts by mass phosphorous processing stabilizer based on 100 parts by mass of the total of polyamide 12 (A1-1)/polyamide 6 (A2-2)/elastomer polymer (A3-1)=70.0/10.0/20.0 (by mass) (hereinafter, this polyamide 12 composition will be referred to as (A-4)). The difference in absolute value between the solubility parameter SP of the polyamide (A1) and that of the polyamide (A2) [|(SP of polyamide 12 (A1-1))−(SP of polyamide 6 (A2-2))|] was |22.5−26.9|=4.4 $(MPa)^{1/2}$, and the requirement that the difference be not less than 1.8 $(MPa)^{1/2}$ and not more than 5.5 $(MPa)^{1/2}$ was satisfied.

Production of Polyamide 12 Composition (A-5)

The procedures in the production of polyamide 12 composition (A-1) were repeated, except that the polyamide 6/12 (A2-1) used in the production of polyamide 12 composition (A-1) was changed to the polyamide 610 (A2-3). As a result, pellets of polyamide 12 composition were obtained which contained 0.8 parts by mass antioxidant and 0.2 parts by mass phosphorous processing stabilizer based on 100 parts by mass of the total of polyamide 12 (A1-1)/polyamide 610 (A2-3)/elastomer polymer (A3-1)=70.0/10.0/20.0 (by mass) (hereinafter, this polyamide 12 composition will be referred to as (A-5)). The difference in absolute value between the solubility parameter SP of the polyamide (A1) and that of the polyamide (A2) [|(SP of polyamide 12 (A1-1))−(SP of polyamide 610 (A2-3))|] was |22.5−24.9|=2.4 $(MPa)^{1/2}$, and the requirement that the difference be not less than 1.8 $(MPa)^{1/2}$ and not more than 5.5 $(MPa)^{1/2}$ was satisfied.

Production of Polyamide 12 Composition (A-6)

The procedures in the production of polyamide 12 composition (A-1) were repeated, except that the polyamide 6/12 (A2-1) used in the production of polyamide 12 composition (A-1) was changed to the polyamide 6T/6I (A2-4). As a result, pellets of polyamide 12 composition were obtained which contained 0.8 parts by mass antioxidant and 0.2 parts by mass phosphorous processing stabilizer based on 100 parts by mass of the total of polyamide 12 (A1-1)/polyamide 6T/6I (A2-4)/elastomer polymer (A3-1)=70.0/10.0/20.0 (by mass) (hereinafter, this polyamide 12 composition will be referred to as (A-6)). The difference in absolute value between the solubility parameter SP of the polyamide (A1) and that of the polyamide (A2) [|(SP of polyamide 12 (A1-1))–(SP of polyamide 6T/6I (A2-4))|] was |22.5–27.8|=5.3 (MPa)$^{1/2}$, and the requirement that the difference be not less than 1.8 (MPa)$^{1/2}$ and not more than 5.5 (MPa)$^{1/2}$ was satisfied.

Production of Polyamide 12 Composition (A-7)

The procedures in the production of polyamide 12 composition (A-1) were repeated, except that the maleic anhydride-modified ethylene/1-butene copolymer (A3-1) used in the production of polyamide 12 composition (A-1) was changed to (A3-2). As a result, pellets of polyamide 12 composition were obtained which contained 0.8 parts by mass antioxidant and 0.2 parts by mass phosphorous processing stabilizer based on 100 parts by mass of the total of polyamide 12 (A1-1)/polyamide 6/12 (A2-1)/elastomer polymer (A3-2)=70.0/10.0/20.0 (by mass) (hereinafter, this polyamide 12 composition will be referred to as (A-7)). The difference in absolute value between the solubility parameter SP of the polyamide (A1) and that of the polyamide (A2) [|(SP of polyamide 12 (A1-1))–(SP of polyamide 6/12 (A2-1))|] was |22.5–26.4|=3.9 (MPa)$^{1/2}$, and the requirement that the difference be not less than 1.8 (MPa)$^{1/2}$ and not more than 5.5 (MPa)$^{1/2}$ was satisfied.

Production of polyamide 1010 composition (A-8)

The procedures in the production of polyamide 12 composition (A-1) were repeated, except that the polyamide 12 (A1-1) used in the production of polyamide 12 composition (A-1) was changed to the polyamide 1010 (A1-2). As a result, pellets of polyamide 1010 composition were obtained which contained 0.8 parts by mass antioxidant and 0.2 parts by mass phosphorous processing stabilizer based on 100 parts by mass of the total of polyamide 1010 (A1-2)/polyamide 6/12 (A2-1)/elastomer polymer (A3-1)=70.0/10.0/20.0 (by mass) (hereinafter, this polyamide 1010 composition will be referred to as (A-8)). The difference in absolute value between the solubility parameter SP of the polyamide (A1) and that of the polyamide (A2) [|(SP of polyamide 1010 (A1-2))—(SP of polyamide 6/12 (A2-1))|] was |23.5–26.4|=2.9 (MPa)$^{1/2}$, and the requirement that the difference be not less than 1.8 (MPa)$^{1/2}$ and not more than 5.5 (MPa)$^{1/2}$ was satisfied.

Production of Polyamide 12 Composition (A-9)

The procedures in the production of polyamide 12 composition (A-1) were repeated, except that the polyamide 6/12 (A2-1) used in the production of polyamide 12 composition (A-1) was not used, and that benzenesulfonic acid butyl amide as a plasticizer was injected via a metering pump in a midpoint of the cylinder of the twin-screw melting kneader. As a result, pellets of polyamide 12 composition were obtained which contained 0.8 parts by mass antioxidant and 0.2 parts by mass phosphorous processing stabilizer based on 100 parts by mass of the total of polyamide 12 (A1-1)/elastomer polymer (A3-1)/plasticizer=87.5/10.0/2.5 (by mass) (hereinafter, this polyamide 12 composition will be referred to as (A-9)). Because the polyamide 6/12 (A2-1) was not used, the difference in absolute value between the solubility parameter SP of the polyamide (A1) and that of the polyamide (A2) was, for the sake of convenience, [|(SP of polyamide 12 (A1-1))–0]=|22.5–0|=22.5 (MPa)$^{1/2}$, and the requirement that the difference be not less than 1.8 (MPa)$^{1/2}$ and not more than 5.5 (MPa)$^{1/2}$ was not satisfied.

Production of Polyamide 12 Composition (A-10)

The procedures in the production of polyamide 12 composition (A-1) were repeated, except that the polyamide 6/12 (A2-1) used in the production of polyamide 12 composition (A-1) was not used. As a result, pellets of polyamide 12 composition were obtained which contained 0.8 parts by mass antioxidant and 0.2 parts by mass phosphorous processing stabilizer based on 100 parts by mass of the total of polyamide 12 (A1-1)/elastomer polymer (A3-1)=90.0/10.0 (by mass) (hereinafter, this polyamide 12 composition will be referred to as (A-10)). Because the polyamide 6/12 (A2-1) was not used, the difference in absolute value between the solubility parameter SP of the polyamide (A1) and that of the polyamide (A2) was, for the sake of convenience, [|(SP of polyamide 12 (A1-1))–0]=|22.5–0|=22.5 (MPa)$^{1/2}$, and the requirement that the difference be not less than 1.8 (MPa)$^{1/2}$ and not more than 5.5 (MPa)$^{1/2}$ was not satisfied.

Production of Polyamide 12 Composition (A-11)

The procedures in the production of polyamide 12 composition (A-1) were repeated, except that the polyamide 6/12 (A2-1) used in the production of polyamide 12 composition (A-1) was changed to the polyamide 1010 (A1-2). As a result, pellets of polyamide 12 composition were obtained which contained 0.8 parts by mass antioxidant and 0.2 parts by mass phosphorous processing stabilizer based on 100 parts by mass of the total of polyamide 12 (A1-1)/polyamide 1010 (A1-2)/elastomer polymer (A3-1)=80.0/10.0/10.0 (by mass) (hereinafter, this polyamide 12 composition will be referred to as (A-11)). The difference in absolute value between the solubility parameter SP of the polyamide (A1) and that of the polyamide (A2) [|(SP of polyamide 12 (A1-1))–(SP of polyamide 1010 (A1-2))|] was |22.5–23.5|=1.0 (MPa)$^{1/2}$, and the requirement that the difference be not less than 1.8 (MPa$^{1/2}$ and not more than 5.5 (MPa)$^{1/2}$ was not satisfied.

Production of Polyamide 12 Composition (A-12)

The procedures in the production of polyamide 12 composition (A-1) were repeated, except that the amounts of the polyamide 12 (A1-1) and the polyamide 6/12 (A2-1) used in the production of polyamide 12 composition (A-1) were changed. As a result, pellets of polyamide 12 composition were obtained which contained 0.8 parts by mass antioxidant and 0.2 parts by mass phosphorous processing stabilizer based on 100 parts by mass of the total of polyamide 12 (A1-1)/polyamide 6/12 (A2-1)/elastomer polymer (A3-1)=40.0/40.0/20.0 (by mass) (hereinafter, this polyamide 12 composition will be referred to as (A-12)). The difference in absolute value between the solubility parameter SP of the polyamide (A1) and that of the polyamide (A2) [|(SP of polyamide 12 (A1-1))–(SP of polyamide 6/12 (A2-1))|] was |22.5–26.4|=3.9 (MPa)$^{1/2}$, and the requirement that the difference be not less than 1.8 (MPa)$^{1/2}$ and not more than 5.5 (MPa)$^{1/2}$ was satisfied.

Semi-Aromatic Polyamides (B1)

Production of Semi-Aromatic Polyamide (B1-1)

An autoclave was loaded with 2.374 kg (15.0 mol) of 1,9-nonanediamine, 2.374 kg (15.0 mol) of 2-methyl-1,8-octanediamine, 4.939 kg (29.7 mol) of terephthalic acid, 65.9 g (0.54 mol) of benzoic acid, 9.8 g (0.1% by mass) relative to the raw materials) of sodium hypophosphite monohydrate, and 6.0 L of distilled water. The autoclave was purged with nitrogen. Stirring was performed at 100° C. for 30 minutes, and the internal temperature was raised to 190° C. in 2 hours. At this time, the pressure inside the autoclave was increased to 2.0 MPa. The reaction was continued for 1 hour, and thereafter the temperature was raised to 230° C. The reaction was carried out for another 2 hours at a constant temperature of 230° C. while keeping the pressure at 2.0 MPa by gradually releasing vapor. Next, the pressure was lowered to 1.0 MPa in 30 minutes, and the reaction was performed for 1 hour. A prepolymer was thus obtained. This prepolymer was dried at 100° C. under reduced pressure for 12 hours, crushed to a size of not more than 2 mm, and subjected to solid phase polymerization which was performed at 210° C. and 0.013 kPa for 8 hours to yield a semi-aromatic polyamide having a melting point of 265° C. and a relative viscosity of 2.38 (polyamide 9T/M8T=50/50 mol %) (hereinafter, this semi-aromatic polyamide will be referred to as (B1-1)).

Production of Semi-Aromatic Polyamide (B1-2)

The procedures in the production of semi-aromatic polyamide (B1-1) were repeated, except that 2.374 kg (15.0 mol) 1,9-nonanediamine and 2.374 kg (15.0 mol) 2-methyl-1,8-octanediamine used in the production of semi-aromatic polyamide (B1-1) were changed to 4.036 kg (25.5 mol) 1,9-nonanediamine and 0.712 kg (4.5 mol) 2-methyl-1,8-octanediamine, and that the solid phase polymerization temperature was changed from 210 to 240° C. Consequently, a semi-aromatic polyamide having a melting point of 305° C. and a relative viscosity of 2.34 (polyamide 9T/M8T=85/15 mol %) was obtained (hereinafter, this semi-aromatic polyamide will be referred to as (B1-2)).

Production of Semi-Aromatic Polyamide (B1-3)

The procedures in the production of semi-aromatic polyamide (B1-1) were repeated, except that 4.939 kg (29.7 mol) terephthalic acid used in the production of semi-aromatic polyamide (B1-1) was changed to 6.427 kg (29.7 mol) 2,6-naphthalenedicarboxylic acid. Consequently, a semi-aromatic polyamide having a melting point of 275° C. and a relative viscosity of 2.37 (polyamide 9N/M8N=50/50 mol %) was obtained (hereinafter, this semi-aromatic polyamide will be referred to as (B1-3)).

Production of semi-aromatic polyamide (B1-4)

The procedures in the production of semi-aromatic polyamide (B1-1) were repeated, except that 2.374 kg (15.0 mol) 1,9-nonanediamine and 2.374 kg (15.0 mol) 2-methyl-1,8-octanediamine used in the production of semi-aromatic polyamide (B1-1) were changed to 5.169 kg (30.0 mol) 1,10-decanediamine, and that the solid phase polymerization temperature was changed from 210° C. to 260° C. Consequently, a semi-aromatic polyamide having a melting point of 315° C. and a relative viscosity of 2.33 (polyamide 10T=100 mol %) was obtained (hereinafter, this semi-aromatic polyamide will be referred to as (B1-4)).

Production of Semi-Aromatic Polyamide (B1-5)

The procedures in the production of semi-aromatic polyamide (B1-4) were repeated, except that 5.169 kg (30.0 mol) 1,10-decanediamine and 4.984 kg (30.0 mol) terephthalic acid used in the production of semi-aromatic polyamide (B1-4) were changed to 3.101 kg (18.0 mol) 1,10-decanediamine, 2.990 kg (18.0 mol) terephthalic acid and 2.416 kg (12.0 mol) 11-aminoundecanoic acid, and that the solid phase polymerization temperature was changed from 260° C. to 200° C. Consequently, a semi-aromatic polyamide having a melting point of 255° C. and a relative viscosity of 2.34 (polyamide 10T/11=60/40 mol %) was obtained (hereinafter, this semi-aromatic polyamide will be referred to as (B1-5)).

Production of Semi-Aromatic Polyamide (B1-6)

The procedures in the production of semi-aromatic polyamide (B1-4) were repeated, except that 4.984 kg (30.0 mol) terephthalic acid used in the production of semi-aromatic polyamide (B1-4) was changed to 3.324 kg (20.0 mol) terephthalic acid and 2.020 kg (9.99 mol) sebacic acid, and that the solid phase polymerization temperature was changed from 260° C. to 220° C. Consequently, a semi-aromatic polyamide having a melting point of 279° C. and a relative viscosity of 2.37 (polyamide 10T/1010=67/33 mol %) was obtained (hereinafter, this semi-aromatic polyamide will be referred to as (B1-6)).

Production of Semi-Aromatic Polyamide (B1-7)

The procedures in the production of semi-aromatic polyamide (B1-4) were repeated, except that 5.169 kg (30.0 mol) 1,10-decanediamine and 4.984 kg (30.0 mol) terephthalic acid used in the production of semi-aromatic polyamide (B1-4) were changed to 7.258 kg (24.0 mol) equimolar salt of 1,10-decanediamine and terephthalic acid, and 1.863 kg (6.0) mol equimolar salt of 1,6-hexanediamine and dodecanedioic acid, and that the solid phase polymerization temperature was changed from 260° C. to 210° C. Consequently, a semi-aromatic polyamide having a melting point of 261° C. and a relative viscosity of 2.34 (polyamide 10T/612=80/20 mol %) was obtained (hereinafter, this semi-aromatic polyamide will be referred to as (B1-7)).

Production of Semi-Aromatic Polyamide (B1-8)

The procedures in the production of semi-aromatic polyamide (B1-1) were repeated, except that the solid phase polymerization time was changed from 8 hours in the production of semi-aromatic polyamide (B1-1) to 4 hours. Consequently, a semi-aromatic polyamide having a melting point of 265° C. and a relative viscosity of 2.08 (polyamide 9T/M8T=50/50 mol %) was obtained (hereinafter, this semi-aromatic polyamide will be referred to as (B1-8)).

Production of Semi-Aromatic Polyamide (B1-9)

The procedures in the production of semi-aromatic polyamide (B1-1) were repeated, except that 4.939 kg (29.7 mol) terephthalic acid, 2.374 kg (15.0 mol) 1,9-nonanediamine and 2.374 kg (15.0 mol) 2-methyl-1,8-octanediamine used in the production of semi-aromatic polyamide (B1-1) were changed to 2.741 kg (16.5 mol) terephthalic acid, 0.997 kg (6.0 mol) isophthalic acid, 1.096 kg (7.5 mol) adipic acid and 3.602 kg (31.0 mol) 1,6-hexanediamine, and that the polymerization temperature was changed to 250° C. and the solid phase polymerization temperature to 230° C. Consequently, a semi-aromatic polyamide having a melting point of 302° C. and a relative viscosity of 2.28 (polyamide 6T/6I/66=55/20/25 mol %) was obtained (hereinafter, this semi-aromatic polyamide will be referred to as (B1-9)).

Semi-Aromatic Polyamides (B2)

Production of Semi-Aromatic Polyamide (B2-1)

A pressure resistant vessel having an internal volume of 70 liters and equipped with a stirrer, a thermometer, a torque meter, a pressure gauge, a raw material inlet directly connected to a diaphragm pump, a nitrogen gas inlet port, a pressure release port, a pressure controller and a polymer outlet was loaded with 6.068 kg (30.0 mol) of sebacic acid, 8.50 g (0.049 mol) of calcium hypophosphite and 2.19 g (0.025 mol) of sodium acetate. The pressure inside the pressure resistant vessel was increased to 0.3 MPa with 99.9999% pure nitrogen gas, and the nitrogen gas was released to atmospheric pressure. This operation was repeated 5 times to purge the inside with nitrogen. While confining the pressure and performing stirring, the temperature inside the system was raised. Further, the temperature was raised to 190° C. under a stream of a small amount of nitrogen. Thereafter, 4.086 kg (30.0 mol) of m-xylylenediamine was added dropwise over a period of 160 minutes while performing stirring. During this process, the pressure inside the reaction system was controlled to 0.5 MPa, and the inner temperature was continuously increased to 295° C. The distillate water occurring during the dropwise addition of m-xylylenediamine was removed from the system through a partial condenser and a cooling device. After the completion of the dropwise addition of m-xylylenediamine, the pressure was lowered to atmospheric pressure in 60 minutes and, during this process, the reaction was continued for 10 minutes while keeping the temperature inside the vessel at 250° C. Thereafter, the pressure inside the reaction system was lowered to 79 kPa, and melt polymerization reaction was continued for 40 minutes. Stirring was then discontinued, and the system was pressurized with nitrogen to 0.2 MPa. The polycondensate was withdrawn in the form of a strand through the outlet at a lower portion of the pressure resistant vessel. The polycondensate strand was immediately cooled. The resin strand that had been cooled with water was pelletized with a pelletizer and was thereafter dried under reduced pressure. Consequently, a semi-aromatic polyamide (polyamide MXD10=100 mol %) having a melting point of 191° C. and a relative viscosity of 2.46 was obtained (hereinafter, this semi-aromatic polyamide will be referred to as (B2-1)).

Production of Semi-Aromatic Polyamide (B2-2)

The procedures in the production of semi-aromatic polyamide (B2-1) were repeated, except that 4.086 kg (30.0 mol) m-xylylenediamine used in the production of semi-aromatic polyamide (B2-1) was changed to 4.086 kg (30.0 mol) diamine mixture including m-xylylenediamine and p-xylylenediamine in 7:3, and that the polymerization temperature was changed from 250° C. to 260° C. Consequently, a semi-aromatic polyamide (polyamide MXD10/PXD10=70/30 mol %) having a melting point of 215° C. and a relative viscosity of 2.40 was obtained (hereinafter, this semi-aromatic polyamide will be referred to as (B2-2)).

Production of Semi-Aromatic Polyamide (B2-3)

The procedures in the production of semi-aromatic polyamide (B2-1) were repeated, except that 4.086 kg (30.0 mol) m-xylylenediamine used in the production of semi-aromatic polyamide (B2-1) was changed to 4.086 kg (30.0 mol) diamine mixture including m-xylylenediamine and p-xylylenediamine in 6:4, and that the polymerization temperature was changed from 250° C. to 270° C. Consequently, a semi-aromatic polyamide (polyamide MXD10/PXD10=60/40 mol %) having a melting point of 224° C. and a relative viscosity of 2.42 was obtained (hereinafter, this semi-aromatic polyamide will be referred to as (B2-3)).

Production of Semi-Aromatic Polyamide (B2-4)

The procedures in the production of semi-aromatic polyamide (B2-1) were repeated, except that 4.086 kg (30.0 mol) m-xylylenediamine used in the production of semi-aromatic polyamide (B2-1) was changed to 4.086 kg (30.0 mol) p-xylylenediamine, and that the polymerization temperature was changed from 250° C. to 300° C. Consequently, a semi-aromatic polyamide (polyamide PXD10=100 mol %) having melting points of 281 and 291° C. (two melting points) and a relative viscosity of 2.42 was obtained (hereinafter, this semi-aromatic polyamide will be referred to as (B2-4)).

Production of Semi-Aromatic Polyamide (B2-5)

The procedures in the production of semi-aromatic polyamide (B2-1) were repeated, except that 6.068 kg (30.0 mol) sebacic acid used in the production of semi-aromatic polyamide (B2-1) was changed to 5.647 kg (30.0 mol) azelaic acid. Consequently, a semi-aromatic polyamide (polyamide MXD9=100 mol %) having a melting point of 194° C. and a relative viscosity of 2.45 was obtained (hereinafter, this semi-aromatic polyamide will be referred to as (B2-5)).

Production of semi-aromatic polyamide (B2-6)

The procedures in the production of semi-aromatic polyamide (B2-1) were repeated, except that 4.086 kg (30.0 mol) m-xylylenediamine used in the production of semi-aromatic polyamide (B2-1) was changed to 5.588 kg (30.0 mol) 2,6-bis(aminomethyl)naphthalene, and that the polymerization temperature was changed from 250° C. to 300° C. Consequently, a semi-aromatic polyamide (polyamide 2,6-BAN10=100 mol %) having a melting point of 286° C. and a relative viscosity of 2.33 was obtained (hereinafter, this semi-aromatic polyamide will be referred to as (B2-6)).

Production of Semi-Aromatic Polyamide (B2-7)

The procedures in the production of semi-aromatic polyamide (B2-1) were repeated, except that the melt polymerization time in the production of semi-aromatic polyamide (B2-1) was changed from 40 minutes to 20 minutes. Consequently, a semi-aromatic polyamide (polyamide MXD10=100 mol %) having a melting point of 191° C. and a relative viscosity of 2.15 was obtained (hereinafter, this semi-aromatic polyamide will be referred to as (B2-7)).

Production of Semi-Aromatic Polyamide (B2-8)

The procedures in the production of semi-aromatic polyamide (B2-1) were repeated, except that 6.068 kg (30.0 mol) sebacic acid used in the production of semi-aromatic polyamide (B2-1) was changed to 4.384 kg (30.0 mol) adipic acid, and that the polymerization temperature was changed from 250° C. to 275° C. Consequently, a semi-aromatic polyamide (polyamide MXD6=100 mol %) having a melting point of 243° C. and a relative viscosity of 2.42 was obtained (hereinafter, this semi-aromatic polyamide will be referred to as (B2-8)).

Semi-Aromatic Polyamide Compositions (B)

Production of Semi-Aromatic Polyamide Composition (B-1)

The semi-aromatic polyamide (B1-1) was mixed together with the maleic anhydride-modified ethylene/1-butene copolymer (A3-1) as an impact modifier, triethylene glycol-bis[3-(3-t-butyl-5-methyl-4-hydroxyphenyl)propionate](IRGANOX 245 manufactured by BASF Japan, Ltd.) as an antioxidant and tris(2,4-di-t-butylphenyl) phosphite (IRGAFOS 168 manufactured by BASF Japan, Ltd.) as a phosphorous processing stabilizer. The mixture was supplied to a twin-screw melting kneader (Model: TEX44, manufactured by THE JAPAN STEEL WORKS, LTD.), and was melt-kneaded at a cylinder temperature of from 220° C. to 300° C. The molten resin was extruded in the form of a strand, which was introduced into a water tank, cooled, cut and vacuum-dried. As a result, pellets of a semi-aromatic polyamide composition were obtained which contained 0.8 parts by mass antioxidant and 0.2 parts by mass phosphorous processing stabilizer based on 100 parts by mass of the total of 90% by mass of semi-aromatic polyamide (B1-1) and 10% by mass of elastomer polymer (A3-1) (hereinafter, this semi-aromatic polyamide composition will be referred to as (B-1)).

Production of Semi-Aromatic Polyamide Composition (B-2)

The procedures in the production of semi-aromatic polyamide composition (B-1) were repeated, except that the semi-aromatic polyamide (B1-1) used in the production of semi-aromatic polyamide composition (B-1) was changed to (B1-2), and that the cylinder temperature of 300° C. was changed to 340° C. As a result, pellets of a semi-aromatic polyamide composition were obtained which contained 0.8 parts by mass antioxidant and 0.2 parts by mass phosphorous processing stabilizer based on 100 parts by mass of the total of 90% by mass of semi-aromatic polyamide (B1-2) and 10% by mass of elastomer polymer (A3-1) (hereinafter, this semi-aromatic polyamide composition will be referred to as (B-2)).

Production of Semi-Aromatic Polyamide Composition (B-3)

The procedures in the production of semi-aromatic polyamide composition (B-1) were repeated, except that the semi-aromatic polyamide (B1-1) used in the production of semi-aromatic polyamide composition (B-1) was changed to (B1-3), and that the cylinder temperature of 300° C. was changed to 310° C. As a result, pellets of a semi-aromatic polyamide composition were obtained which contained 0.8 parts by mass antioxidant and 0.2 parts by mass phosphorous processing stabilizer based on 100 parts by mass of the total of 90% by mass of semi-aromatic polyamide (B1-3) and 10% by mass of elastomer polymer (A3-1) (hereinafter, this semi-aromatic polyamide composition will be referred to as (B-3)).

Production of Semi-Aromatic Polyamide Composition (B-4)

The procedures in the production of semi-aromatic polyamide composition (B-1) were repeated, except that the semi-aromatic polyamide (B1-1) used in the production of semi-aromatic polyamide composition (B-1) was changed to (B1-4), and that the cylinder temperature of 300° C. was changed to 340° C. As a result, pellets of a semi-aromatic polyamide composition were obtained which contained 0.8 parts by mass antioxidant and 0.2 parts by mass phosphorous processing stabilizer based on 100 parts by mass of the total of 90% by mass of semi-aromatic polyamide (B1-4) and 10% by mass of elastomer polymer (A3-1) (hereinafter, this semi-aromatic polyamide composition will be referred to as (B-4)).

Production of Semi-Aromatic Polyamide Composition (B-5)

The procedures in the production of semi-aromatic polyamide composition (B-1) were repeated, except that the semi-aromatic polyamide (B1-1) used in the production of semi-aromatic polyamide composition (B-1) was changed to (B1-5), and that the cylinder temperature of 300° C. was changed to 290° C. As a result, pellets of a semi-aromatic polyamide composition were obtained which contained 0.8 parts by mass antioxidant and 0.2 parts by mass phosphorous processing stabilizer based on 100 parts by mass of the total of 90% by mass of semi-aromatic polyamide (B1-5) and 10% by mass of elastomer polymer (A3-1) (hereinafter, this semi-aromatic polyamide composition will be referred to as (B-5)).

Production of Semi-Aromatic Polyamide Composition (B-6)

The procedures in the production of semi-aromatic polyamide composition (B-1) were repeated, except that the semi-aromatic polyamide (B1-1) used in the production of semi-aromatic polyamide composition (B-1) was changed to (B1-6), and that the cylinder temperature of 300° C. was changed to 310° C. As a result, pellets of a semi-aromatic polyamide composition were obtained which contained 0.8 parts by mass antioxidant and 0.2 parts by mass phosphorous processing stabilizer based on 100 parts by mass of the total of 90% by mass of semi-aromatic polyamide (B1-6) and 10% by mass of elastomer polymer (A3-1) (hereinafter, this semi-aromatic polyamide composition will be referred to as (B-6)).

Production of Semi-Aromatic Polyamide Composition (B-7)

The procedures in the production of semi-aromatic polyamide composition (B-1) were repeated, except that the semi-aromatic polyamide (B1-1) used in the production of semi-aromatic polyamide composition (B-1) was changed to (B1-7). As a result, pellets of a semi-aromatic polyamide composition were obtained which contained 0.8 parts by mass antioxidant and 0.2 parts by mass phosphorous processing stabilizer based on 100 parts by mass of the total of 90% by mass of semi-aromatic polyamide (B1-7) and 10% by mass of elastomer polymer (A3-1) (hereinafter, this semi-aromatic polyamide composition will be referred to as (B-7)).

Production of Semi-Aromatic Polyamide Composition (B-8)

The procedures in the production of semi-aromatic polyamide composition (B-1) were repeated, except that the semi-aromatic polyamide (B1-1) used in the production of semi-aromatic polyamide composition (B-1) was changed to (B1-9), and that the cylinder temperature of 300° C. was changed to 340° C. As a result, pellets of a semi-aromatic polyamide composition were obtained which contained 0.8 parts by mass antioxidant and 0.2 parts by mass phosphorous processing stabilizer based on 100 parts by mass of the total of 90% by mass of semi-aromatic polyamide (B1-9) and 10% by mass of elastomer polymer (A3-1) (hereinafter, this semi-aromatic polyamide composition will be referred to as (B-8)).

Production of Semi-Aromatic Polyamide Composition (B-9)

The procedures in the production of semi-aromatic polyamide composition (B-1) were repeated, except that the semi-aromatic polyamide (B1-1) used in the production of semi-aromatic polyamide composition (B-1) was changed to (B2-1), and that the cylinder temperature of 300° C. was changed to 240° C. As a result, pellets of a semi-aromatic polyamide composition were obtained which contained 0.8 parts by mass antioxidant and 0.2 parts by mass phosphorous processing stabilizer based on 100 parts by mass of the total of 90% by mass of semi-aromatic polyamide (B2-1) and 10% by mass of elastomer polymer (A3-1) (hereinafter, this semi-aromatic polyamide composition will be referred to as (B-9)).

Production of Semi-Aromatic Polyamide Composition (B-10)

The procedures in the production of semi-aromatic polyamide composition (B-9) were repeated, except that the semi-aromatic polyamide (B2-1) used in the production of semi-aromatic polyamide composition (B-9) was changed to (B2-2), and that the cylinder temperature of 240° C. was changed to 250° C. As a result, pellets of a semi-aromatic polyamide composition were obtained which contained 0.8 parts by mass antioxidant and 0.2 parts by mass phosphorous processing stabilizer based on 100 parts by mass of the total of 90% by mass of semi-aromatic polyamide (B2-2) and 10% by mass of elastomer polymer (A3-1) (hereinafter, this semi-aromatic polyamide composition will be referred to as (B-10)).

Production of Semi-Aromatic Polyamide Composition (B-11)

The procedures in the production of semi-aromatic polyamide composition (B-9) were repeated, except that the semi-aromatic polyamide (B2-1) used in the production of semi-aromatic polyamide composition (B-9) was changed to (B2-3), and that the cylinder temperature of 240° C. was changed to 260° C. As a result, pellets of a semi-aromatic polyamide composition were obtained which contained 0.8 parts by mass antioxidant and 0.2 parts by mass phosphorous processing stabilizer based on 100 parts by mass of the total of 90% by mass of semi-aromatic polyamide (B2-3) and 10% by mass of elastomer polymer (A3-1) (hereinafter, this semi-aromatic polyamide composition will be referred to as (B-11)).

Production of Semi-Aromatic Polyamide Composition (B-12)

The procedures in the production of semi-aromatic polyamide composition (B-9) were repeated, except that the semi-aromatic polyamide (B2-1) used in the production of semi-aromatic polyamide composition (B-9) was changed to (B2-4), and that the cylinder temperature of 240° C. was changed to 320° C. As a result, pellets of a semi-aromatic polyamide composition were obtained which contained 0.8 parts by mass antioxidant and 0.2 parts by mass phosphorous processing stabilizer based on 100 parts by mass of the total of 90% by mass of semi-aromatic polyamide (B2-4) and 10% by mass of elastomer polymer (A3-1) (hereinafter, this semi-aromatic polyamide composition will be referred to as (B-12)).

Production of Semi-Aromatic Polyamide Composition (B-13)

The procedures in the production of semi-aromatic polyamide composition (B-9) were repeated, except that the semi-aromatic polyamide (B2-1) used in the production of semi-aromatic polyamide composition (B-9) was changed to (B2-5). As a result, pellets of a semi-aromatic polyamide composition were obtained which contained 0.8 parts by mass antioxidant and 0.2 parts by mass phosphorous processing stabilizer based on 100 parts by mass of the total of 90% by mass of semi-aromatic polyamide (B2-5) and 10% by mass of elastomer polymer (A3-1) (hereinafter, this semi-aromatic polyamide composition will be referred to as (B-13)).

Production of Semi-Aromatic Polyamide Composition (B-14)

The procedures in the production of semi-aromatic polyamide composition (B-9) were repeated, except that the semi-aromatic polyamide (B2-1) used in the production of semi-aromatic polyamide composition (B-9) was changed to (B2-6), and that the cylinder temperature of 240° C. was changed to 320° C. As a result, pellets of a semi-aromatic polyamide composition were obtained which contained 0.8 parts by mass antioxidant and 0.2 parts by mass phosphorous processing stabilizer based on 100 parts by mass of the total of 90% by mass of semi-aromatic polyamide (B2-6) and 10% by mass of elastomer polymer (A3-1) (hereinafter, this semi-aromatic polyamide composition will be referred to as (B-14)).

Production of Semi-Aromatic Polyamide Composition (B-15)

The procedures in the production of semi-aromatic polyamide composition (B-9) were repeated, except that the semi-aromatic polyamide (B2-1) used in the production of semi-aromatic polyamide composition (B-9) was changed to (B2-8), and that the cylinder temperature of 240° C. was changed to 280° C. As a result, pellets of a semi-aromatic polyamide composition were obtained which contained 0.8 parts by mass antioxidant and 0.2 parts by mass phosphorous processing stabilizer based on 100 parts by mass of the total of 90% by mass of semi-aromatic polyamide (B2-8) and 10% by mass of elastomer polymer (A3-1) (hereinafter, this semi-aromatic polyamide composition will be referred to as (B-15)).

Production of Conductive Semi-Aromatic Polyamide Composition (B-16)

The semi-aromatic polyamide (B1-8) was mixed together with the maleic anhydride-modified ethylene/1-butene copolymer (A3-1) and an ethylene/1-butene copolymer (TAFMER A-0550 manufactured by Mitsui Chemicals, Inc.) as impact modifiers, carbon black (Ketjen Black EC600JD manufactured by Lion Corporation) as a conductive filler, triethylene glycol-bis[3-(3-t-butyl-5-methyl-4-hydroxyphenyl)propionate](IRGANOX 245 manufactured by BASF Japan, Ltd.) as an antioxidant and tris(2,4-di-t-butylphenyl) phosphite (IRGAFOS 168 manufactured by BASF Japan, Ltd.) as a phosphorous processing stabilizer. The mixture was supplied to a twin-screw melting kneader (Model: TEX44, manufactured by THE JAPAN STEEL WORKS, LTD.), and was melt-kneaded at a cylinder temperature of from 240° C. to 320° C. The molten resin was extruded in the form of a strand, which was introduced into a water tank, cooled, cut and vacuum-dried. As a result, pellets of a conductive semi-aromatic polyamide composition were obtained which contained 0.8 parts by mass antioxidant and 0.2 parts by mass phosphorous processing stabilizer based on 100 parts by mass of the total of 68% by mass of semi-aromatic polyamide (B1-8), 25% by mass of impact modifiers including the elastomer polymer (A3-1) and 7% by mass of conductive filler (hereinafter, this conductive semi-aromatic polyamide composition will be referred to as (B-16)).

Production of Conductive Semi-Aromatic Polyamide Composition (B-17)

The procedures in the production of conductive semi-aromatic polyamide composition (B-16) were repeated, except that the semi-aromatic polyamide (B1-8) used in the production of conductive semi-aromatic polyamide composition (B-16) was changed to (B2-7), and that the cylinder temperature of 320° C. was changed to 270° C. As a result, pellets of a conductive semi-aromatic polyamide composition were obtained which contained 0.8 parts by mass antioxidant and 0.2 parts by mass phosphorous processing stabilizer based on 100 parts by mass of the total of 68% by mass of semi-aromatic polyamide (B2-7), 25% by mass of impact modifiers including the elastomer polymer (A3-1) and 7% by mass of conductive filler (hereinafter, this conductive semi-aromatic polyamide composition will be referred to as (B-17)).

Fluorine-Containing Polymers (C)

Production of Fluorine-Containing Polymer (C-1)

A polymerization tank having an internal volume of 100 L and equipped with a stirrer was degassed and was loaded with 92.1 kg of 1-hydrotridecafluorohexane, 16.3 kg of 1,3-dichloro-1,1,2,2,3-pentafluoropropane, 73 g of (perfluoroethypethylene $CH_2=CH(CF_2)_2F$ and 10.1 g of itaconic anhydride (IAH). Further, 9.6 kg of tetrafluoroethylene (TFE) and 0.7 kg of ethylene (E) were injected. The temperature inside the polymerization tank was increased to 66° C., and 433 $cm^3$ of a 1% by mass solution of t-butyl peroxypivalate as a polymerization initiator in 1,3-dichloro-1,1,2,2,3-pentafluoropropane was fed, thereby initiating polymerization. A TFE/E=60/40 (by mol) monomer mixture gas was continuously fed so that the pressure would be kept constant during the polymerization. Further, (perfluoroethylethylene and IAH were continuously supplied in amounts corresponding to 2.0 mol % and 0.5 mol %, respectively, of the total number of moles of TFE and E charged during the polymerization. 5.5 Hours after the start of the polymerization, the point of time when 8.0 kg monomer mixture gas and 63 g IAH had been fed, the temperature inside the polymerization tank was lowered to room temperature and the tank was purged to atmospheric pressure. The slurry-like fluorine-containing polymer thus obtained was added to a 200 L granulating tank containing 75.0 kg of water, and was granulated while performing stirring and while distilling away the solvent at an elevated temperature of 105° C. The resulting granules were dried at 150° C. for 5 hours to give 8.3 kg of a fluorine-containing polymer.

The fluorine-containing polymer had a composition written as TFE-based polymer units/E-based polymer units/ $CH_2$=$CH(CF_2)_2F$-based polymer units/IAH-based polymer units=58.5/39.0/2.0/0.5 (mol %), and a melting point of 240° C. The granules were melted using an extruder at 280° C. in a residence time of 2 minutes to give pellets of the fluorine-containing polymer (hereinafter, this fluorine-containing polymer will be referred to as (C-1)).

Production of Conductive Fluorine-Containing Polymer Composition (C-2)

100 Parts by mass of the fluorine-containing polymer (C-1) and 13 parts by mass of carbon black (manufactured by Denka Company Limited) were mixed together. The mixture was supplied to a twin-screw melting kneader (Model: TEM-48S, manufactured by TOSHIBA MACHINE CO., LTD.), and was melt-kneaded at a cylinder temperature of from 240° C. to 300° C. The molten resin was extruded in the form of a strand, which was introduced into a water tank. The strand that had been extruded was cooled with water, cut with a pelletizer, and dried with a drier at 120° C. for 10 hours to remove water. As a result, pellets of a conductive fluorine-containing polymer composition were obtained (hereinafter, this conductive fluorine-containing polymer composition will be referred to as (C-2)).

Production of fluorine-containing polymer (C-3)

The procedures in the production of fluorine-containing polymer (C-1) were repeated, except that itaconic anhydride (IAH) used in the production of fluorine-containing polymer (C-1) was not fed. Consequently, 7.6 kg of a fluorine-containing polymer was obtained.

The fluorine-containing polymer had a composition written as TFE-based polymer units/E-based polymer units/ $CH_2$=$CH(CF_2)_2F$-based polymer units=58.8/39.2/2.0 (mol %), and a melting point of 242° C. The granules were melted using an extruder at 280° C. in a residence time of 2 minutes to give pellets of the fluorine-containing polymer (hereinafter, this fluorine-containing polymer will be referred to as (C-3)).

Production of Conductive Fluorine-Containing Polymer Composition (C-4)

The procedures in the production of conductive fluorine-containing polymer composition (C-2) were repeated, except that the fluorine-containing polymer (C-1) used in the production of conductive fluorine-containing polymer composition (C-2) was changed to (C-3). Consequently, pellets of a conductive fluorine-containing polymer composition were obtained (hereinafter, this conductive fluorine-containing polymer composition will be referred to as (C-4)).

Production of Fluorine-Containing Polymer (C-5)

A polymerization tank having an internal volume of 100 L and equipped with a stirrer was degassed and was loaded with 42.5 kg of 1,3-dichloro-1,1,2,2,3-pentafluoropropane, $CF_2$=$CFOCF_2CF_2CF_3$ (perfluoro(propyl vinyl ether): PPVE), 2.13 kg of 1,1,2,4,4,5,5,6,6,6-decafluoro-3-oxahex-1-ene) and 51.0 kg of hexafluoropropylene (HFP). Next, the temperature inside the polymerization tank was raised to 50° C., and 4.25 kg of tetrafluoroethylene (TFE) was fed, thereby increasing the pressure to 1.0 MPa/G. There was added 340 $cm^3$ of a 0.3% by mass solution of (perfluorobutyryl)peroxide as a polymerization initiator in 1,3-dichloro-1,1,2,2,3-pentafluoropropane, thereby initiating polymerization. The polymerization initiator solution 340 $cm^3$ was fed every 10 minutes thereafter. TFE was fed continuously to keep the pressure constant at 1.0 MPa/G during the polymerization. Further, a 0.3% by mass of 1,3-dichloro-1,1,2,2,3-pentafluoropropane solution of 5-norbornene-2,3-dicarboxylic anhydride (NAH) was continuously supplied in an amount corresponding to 0.1 mol % of the number of moles of TFE charged during the polymerization. 5 Hours after the start of the polymerization, the point of time when 8.5 kg TFE had been fed, the temperature inside the polymerization tank was lowered to room temperature and the tank was purged to atmospheric pressure. The slurry-like fluorine-containing polymer thus obtained was added to a 200 L granulating tank containing 75.0 kg of water, and was granulated while performing stirring and while distilling away the solvent at an elevated temperature of 105° C. The resulting granules were dried at 150° C. for 5 hours to give 7.5 kg of granules of a fluorine-containing polymer.

The fluorine-containing polymer had a composition written as TFE-based polymer units/PPVE-based polymer units/HFP-based polymer units/NAH-based polymer units=91.2/1.5/7.2/0.1 (mol %), and a melting point of 262° C. The granules were melted using an extruder at 300° C. in a residence time of 2 minutes to give pellets of the fluorine-containing polymer (hereinafter, this fluorine-containing polymer will be referred to as (C-5)).

Production of Fluorine-Containing Polymer (C-6)

The procedures in the production of fluorine-containing polymer (C-5) were repeated, except that the 0.3% by mass of 1,3-dichloro-1,1,2,2,3-pentafluoropropane solution of 5-norbornene-2,3-dicarboxylic anhydride (NAH) used in the production of fluorine-containing polymer (C-5) was not fed. Consequently, 7.6 kg of a fluorine-containing polymer was obtained.

The fluorine-containing polymer had a composition written as TFE-based polymer units/PPVE-based polymer units/HFP-based polymer units=91.5/1.5/7.0 (mol %), and a melting point of 257° C. The granules were melted using an extruder at 300° C. in a residence time of 2 minutes to give pellets of the fluorine-containing polymer (hereinafter, this fluorine-containing polymer will be referred to as (C-6)).

Production of Conductive Fluorine-Containing Polymer Composition (C-7)

The procedures in the production of conductive fluorine-containing polymer composition (C-2) were repeated, except that the fluorine-containing polymer (C-1) used in the production of conductive fluorine-containing polymer composition (C-2) was changed to (C-6), that the amount of carbon black was changed from 13 parts by mass to 11 parts by mass, and that the cylinder temperature of 300° C. was changed to 320° C. Consequently, pellets of a conductive fluorine-containing polymer composition were obtained (hereinafter, this conductive fluorine-containing polymer composition will be referred to as (C-7)).

Production of Fluorine-Containing Polymer (C-8)

A jacketed, stirring polymerization tank capable of containing 174 kg of water was loaded with 51.5 kg of demineralized pure water. The inside space was thoroughly purged with pure nitrogen gas, and thereafter the nitrogen gas was removed by drawing a vacuum. Next, 40.6 kg of octafluorocyclobutane, 1.6 kg of chlorotrifluoroethylene (CTFE), 4.5 kg of tetrafluoroethylene (TFE) and 2.8 kg of perfluoro(propyl vinyl ether) (PPVE) were injected. 0.090 kg of n-propyl alcohol as a chain transfer agent was added, the temperature was adjusted to 35° C., and stirring was initiated. Polymerization was initiated by adding 0.44 kg of a 50% by mass methanol solution of di-n-propyl peroxydicarbonate as a polymerization initiator. The polymerization was performed in such a manner that a monomer mixture prepared with the same formulation as the desired composition of the copolymer was fed so as to keep the pressure inside the tank at 0.66 MPa during the polymerization. Thereafter, the residual gas in the tank was evacuated and the polymer formed was collected, washed with demineralized pure water and dried to give 30.5 kg of a fluorine-containing polymer in the form of a granular powder.

The fluorine-containing polymer had a composition written as CTFE-based polymer units/TFE-based polymer units/PPVE-based polymer units=24.4/73.1/2.5 by mol, contained 170 terminal carbonate groups per $1\times10^6$ carbon atoms in the main chain of the fluorine-containing polymer, and had a melting point of 241° C. The granules were melted using an extruder at 290° C. in a residence time of 2 minutes to give pellets of the fluorine-containing polymer (hereinafter, this fluorine-containing polymer will be referred to as (C-8)).

Production of fluorine-containing polymer (C-9)

The procedures in the production of fluorine-containing polymer (C-8) were repeated, except that the 50% by mass methanol solution of di-n-propyl peroxydicarbonate used in the production of fluorine-containing polymer (C-8) was not fed. Consequently, 29.8 kg of a fluorine-containing polymer was obtained.

The fluorine-containing polymer had a composition written as CTFE-based polymer units/TFE-based polymer units/PPVE-based polymer units=24.4/73.1/2.5 by mol, and a melting point of 241° C. The granules were melted using an extruder at 290° C. in a residence time of 2 minutes to give pellets of the fluorine-containing polymer (hereinafter, this fluorine-containing polymer will be referred to as (C-9)).

Production of Conductive Fluorine-Containing Polymer Composition (C-10)

The procedures in the production of conductive fluorine-containing polymer composition (C-7) were repeated, except that the fluorine-containing polymer (C-6) used in the production of conductive fluorine-containing polymer composition (C-7) was changed to (C-9), and that the cylinder temperature of 320° C. was changed to 300° C. Consequently, pellets of a conductive fluorine-containing polymer composition were obtained (hereinafter, this conductive fluorine-containing polymer composition will be referred to as (C-10)).

Example 1

With use of two-layer tube production machine Plabor (manufactured by Research Laboratory of Plastics Technology Co., Ltd.), the polyamide 12 composition (A-1) and the semi-aromatic polyamide composition (B-1) were separately melted at an extrusion temperature of 270° C. for (A-1) and an extrusion temperature of 300° C. for (B-1). The molten resins that were extruded were joined with use of an adapter to form a multilayer tubular body. Subsequently, the multilayer tubular body was cooled with a sizing die for controlling the dimension and was taken up. Thus, a multilayer tube was obtained which had a layer (a) (outermost layer) including (A-1) and a layer (b) (innermost layer) including (B-1). The layer configuration (a)/(b) was 0.75/0.25 mm, the inner diameter was 6 mm, and the outer diameter was 8 mm. The results of the properties measurements of this multilayer tube are described in Table 1.

Example 2

A multilayer tube having a layer configuration shown in Table 1 was obtained in the same manner as in Example 1, except that the polyamide 12 composition (A-1) used in Example 1 was replaced by (A-2). The results of the properties measurements of this multilayer tube are described in Table 1.

Example 3

A multilayer tube having a layer configuration shown in Table 1 was obtained in the same manner as in Example 1, except that the polyamide 12 composition (A-1) used in Example 1 was replaced by (A-3). The results of the properties measurements of this multilayer tube are described in Table 1.

Example 4

A multilayer tube having a layer configuration shown in Table 1 was obtained in the same manner as in Example 1, except that the polyamide 12 composition (A-1) used in Example 1 was replaced by (A-4). The results of the properties measurements of this multilayer tube are described in Table 1.

Example 5

A multilayer tube having a layer configuration shown in Table 1 was obtained in the same manner as in Example 1, except that the polyamide 12 composition (A-1) used in Example 1 was replaced by (A-5). The results of the properties measurements of this multilayer tube are described in Table 1.

Example 6

A multilayer tube having a layer configuration shown in Table 1 was obtained in the same manner as in Example 1, except that the polyamide 12 composition (A-1) used in Example 1 was replaced by (A-6). The results of the properties measurements of this multilayer tube are described in Table 1.

Example 7

A multilayer tube having a layer configuration shown in Table 1 was obtained in the same manner as in Example 1, except that the polyamide 12 composition (A-1) used in Example 1 was replaced by (A-7). The results of the properties measurements of this multilayer tube are described in Table 1.

Example 8

A multilayer tube having a layer configuration shown in Table 1 was obtained in the same manner as in Example 1, except that the polyamide 12 composition (A-1) used in Example 1 was replaced by the polyamide 1010 composition (A-8). The results of the properties measurements of this multilayer tube are described in Table 1.

Example 9

A multilayer tube having a layer configuration shown in Table 1 was obtained in the same manner as in Example 1, except that the semi-aromatic polyamide composition (B-1) used in Example 1 was replaced by (B-2), and that the extrusion temperature was changed to 340° C. for (B-2). The results of the properties measurements of this multilayer tube are described in Table 1.

Example 10

A multilayer tube having a layer configuration shown in Table 1 was obtained in the same manner as in Example 1, except that the semi-aromatic polyamide composition (B-1) used in Example 1 was replaced by (B-3), and that the extrusion temperature was changed to 310° C. for (B-3). The results of the properties measurements of this multilayer tube are described in Table 1.

Example 11

A multilayer tube having a layer configuration shown in Table 1 was obtained in the same manner as in Example 1, except that the semi-aromatic polyamide composition (B-1) used in Example 1 was replaced by (B-4), and that the extrusion temperature was changed to 340° C. for (B-4). The results of the properties measurements of this multilayer tube are described in Table 1.

Example 12

A multilayer tube having a layer configuration shown in Table 1 was obtained in the same manner as in Example 1, except that the semi-aromatic polyamide composition (B-1) used in Example 1 was replaced by (B-5), and that the extrusion temperature was changed to 290° C. for (B-5). The results of the properties measurements of this multilayer tube are described in Table 1.

Example 13

A multilayer tube having a layer configuration shown in Table 1 was obtained in the same manner as in Example 1, except that the semi-aromatic polyamide composition (B-1) used in Example 1 was replaced by (B-6), and that the extrusion temperature was changed to 310° C. for (B-6). The results of the properties measurements of this multilayer tube are described in Table 1.

Example 14

A multilayer tube having a layer configuration shown in Table 1 was obtained in the same manner as in Example 1, except that the semi-aromatic polyamide composition (B-1) used in Example 1 was replaced by (B-7). The results of the properties measurements of this multilayer tube are described in Table 1.

Example 15

A multilayer tube having a layer configuration shown in Table 1 was obtained in the same manner as in Example 1, except that the semi-aromatic polyamide composition (B-1) used in Example 1 was replaced by (B-9), and that the extrusion temperature was changed to 240° C. for (B-9). The results of the properties measurements of this multilayer tube are described in Table 1.

Example 16

A multilayer tube having a layer configuration shown in Table 1 was obtained in the same manner as in Example 1, except that the semi-aromatic polyamide composition (B-1) used in Example 1 was replaced by (B-10), and that the extrusion temperature was changed to 250° C. for (B-10). The results of the properties measurements of this multilayer tube are described in Table 1.

Example 17

A multilayer tube having a layer configuration shown in Table 1 was obtained in the same manner as in Example 1, except that the semi-aromatic polyamide composition (B-1) used in Example 1 was replaced by (B-11), and that the extrusion temperature was changed to 260° C. for (B-11). The results of the properties measurements of this multilayer tube are described in Table 1.

Example 18

A multilayer tube having a layer configuration shown in Table 1 was obtained in the same manner as in Example 1, except that the semi-aromatic polyamide composition (B-1) used in Example 1 was replaced by (B-12), and that the extrusion temperature was changed to 320° C. for (B-12). The results of the properties measurements of this multilayer tube are described in Table 1.

Example 19

A multilayer tube having a layer configuration shown in Table 1 was obtained in the same manner as in Example 1, except that the semi-aromatic polyamide composition (B-1) used in Example 1 was replaced by (B-13), and that the extrusion temperature was changed to 240° C. for (B-13). The results of the properties measurements of this multilayer tube are described in Table 1.

Example 20

A multilayer tube having a layer configuration shown in Table 1 was obtained in the same manner as in Example 1, except that the semi-aromatic polyamide composition (B-1) used in Example 1 was replaced by (B-14), and that the extrusion temperature was changed to 320° C. for (B-14). The results of the properties measurements of this multilayer tube are described in Table 1.

Example 21

A multilayer tube having a layer configuration shown in Table 1 was obtained in the same manner as in Example 1, except that the semi-aromatic polyamide composition (B-1) used in Example 1 was replaced by the conductive semi-aromatic polyamide composition (B-16), and that the extrusion temperature was changed to 320° C. for (B-16). The results of the properties measurements of this multilayer tube are described in Table 1. The conductivity of this multilayer tube was measured in accordance with SAE J-2260 to be not more than $10^6$ Ω/square, and superior electrostatic removal performance was thus confirmed.

Example 22

A multilayer tube having a layer configuration shown in Table 1 was obtained in the same manner as in Example 1, except that the semi-aromatic polyamide composition (B-1) used in Example 1 was replaced by the conductive semi-aromatic polyamide composition (B-17), and that the extrusion temperature was changed to 270° C. for (B-17). The results of the properties measurements of this multilayer tube are described in Table 1. The conductivity of this multilayer tube was measured in accordance with SAE J-2260 to be not more than $10^6$ Ω/square, and superior electrostatic removal performance was thus confirmed.

Example 23

With use of three-layer tube production machine Plabor (manufactured by Research Laboratory of Plastics Technology Co., Ltd.), the polyamide 12 composition (A-1), the semi-aromatic polyamide composition (B-1) and the conductive semi-aromatic polyamide composition (B-16) were separately melted at an extrusion temperature of 270° C. for (A-1), an extrusion temperature of 300° C. for (B-1) and an extrusion temperature of 320° C. for (B-16). The molten resins that were extruded were joined with use of an adapter to form a multilayer tubular body. Subsequently, the multilayer tubular body was cooled with a sizing die for controlling the dimension and was taken up. Thus, a multilayer tube was obtained which had a layer (a) (outermost layer) including (A-1), a layer (b) (intermediate layer) including (B-1) and a layer (b') (innermost layer) including (B-16). The layer configuration (a)/(b)/(b') was 0.75/0.15/0.10 mm, the inner diameter was 6 mm, and the outer diameter was 8 mm. The results of the properties measurements of this multilayer tube are described in Table 1. The conductivity of this multilayer tube was measured in accordance with SAE J-2260 to be not more than $10^6$ Ω/square, and superior electrostatic removal performance was thus confirmed.

Example 24

A multilayer tube having a layer configuration shown in Table 1 was obtained in the same manner as in Example 23, except that the semi-aromatic polyamide composition (B-1) used in Example 23 was replaced by (B-9), that the conductive semi-aromatic polyamide composition (B-16) was replaced by (B-17), and that the extrusion temperature was changed to 240° C. for (B-9) and the extrusion temperature was changed to 270° C. for (B-17). The results of the properties measurements of this multilayer tube are described in Table 1. The conductivity of this multilayer tube was measured in accordance with SAE J-2260 to be not more than $10^6$ Ω/square, and superior electrostatic removal performance was thus confirmed.

Example 25

With use of three-layer tube production machine Plabor (manufactured by Research Laboratory of Plastics Technology Co., Ltd.), the polyamide 12 composition (A-1), the semi-aromatic polyamide composition (B-1) and the fluorine-containing polymer (C-1) were separately melted at an extrusion temperature of 270° C. for (A-1), an extrusion temperature of 300° C. for (B-1) and an extrusion temperature of 290° C. for (C-1). The molten resins that were extruded were joined with use of an adapter to form a tubular body. Subsequently, the tubular body was cooled with a sizing die for controlling the dimension and was taken up. Thus, a multilayer tube was obtained which had a layer (a) (outermost layer) including (A-1), a layer (b) (intermediate layer) including (B-1) and a layer (c) (innermost layer) including (C-1). The layer configuration (a)/(b)/(c) was 0.70/0.15/0.15 min, the inner diameter was 6 mm, and the outer diameter was 8 mm. The results of the properties measurements of this multilayer tube are described in Table 1.

Example 26

A multilayer tube having a layer configuration shown in Table 1 was obtained in the same manner as in Example 25, except that the semi-aromatic polyamide composition (B-1) used in Example 25 was replaced by (B-9), and that the extrusion temperature was changed to 240° C. for (B-9). The results of the properties measurements of this multilayer tube are described in Table 1. The results of the properties measurements of this multilayer tube are described in Table 1.

Example 27

A multilayer tube having a layer configuration shown in Table 1 was obtained in the same manner as in Example 25, except that the fluorine-containing polymer (C-1) used in Example 25 was replaced by the conductive fluorine-containing polymer (C-2), and that the extrusion temperature was changed to 310° C. for (C-2). The results of the properties measurements of this multilayer tube are described in Table 1. The results of the properties measurements of this multilayer tube are described in Table 1. The conductivity of this multilayer tube was measured in accordance with SAE 7-2260 to be not more than $10^6$ Ω/square, and superior electrostatic removal performance was thus confirmed.

Example 28

A multilayer tube having a layer configuration shown in Table 1 was obtained in the same manner as in Example 25, except that the fluorine-containing polymer (C-1) used in Example 25 was replaced by (C-5), and that the extrusion temperature was changed to 310° C. for (C-5). The results of the properties measurements of this multilayer tube are described in Table 1. The results of the properties measurements of this multilayer tube are described in Table 1.

Example 29

A multilayer tube having a layer configuration shown in Table 1 was obtained in the same manner as in Example 25, except that the fluorine-containing polymer (C-1) used in Example 25 was replaced by (C-8), and that the extrusion temperature was changed to 300° C. for (C-8). The results of the properties measurements of this multilayer tube are described in Table 1. The results of the properties measurements of this multilayer tube are described in Table 1.

Example 30

With use of four-layer tube production machine Plabor (manufactured by Research Laboratory of Plastics Technology Co., Ltd.), the polyamide 12 composition (A-1), the semi-aromatic polyamide composition (B-1), the fluorine-containing polymer (C-1) and the conductive fluorine-containing polymer (C-2) were separately melted at an extrusion temperature of 270° C. for (A-1), an extrusion temperature of 300° C. for (B-1), an extrusion temperature of 290° C. for (C-1) and an extrusion temperature of 310° C. for (C-2). The molten resins that were extruded were joined with use of an adapter to form a tubular body. Subsequently, the tubular body was cooled with a sizing die for controlling the dimension and was taken up. Thus, a multilayer tube was obtained which had a layer (a) (outermost layer) including (A-1), a layer (b) (intermediate layer) including (B-1), a layer (c) (inner layer) including (C-1) and a layer (c') (innermost layer) including (C-2). The layer configuration (a)/(b)/(c)/(c') was 0.65/0.15/0.10/0.10 mm, the inner diameter was 6 mm, and the outer diameter was 8 mm. The results of the properties measurements of this multilayer tube are described in Table 1. The conductivity of this multilayer tube was measured in accordance with SAE J-2260 to be not

Example 31

A multilayer tube having a layer configuration shown in Table 1 was obtained in the same manner as in Example 30, except that the semi-aromatic polyamide composition (B-1) used in Example 30 was replaced by (B-9), and that the extrusion temperature was changed to 240° C. for (B-9). The results of the properties measurements of this multilayer tube are described in Table 1. The results of the properties measurements of this multilayer tube are described in Table 1.

Example 32

A multilayer tube having a layer configuration shown in Table 1 was obtained in the same manner as in Example 30, except that the conductive fluorine-containing polymer (C-2) used in Example 30 was replaced by the fluorine-containing polymer (C-3), and that the extrusion temperature was changed to 290° C. for (C-3). The results of the properties measurements of this multilayer tube are described in Table 1.

Example 33

A multilayer tube having a layer configuration shown in Table 1 was obtained in the same manner as in Example 30, except that the conductive fluorine-containing polymer (C-2) used in Example 30 was replaced by (C-4). The results of the properties measurements of this multilayer tube are described in Table 1. The conductivity of this multilayer tube was measured in accordance with SAE J-2260 to be not more than $10^6$ Ω/square, and superior electrostatic removal performance was thus confirmed.

Example 34

A multilayer tube having a layer configuration shown in Table 1 was obtained in the same manner as in Example 30, except that the fluorine-containing polymer (C-1) used in Example 30 was replaced by (C-5), that the conductive fluorine-containing polymer (C-2) was replaced by the fluorine-containing polymer (C-6), and that the extrusion temperature was changed to 310° C. for (C-5). The results of the properties measurements of this multilayer tube are described in Table 1.

Example 35

A multilayer tube having a layer configuration shown in Table 1 was obtained in the same manner as in Example 30, except that the fluorine-containing polymer (C-1) used in Example 30 was replaced by (C-5), that the conductive fluorine-containing polymer (C-2) was replaced by (C-7), and that the extrusion temperature was changed to 310° C. for (C-5) and the extrusion temperature was changed to 330° C. for (C-7). The results of the properties measurements of this multilayer tube are described in Table 1. The conductivity of this multilayer tube was measured in accordance with SAE J-2260 to be not more than $10^6$ Ω/square, and superior electrostatic removal performance was thus confirmed.

Example 36

A multilayer tube having a layer configuration shown in Table 1 was obtained in the same manner as in Example 30, except that the fluorine-containing polymer (C-1) used in Example 30 was replaced by (C-8), and that the conductive fluorine-containing polymer (C-2) was replaced by the fluorine-containing polymer (C-9). The results of the properties measurements of this multilayer tube are described in Table 1.

Example 37

A multilayer tube having a layer configuration shown in Table 1 was obtained in the same manner as in Example 30, except that the fluorine-containing polymer (C-1) used in Example 30 was replaced by (C-8), and that the conductive fluorine-containing polymer (C-2) was replaced by (C-10). The results of the properties measurements of this multilayer tube are described in Table 1. The conductivity of this multilayer tube was measured in accordance with SAE J-2260 to be not more than $10^6$ Ω/square, and superior electrostatic removal performance was thus confirmed.

Comparative Example 1

A multilayer tube having a layer configuration shown in Table 1 was obtained in the same manner as in Example 1, except that the polyamide 12 composition (A-1) used in Example 1 was replaced by (A-9). The results of the properties measurements of this multilayer tube are described in Table 1.

Comparative Example 2

A multilayer tube having a layer configuration shown in Table 1 was obtained in the same manner as in Example 1, except that the polyamide 12 composition (A-1) used in Example 1 was replaced by (A-10). The results of the properties measurements of this multilayer tube are described in Table 1.

Comparative Example 3

A multilayer tube having a layer configuration shown in Table 1 was obtained in the same manner as in Example 1, except that the polyamide 12 composition (A-1) used in Example 1 was replaced by (A-11). The results of the properties measurements of this multilayer tube are described in Table 1.

Comparative Example 4

A multilayer tube having a layer configuration shown in Table 1 was obtained in the same manner as in Example 1, except that the polyamide 12 composition (A-1) used in Example 1 was replaced by (A-12). The results of the properties measurements of this multilayer tube are described in Table 1.

Comparative Example 5

A multilayer tube having a layer configuration shown in Table 1 was obtained in the same manner as in Example 1, except that the semi-aromatic polyamide composition (B-1) used in Example 1 was replaced by (B-8), and that the extrusion temperature was changed to 350° C. for (B-8). The results of the properties measurements of this multilayer tube are described in Table 1.

Comparative Example 6

A multilayer tube having a layer configuration shown in Table 1 was obtained in the same manner as in Example 1, except that the semi-aromatic polyamide composition (B-1) used in Example 1 was replaced by (B-15), and that the extrusion temperature was changed to 280° C. for (B-15). The results of the properties measurements of this multilayer tube are described in Table 1.

Comparative Example 7

A multilayer tube having a layer configuration shown in Table 1 was obtained in the same manner as in Example 25, except that the polyamide 12 composition (A-1) used in Example 25 was replaced by (A-9). The results of the properties measurements of this multilayer tube are described in Table 1.

Comparative Example 8

A multilayer tube having a layer configuration shown in Table 1 was obtained in the same manner as in Example 25, except that the polyamide 12 composition (A-1) used in Example 25 was replaced by (A-10). The results of the properties measurements of this multilayer tube are described in Table 1.

Comparative Example 9

A multilayer tube having a layer configuration shown in Table 1 was obtained in the same manner as in Example 25, except that the polyamide 12 composition (A-1) used in Example 25 was replaced by (A-11). The results of the properties measurements of this multilayer tube are described in Table 1.

Comparative Example 10

A multilayer tube having a layer configuration shown in Table 1 was obtained in the same manner as in Example 25, except that the polyamide 12 composition (A-1) used in Example 25 was replaced by (A-12). The results of the properties measurements of this multilayer tube are described in Table 1.

Comparative Example 11

A multilayer tube having a layer configuration shown in Table 1 was obtained in the same manner as in Example 25, except that the semi-aromatic polyamide composition (B-1) used in Example 25 was replaced by (B-8), and that the extrusion temperature was changed to 350° C. for (B-8). The results of the properties measurements of this multilayer tube are described in Table 1.

Comparative Example 12

A multilayer tube having a layer configuration shown in Table 1 was obtained in the same manner as in Example 25, except that the semi-aromatic polyamide composition (B-1) used in Example 25 was replaced by (B-15), and that the extrusion temperature was changed to 280° C. for (B-15). The results of the properties measurements of this multilayer tube are described in Table 1.

Comparative Example 13

A multilayer tube having a layer configuration shown in Table 1 was obtained in the same manner as in Example 30, except that the polyamide 12 composition (A-1) used in Example 30 was replaced by (A-9). The results of the properties measurements of this multilayer tube are described in Table 1.

Comparative Example 14

A multilayer tube having a layer configuration shown in Table 1 was obtained in the same manner as in Example 30, except that the polyamide 12 composition (A-1) used in Example 30 was replaced by (A-10). The results of the properties measurements of this multilayer tube are described in Table 1.

Comparative Example 15

A multilayer tube having a layer configuration shown in Table 1 was obtained in the same manner as in Example 30, except that the polyamide 12 composition (A-1) used in Example 30 was replaced by (A-11). The results of the properties measurements of this multilayer tube are described in Table 1.

Comparative Example 16

A multilayer tube having a layer configuration shown in Table 1 was obtained in the same manner as in Example 30, except that the polyamide 12 composition (A-1) used in Example 30 was replaced by (A-12). The results of the properties measurements of this multilayer tube are described in Table 1.

Comparative Example 17

A multilayer tube having a layer configuration shown in Table 1 was obtained in the same manner as in Example 30, except that the semi-aromatic polyamide composition (B-1) used in Example 30 was replaced by (B-8), and that the extrusion temperature was changed to 350° C. for (B-8). The results of the properties measurements of this multilayer tube are described in Table 1.

Comparative Example 18

A multilayer tube having a layer configuration shown in Table 1 was obtained in the same manner as in Example 30, except that the semi-aromatic polyamide composition (B-1) used in Example 30 was replaced by (B-15), and that the extrusion temperature was changed to 280° C. for (B-15). The results of the properties measurements of this multilayer tube are described in Table 1.

TABLE 1

| | Outermost layer | | Intermediate layer | | Inner layer | | Innermost layer | | | Chemical resistance Appearance | Low-temperature Impact (broken/tested) | Peel strength [N/mm] | |
|---|---|---|---|---|---|---|---|---|---|---|---|---|---|
| | Type | Thickness [mm] | Type | Thickness [mm] | Type | Thickness [mm] | Type | Thickness [mm] | | | | Initial | After heat treatment |
| Example 1 | A-1 | 0.75 | — | — | — | — | B-1 | 0.25 | No cracks | 0/10 | 0.2 | 5.3 |
| Example 2 | A-2 | 0.75 | — | — | — | — | B-1 | 0.25 | No cracks | 0/10 | 6.5 | 4.3 |
| Example 3 | A-3 | 0.75 | — | — | — | — | B-1 | 0.25 | No cracks | 0/10 | Not peeled | Not peeled |
| Example 4 | A-4 | 0.75 | — | — | — | — | B-1 | 0.25 | No cracks | 0/10 | 6.2 | 4.1 |
| Example 5 | A-5 | 0.75 | — | — | — | — | B-1 | 0.25 | No cracks | 0/10 | Not peeled | Not peeled |
| Example 6 | A-6 | 0.75 | — | — | — | — | B-1 | 0.25 | No cracks | 0/10 | 5.7 | 3.9 |
| Example 7 | A-7 | 0.75 | — | — | — | — | B-1 | 0.25 | No cracks | 0/10 | 8.5 | 5.6 |
| Example 8 | A-8 | 0.75 | — | — | — | — | B-1 | 0.25 | No cracks | 0/10 | Not peeled | 6.7 |
| Example 9 | A-1 | 0.75 | — | — | — | — | B-2 | 0.25 | No cracks | 0/10 | 5.3 | 4.1 |
| Example 10 | A-1 | 0.75 | — | — | — | — | B-3 | 0.25 | No cracks | 0/10 | 7.6 | 5.0 |
| Example 11 | A-1 | 0.75 | — | — | — | — | B-4 | 0.25 | No cracks | 0/10 | 5.4 | 4.0 |
| Example 12 | A-1 | 0.75 | — | — | — | — | B-5 | 0.25 | No creeks | 0/10 | Not peeled | 5.7 |
| Example 13 | A-1 | 0.75 | — | — | — | — | B-6 | 0.25 | No cracks | 0/10 | Not peeled | Not peeled |
| Example 14 | A-1 | 0.75 | — | — | — | — | B-7 | 0.25 | No cracks | 0/10 | Not peeled | Not peeled |
| Example 15 | A-1 | 0.75 | — | — | — | — | B-9 | 0.25 | No cracks | 0/10 | 5.5 | 3.9 |
| Example 16 | A-1 | 0.75 | — | — | — | — | B-10 | 0.25 | No cracks | 0/10 | 5.4 | 3.5 |
| Example 17 | A-1 | 0.75 | — | — | — | — | B-11 | 0.25 | No cracks | 0/10 | 5.2 | 3.6 |
| Example 18 | A-1 | 0.75 | — | — | — | — | B-12 | 0.25 | No cracks | 0/10 | 4.7 | 3.3 |
| Example 19 | A-1 | 0.75 | — | — | — | — | B-13 | 0.25 | No cracks | 0/10 | 5.0 | 3.5 |
| Example 20 | A-1 | 0.75 | — | — | — | — | B-14 | 0.25 | No cracks | 0/10 | 4.8 | 3.2 |
| Example 21 | A-1 | 0.80 | — | — | — | — | B-16 | 0.20 | No cracks | 0/10 | 8.0 | 5.0 |
| Example 22 | A-1 | 0.80 | — | — | — | — | B-17 | 0.20 | No cracks | 0/10 | 5.2 | 3.6 |
| Example 23 | A-1 | 0.75 | B-1 | 0.15 | — | — | B-16 | 0.10 | No cracks | 0/10 | 8.2 | 5.1 |
| Example 24 | A-1 | 0.75 | B-9 | 0.15 | — | — | B-17 | 0.10 | No cracks | 0/10 | 5.6 | 4.1 |
| Example 25 | A-1 | 0.70 | B-1 | 0.15 | — | — | C-1 | 0.15 | No cracks | 0/10 | 7.9 | 4.7 |
| Example 26 | A-1 | 0.70 | B-9 | 0.15 | — | — | C-1 | 0.15 | No cracks | 0/10 | 4.9 | 4.1 |
| Example 27 | A-1 | 0.70 | B-1 | 0.15 | — | — | C-2 | 0.15 | No cracks | 0/10 | 7.8 | 4.6 |
| Example 28 | A-1 | 0.70 | B-1 | 0.15 | — | — | C-5 | 0.15 | No cracks | 0/10 | 7.9 | 4.3 |
| Example 29 | A-1 | 0.70 | B-1 | 0.15 | — | — | C-8 | 0.15 | No cracks | 0/10 | 7.5 | 4.2 |
| Example 30 | A-1 | 0.65 | B-1 | 0.15 | C-1 | 0.10 | C-2 | 0.10 | No cracks | 0/10 | 7.6 | 4.5 |
| Example31 | A-1 | 0.65 | B-9 | 0.15 | C-1 | 0.10 | C-2 | 0.10 | No cracks | 0/10 | 4.8 | 3.9 |
| Exemple32 | A-1 | 0.65 | B-1 | 0.15 | C-1 | 0.10 | C-3 | 0.10 | No cracks | 0/10 | 7.8 | 4.2 |
| Example33 | A-1 | 0.65 | B-1 | 0.15 | C-1 | 0.10 | C-4 | 0.10 | No cracks | 0/10 | 7.7 | 4.5 |
| Example34 | A-1 | 0.65 | B-1 | 0.15 | C-5 | 0.10 | C-6 | 0.10 | No cracks | 0/10 | 7.5 | 4.3 |
| Example35 | A-1 | 0.65 | B-1 | 0.15 | C-5 | 0.10 | C-7 | 0.10 | No cracks | 0/10 | 7.9 | 4.2 |
| Example36 | A-1 | 0.65 | B-1 | 0.15 | C-8 | 0.10 | C-9 | 0.10 | No cracks | 0/10 | 7.4 | 4.1 |
| Example37 | A-1 | 0.65 | B-1 | 0.15 | C-8 | 0.10 | C-10 | 0.10 | No cracks | 0/10 | 7.7 | 3.9 |
| Comparative Example 1 | A-9 | 0.75 | — | — | — | — | B-1 | 0.25 | No cracks | 0/10 | 3.0 | 1.7 |
| Comparative Example 2 | A-10 | 0.75 | — | — | — | — | B-1 | 0.25 | No cracks | 0/10 | 3.6 | 2.6 |
| Comparative Example 3 | A-11 | 0.75 | — | — | — | — | B-1 | 0.25 | No cracks | 0/10 | Not peeled | 2.8 |
| Comparative Example 4 | A-12 | 0.75 | — | — | — | — | B-1 | 0.25 | Cracks | 10/10 | Not peeled | Not peeled |
| Comparative Example 5 | A-1 | 0.75 | — | — | — | — | B-8 | 0.25 | No cracks | 0/10 | 1.2 | 0 |
| Comparative Example 6 | A-1 | 0.75 | — | — | — | — | B-15 | 0.25 | No cracks | 0/10 | 0.2 | 0 |
| Comparative Example 7 | A-9 | 0.70 | B-1 | 0.15 | — | — | C-1 | 0.15 | No cracks | 0/10 | 3.2 | 1.8 |
| Comparative Example 8 | A-10 | 0.70 | B-1 | 0.15 | — | — | C-1 | 0.15 | No cracks | 0/10 | 4.0 | 2.5 |
| Comparative Example 9 | A-11 | 0.70 | B-1 | 0.15 | — | — | C-1 | 0.15 | No cracks | 0/10 | Not peeled | 2.7 |
| Comparative Example 10 | A-12 | 0.70 | B-1 | 0.15 | — | — | C-1 | 0.15 | Cracks | 10/10 | Not peeled | Not peeled |
| Comparative Example 11 | A-1 | 0.70 | B-8 | 0.15 | — | — | C-1 | 0.15 | No cracks | 0/10 | 0.9 | 0 |
| Comparative Example 12 | A-1 | 0.70 | B-15 | 0.15 | — | — | C-1 | 0.15 | No cracks | 0/10 | 0.1 | 0 |
| Comparative Example 13 | A-9 | 0.65 | B-1 | 0.15 | C-1 | 0.10 | C-2 | 0.10 | No cracks | 0/10 | 3.3 | 1.6 |
| Comparative Example 14 | A-10 | 0.65 | B-1 | 0.15 | C-1 | 0.10 | C-2 | 0.10 | No cracks | 0/10 | 4.2 | 2.4 |

TABLE 1-continued

| | Outermost layer | | Intermediate layer | | Inner layer | | Innermost layer | | Chemical resistance Appearance | Low-temperature Impact (broken/tested) | Peel strength [N/mm] Initial | After heat treatment |
|---|---|---|---|---|---|---|---|---|---|---|---|---|
| | Type | Thickness [mm] | Type | Thickness [mm] | Type | Thickness [mm] | Type | Thickness [mm] | | | | |
| Comparative Example 15 | A-11 | 0.65 | B-1 | 0.15 | C-1 | 0.10 | C-2 | 0.10 | No cracks | 0/10 | Not peeled | 2.6 |
| Comparative Example 16 | A-12 | 0.65 | B-1 | 0.15 | C-1 | 0.10 | C-2 | 0.10 | Cracks | 10/10 | Not peeled | Not peeled |
| Comparative Example 17 | A-1 | 0.65 | B-8 | 0.15 | C-1 | 0.10 | C-2 | 0.10 | No cracks | 0/10 | 0.8 | 0 |
| Comparative Example 18 | A-1 | 0.65 | B-15 | 0.15 | C-1 | 0.10 | C-2 | 0.10 | No cracks | 0/10 | 0.2 | 0 |

The following is clear from Table 1. The multilayer tubes of Comparative Examples 1, 2, 7, 8, 13 and 14 had a layer that included an aliphatic polyamide composition which did not contain the polyamide (A2) specified in the present invention and which had a difference in absolute value between the solubility parameter SP of the polyamide (A1) and that of the polyamide (A2) outside the range specified in the present invention; these multilayer tubes were poor in the durability of interlayer adhesion. The multilayer tubes of Comparative Examples 3, 9 and 15 had a layer that included an aliphatic polyamide composition which contained a polyamide (A2) not complying with the definition specified in the present invention and which had a difference in absolute value between the solubility parameter SP of the polyamide (A1) and that of the polyamide (A2) outside the range specified in the present invention; these multilayer tubes were poor in the durability of interlayer adhesion. The multilayer tubes of Comparative Examples 4, 10 and 16 had a layer that included an aliphatic polyamide composition which contained the polyamide (A2) in an amount outside the range specified in the present invention; these multilayer tubes were poor in chemical resistance. The multilayer tubes of Comparative Examples 5, 6, 11, 12, 17 and 18 had a layer that included a semi-aromatic polyamide composition which did not comply with the definition specified in the present invention; these multilayer tubes were poor in interlayer adhesion and durability thereof.

In contrast, the multilayer tubes of Examples 1 to 37 which satisfied the requirements according to the present invention apparently attained good characteristics such as chemical resistance, interlayer adhesion and durability of interlayer adhesion.

The invention claimed is:

1. A multilayer tube comprising two or more layers including a layer (a) and a layer (b), wherein
   at least one pair of the layer (a) and the layer (b) are disposed adjacent to each other,
   the layer (a) contains an aliphatic polyamide composition (A),
   the layer (b) contains a semi-aromatic polyamide composition (B),
   the aliphatic polyamide composition (A) contains a polyamide (A1), a polyamide (A2) and an elastomer polymer (A3),
   the polyamide (A1) is an aliphatic polyamide having a ratio of the number of methylene groups to the number of amide groups of not less than 8.0, and is not poly(caproamide/dodecanamide) copolymer (polyamide 6/12), and is contained in the aliphatic polyamide composition (A) in an amount of not less than 40% by mass and not more than 90% by mass,
   the polyamide (A2) is a polyamide other than the polyamide (A1), and is not polycaproamide (polyamide 6) and polyhexamethylene sebacamide (polyamide 610), and is contained in the aliphatic polyamide composition (A) in an amount of not less than 5% by mass and not more than 30% by mass,
   the elastomer polymer (A3) comprises structural units derived from an unsaturated compound having a carboxyl group and/or an acid anhydride group, and is contained in the aliphatic polyamide composition (A) in an amount of not less than 5% by mass and not more than 30% by mass,
   the difference in absolute value between the solubility parameter SP of the polyamide (A1) and that of the polyamide (A2) [|(SP of polyamide (A1))—(SP of polyamide (A2))|] is not less than 1.8 $(MPa)^{1/2}$ and not more than 5.5 $(MPa)^{1/2}$,
   the semi-aromatic polyamide composition (B) contains a semi-aromatic polyamide (B1) or a semi-aromatic polyamide (B2),
   the semi-aromatic polyamide (B1) or the semi-aromatic polyamide (B2) is contained in the semi-aromatic polyamide composition (B) in an amount of not less than 60% by mass,
   the semi-aromatic polyamide (B1) comprises 50 mol % or more $C_{10}$ aliphatic diamine units based on all diamine units in the semi-aromatic polyamide (B1), and 50 mol % or more terephthalic acid units and/or naphthalenedicarboxylic acid units based on all dicarboxylic acid units in the semi-aromatic polyamide (B1),
   the semi-aromatic polyamide (B2) comprises 50 mol % or more xylylenediamine units and/or bis(aminomethyl) naphthalene units based on all diamine units in the semi-aromatic polyamide (B2), and 50 mol % or more $C_9$ or $C_{10}$ aliphatic dicarboxylic acid units based on all dicarboxylic acid units in the semi-aromatic polyamide (B2),
   wherein [A]>[B]+10 wherein [A] is the concentration (μeq/g) of terminal amino groups and [B] is the concentration (μeq/g) of terminal carboxyl groups, per 1 g of each of the polyamide (A1) and the polyamide (A2) in the aliphatic polyamide composition (A), and
   wherein the semi-aromatic polyamide composition (B) contains the elastomer polymer (A3).

2. The multilayer tube according to claim 1, wherein the polyamide (A1) is at least one homopolymer selected from the group consisting of polyhexamethylene dodecamide (polyamide 612), polynonamethylene dodecamide (polyamide 912), polydecamethylene sebacamide (polyamide 1010), polydecamethylene dodecamide (polyamide 1012), polydodecamethylene dodecamide (polyamide 1212), polyundecanamide (polyamide 11) and polydodecanamide (polyamide 12), and/or a copolymer constituted by a plurality of monomers selected from the monomers constituting the above homopolymers.

3. The multilayer tube according to claim 2, wherein the polyamide (A2) is at least one homopolymer selected from the group consisting of polyhexamethylene adipamide (polyamide 66), polyhexamethylene azelamide (polyamide 69), polyhexamethylene terephthalamide (polyamide 6T), polyhexamethylene isophthalamide (polyamide 6I) and polymetaxylylene adipamide (polyamide MXD6), and/or a copolymer constituted by a plurality of monomers selected from the monomers constituting the above homopolymers, or a copolymer which is based on a monomer selected from the monomers constituting at least one polymer selected from the group consisting of polycaproamide (polyamide 6), polyhexamethylene adipamide (polyamide 66), polyhexamethylene azelamide (polyamide 69), polyhexamethylene sebacamide (polyamide 610), polyhexamethylene terephthalamide (polyamide 6T), polyhexamethylene isophthalamide (polyamide 6I) and polymetaxylylene adipamide (polyamide MXD6) and which includes a plurality of monomers selected from the monomers constituting at least one selected from the group consisting of polyhexamethylene dodecamide (polyamide 612), polynonamethylene dodecamide (polyamide 912), polydecamethylene sebacamide (polyamide 1010), polydecamethylene dodecamide (polyamide 1012), polydodecamethylene dodecamide (polyamide 1212), polyundecanamide (polyamide 11) and polydodecanamide (polyamide 12).

4. The multilayer tube according to claim 1, wherein the polyamide (A2) is at least one homopolymer selected from the group consisting of polyhexamethylene adipamide (polyamide 66), polyhexamethylene azelamide (polyamide 69), polyhexamethylene terephthalamide (polyamide 6T), polyhexamethylene isophthalamide (polyamide 6I) and polymetaxylylene adipamide (polyamide MXD6), and/or a copolymer constituted by a plurality of monomers selected from the monomers constituting the above homopolymers, or a copolymer which is based on a monomer selected from the monomers constituting at least one polymer selected from the group consisting of polycaproamide (polyamide 6), polyhexamethylene adipamide (polyamide 66), polyhexamethylene azelamide (polyamide 69), polyhexamethylene sebacamide (polyamide 610), polyhexamethylene terephthalamide (polyamide 6T), polyhexamethylene isophthalamide (polyamide 6I) and polymetaxylylene adipamide (polyamide MXD6) and which includes a plurality of monomers selected from the monomers constituting at least one selected from the group consisting of polyhexamethylene dodecamide (polyamide 612), polynonamethylene dodecamide (polyamide 912), polydecamethylene sebacamide (polyamide 1010), polydecamethylene dodecamide (polyamide 1012), polydodecamethylene dodecamide (polyamide 1212), polyundecanamide (polyamide 11) and polydodecanamide (polyamide 12).

5. The multilayer tube according to claim 4, wherein the polyamide (A2) is poly(caproamide/dodecanamide) copolymer (polyamide 6/12) or poly(caproamide/hexamethylene adipamide/dodecanamide) copolymer (polyamide 6/66/12).

6. The multilayer tube according to claim 1, wherein the layer (b) is disposed adjacent to and inside the layer (a).

7. The multilayer tube according to claim 1, wherein the multilayer tube further comprises a layer (c),
    at least one pair of the layer (b) and the layer (c) are adjacent to each other, and
    the layer (c) contains a fluorine-containing polymer (C) having, in its molecular chain, a functional group reactive to an amino group.

8. The multilayer tube according to claim 7, wherein the layer (c) is disposed inside the layer (b).

9. The multilayer tube according to claim 1, wherein the innermost layer is a conductive layer containing a thermoplastic resin composition containing a conductive filler.

10. The multilayer tube according to claim 1, which is produced by coextrusion.

11. The multilayer tube according to claim 1, which is used as a fuel tube.

\* \* \* \* \*